US012720289B2

(12) United States Patent
Nolan et al.

(10) Patent No.: US 12,720,289 B2
(45) Date of Patent: Aug. 25, 2026

(54) SERVICE PROVISION TO IoT DEVICES

(71) Applicant: Intel Corporation, Santa Clara, CA (US)

(72) Inventors: Keith Nolan, Mullingar (IE); Mark Kelly, Leixlip (IE); Michael Nolan, Maynooth (IE); Davide Carboni, London (GB); Cliodhna Ni Scanaill, Broadford (IE); Eugene Ryan, Glasnevin (IE); Richard Davies, Dublin (IE); John Brady, Celbridge (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/421,990

(22) Filed: Jan. 25, 2024

(65) Prior Publication Data

US 2024/0235931 A1 Jul. 11, 2024

Related U.S. Application Data

(63) Continuation of application No. 17/702,488, filed on Mar. 23, 2022, now Pat. No. 11,916,730, which is a (Continued)

(51) Int. Cl.
*G06F 13/00* (2006.01)
*G06F 16/182* (2019.01)
(Continued)

(52) U.S. Cl.
CPC .......... *H04W 4/70* (2018.02); *G06F 16/1824* (2019.01); *G06F 16/1834* (2019.01); (Continued)

(58) Field of Classification Search
CPC ... H04L 63/0478; H04L 63/0442; H04L 9/14; H04L 9/16; H04L 41/0806; H04L 67/10; (Continued)

(56) References Cited

U.S. PATENT DOCUMENTS 5,644,717 A 7/1997 Clark
6,058,383 A 5/2000 Narasimhalu et al.
(Continued)

FOREIGN PATENT DOCUMENTS

CN 1472937 A 2/2004
CN 1950775 A 4/2007
CN 101051977 B 3/2012
CN 101990238 B 6/2013
CN 104322011 A 1/2015
CN 103106068 B 3/2015
CN 102571766 B 7/2015
CN 103200616 B 12/2015
(Continued)

OTHER PUBLICATIONS

Kim et al; "Increasing Web Server Throughput with Network Interface Data Caching"; Computer Systems Laboratory, Rice University Houston Texas; Operating Systems Review, vol. 36 No. 5; ACM Oct. 2002, 12 pages.
(Continued)

*Primary Examiner* — Kenneth R Coulter
(74) *Attorney, Agent, or Firm* — Essential Patents Group, LLP; Christopher K. Gagne

(57) ABSTRACT

An Internet of Things (IoT) network includes an orchestrator to issue service management requests, a service coordinator to identify components to participate in the service, and a component to perform a network service element. An IoT network includes an IoT device with service enumerator, contract enumerator, and join contract function. An IoT network apparatus includes permissions guide drafter for discovered peers, and permissions guide action executor. An IoT network apparatus includes floating service permissions guide drafter for discovered hosts, host hardware selector, floating service permissions guide executor, and service wallet value transferor. An IoT network apparatus includes permissions guide drafter for first and second discovered peers, parameter weight calculator, permissions guide term generator, and permissions guide action executor. An IoT network includes an IoT device with resource hardware
(Continued)

1700 component identifier, processor to process a received indication of an external module hardware requirement, an external module comparer, and deactivation signal transmitter.

19 Claims, 49 Drawing Sheets

Related U.S. Application Data continuation of application No. 16/467,002, filed as application No. PCT/US2017/068832 on Dec. 28, 2017, now Pat. No. 11,296,935.

(60) Provisional application No. 62/441,070, filed on Dec. 30, 2016.

(51) Int. Cl.

| | |
|---|---|
| ***H04L 9/08*** | (2006.01) |
| ***H04L 9/32*** | (2006.01) |
| ***H04L 41/0806*** | (2022.01) |
| ***H04L 41/12*** | (2022.01) |
| ***H04L 45/00*** | (2022.01) |
| ***H04L 61/4505*** | (2022.01) |
| ***H04L 61/5069*** | (2022.01) |
| ***H04L 67/10*** | (2022.01) |
| ***H04L 67/104*** | (2022.01) |
| ***H04L 67/1087*** | (2022.01) |
| ***H04L 67/12*** | (2022.01) |
| ***H04L 67/562*** | (2022.01) |
| ***H04L 69/18*** | (2022.01) |
| ***H04L 69/22*** | (2022.01) |
| ***H04W 4/08*** | (2009.01) |
| ***H04W 4/70*** | (2018.01) |
| ***H04W 12/69*** | (2021.01) |
| ***H04W 84/22*** | (2009.01) |
| *H04L 9/00* | (2022.01) |
| *H04W 84/18* | (2009.01) |

(52) U.S. Cl.

CPC .......... *H04L 9/0825* (2013.01); *H04L 9/3239* (2013.01); *H04L 41/0806* (2013.01); *H04L 41/12* (2013.01); *H04L 45/20* (2013.01); *H04L 61/4505* (2022.05); *H04L 61/5069* (2022.05); *H04L 67/10* (2013.01); *H04L 67/104* (2013.01); *H04L 67/1046* (2013.01); *H04L 67/1093* (2013.01); *H04L 67/12* (2013.01); *H04L 67/562* (2022.05); *H04L 69/18* (2013.01); *H04L 69/22* (2013.01); *H04W 4/08* (2013.01); *H04W 12/69* (2021.01); *H04W 84/22* (2013.01); *H04L 9/50* (2022.05); *H04L 2209/56* (2013.01); *H04W 84/18* (2013.01)

(58) Field of Classification Search

CPC ..... H04L 67/12; H04L 9/0825; H04L 9/3239; H04L 45/20; H04L 67/104; H04L 69/18; H04L 41/12; H04L 69/22; H04L 67/1046; H04L 67/1093; H04L 61/4505; H04L 61/5069; H04L 67/562; H04L 2209/56; H04L 9/50; H04W 4/70; H04W 4/08; H04W 84/22; H04W 12/69; H04W 84/18; G06F 16/1824; G06F 16/1834

USPC ......... 709/220–222, 245, 232, 231; 713/171, 713/168, 150

See application file for complete search history.

(56) References Cited

U.S. PATENT DOCUMENTS

| | | | |
|---|---|---|---|
| 6,129,656 A | 10/2000 | Blakeslee et al. | |
| 6,678,888 B1 | 1/2004 | Sakanishi | |
| 6,917,984 B1 | 7/2005 | Tan | |
| 6,985,754 B1 | 1/2006 | Pedersen et al. | |
| 7,305,422 B1 | 12/2007 | Wang | |
| 7,424,602 B2 | 9/2008 | Reiss et al. | |
| 7,934,221 B2 | 4/2011 | Parker et al. | |
| 8,058,383 B2 | 11/2011 | Teasley | |
| 8,345,701 B1 | 1/2013 | Davis et al. | |
| 8,356,067 B2 | 1/2013 | Trantow | |
| 8,503,674 B2 * | 8/2013 | Ureche | H04L 9/002 713/168 |
| 8,522,341 B2 | 8/2013 | Nochta et al. | |
| 8,572,571 B2 | 10/2013 | Chatterjee | |
| 8,918,775 B1 | 12/2014 | Carpenter et al. | |
| 8,996,459 B2 | 3/2015 | Arthursson et al. | |
| 9,298,951 B2 * | 3/2016 | Barney | H04L 9/3242 |
| 9,548,866 B2 * | 1/2017 | Barney | H04L 9/14 |
| 9,684,544 B1 | 6/2017 | Bequet et al. | |
| 9,967,333 B2 | 5/2018 | Chen et al. | |
| 10,068,228 B1 | 9/2018 | Winklevoss et al. | |
| 10,083,055 B2 | 9/2018 | Gupta et al. | |
| 10,140,100 B2 | 11/2018 | Barnes et al. | |
| 10,182,361 B1 | 1/2019 | Moon et al. | |
| 10,185,550 B2 | 1/2019 | Smith et al. | |
| 10,257,678 B2 | 4/2019 | Hoseinitabatabaei et al. | |
| 10,306,513 B2 | 5/2019 | Bartfai-Walcott et al. | |
| 10,425,414 B1 | 9/2019 | Buckingham et al. | |
| 10,505,731 B1 * | 12/2019 | Maeng | G06Q 20/3674 |
| 10,628,807 B2 | 4/2020 | White | |
| 10,659,223 B2 * | 5/2020 | Wright | H04L 9/0894 |
| 10,693,638 B1 * | 6/2020 | Cignetti | G06F 21/602 |
| 10,721,312 B2 | 7/2020 | Kelly et al. | |
| 10,744,372 B2 | 8/2020 | Meyerson et al. | |
| 10,810,001 B2 | 10/2020 | Smith et al. | |
| 11,108,627 B2 | 8/2021 | Smith et al. | |
| 11,128,528 B2 | 9/2021 | Nolan et al. | |
| 11,196,623 B2 | 12/2021 | Smith et al. | |
| 11,282,139 B1 | 3/2022 | Winklevoss et al. | |
| 11,290,324 B2 | 3/2022 | Smith et al. | |
| 11,296,935 B2 | 4/2022 | Nolan et al. | |
| 11,296,937 B2 | 4/2022 | Nolan et al. | |
| 11,431,561 B2 | 8/2022 | Smith et al. | |
| 11,527,308 B2 | 12/2022 | Shahrzad et al. | |
| 11,621,833 B2 * | 4/2023 | Wright | H04L 9/0894 705/69 |
| 11,637,746 B2 | 4/2023 | Smith et al. | |
| 11,770,296 B2 | 9/2023 | Nolan et al. | |
| 11,854,011 B1 | 12/2023 | Prasad | |
| 12,132,609 B2 | 10/2024 | Smith et al. | |
| 12,452,075 B2 | 10/2025 | Alwar et al. | |
| 2002/0031230 A1 | 3/2002 | Sweet et al. | |
| 2003/0051045 A1 | 3/2003 | Connor | |
| 2003/0081592 A1 | 5/2003 | Krishnarajah et al. | |
| 2003/0139179 A1 | 7/2003 | Fuchs et al. | |
| 2004/0081203 A1 | 4/2004 | Sodder et al. | |
| 2004/0215948 A1 | 10/2004 | Abbey et al. | |
| 2005/0105735 A1 * | 5/2005 | Iino | H04L 63/0807 713/155 |
| 2005/0141717 A1 | 6/2005 | Cromer et al. | |
| 2006/0168318 A1 | 7/2006 | Twiss | |
| 2007/0023381 A1 | 2/2007 | Cerveny | |
| 2007/0157170 A1 | 7/2007 | Reiss et al. | |
| 2007/0180139 A1 | 8/2007 | Oguchi et al. | |
| 2007/0233881 A1 | 10/2007 | Nochta et al. | |
| 2007/0245419 A1 | 10/2007 | Omahony | |
| 2007/0277237 A1 | 11/2007 | Adelman et al. | |
| 2008/0209555 A1 | 8/2008 | Parker et al. | |
| 2009/0006638 A1 | 1/2009 | George et al. | |
| 2009/0290537 A1 | 11/2009 | Berglund et al. | |
| 2010/0325072 A1 | 12/2010 | Truemper | |
| 2011/0023023 A1 | 1/2011 | Chatterjee | |
| 2011/0067023 A1 | 3/2011 | Chiyo et al. | |
| 2011/0142045 A1 | 6/2011 | Ait-Ameur et al. | |
| 2012/0002683 A1 | 1/2012 | You et al. | |

(56) References Cited

U.S. PATENT DOCUMENTS

2012/0042222 A1 2/2012 Cha et al.
2012/0166401 A1 6/2012 Li et al.
2012/0167185 A1 6/2012 Menezes et al.
2012/0210066 A1 8/2012 Joshi et al.
2012/0275596 A1* 11/2012 Ureche ................ H04L 9/0822 380/47
2012/0278430 A1 11/2012 Lehane et al.
2013/0036328 A1 2/2013 Mutisya et al.
2013/0046983 A1 2/2013 Zhu et al.
2013/0055233 A1 2/2013 Hatton et al.
2013/0159447 A1 6/2013 Wei et al.
2013/0185234 A1 7/2013 Arora et al.
2013/0301641 A1 11/2013 Anand et al.
2013/0346842 A1 12/2013 Koara
2014/0095867 A1 4/2014 Smith et al.
2014/0136838 A1 5/2014 Mossbarger
2014/0161079 A1 6/2014 Noh et al.
2015/0074280 A1 3/2015 Gao et al.
2015/0081902 A1 3/2015 Verchere et al.
2015/0095253 A1 4/2015 Lim
2015/0095899 A1 4/2015 Carpenter et al.
2015/0143136 A1* 5/2015 Barney ................ H04L 9/3242 713/193
2015/0149559 A1 5/2015 Phillips et al.
2015/0156266 A1 6/2015 Gupta
2015/0170072 A1 6/2015 Grant et al.
2015/0244690 A1 8/2015 Mossbarger
2015/0249928 A1 9/2015 Alicot et al.
2015/0332283 A1 11/2015 Witchey
2016/0007325 A1 1/2016 Seok
2016/0021661 A1 1/2016 Yerramalli et al.
2016/0100396 A1 4/2016 Seok
2016/0113009 A1 4/2016 Seok
2016/0128625 A1 5/2016 Lee et al.
2016/0152532 A1 6/2016 Grüne et al.
2016/0164683 A1* 6/2016 Barney .................... H04L 9/14 713/189
2016/0182497 A1 6/2016 Smith
2016/0191345 A1 6/2016 Despotovic et al.
2016/0212246 A1 7/2016 Seok
2016/0217176 A1 7/2016 Haviv et al.
2016/0226870 A1 8/2016 Chiu et al.
2016/0232908 A1 8/2016 Fuchs et al.
2016/0260169 A1 9/2016 Arnold et al.
2016/0261685 A1 9/2016 Chen et al.
2016/0261690 A1 9/2016 Ford
2016/0275461 A1 9/2016 Sprague et al.
2016/0283920 A1 9/2016 Fisher et al.
2016/0321452 A1 11/2016 Richardson et al.
2016/0345349 A1 11/2016 Ferdowsi et al.
2016/0379212 A1 12/2016 Bowman et al.
2016/0380968 A1 12/2016 Sarwar et al.
2017/0006116 A1 1/2017 Kelly et al.
2017/0033984 A1 2/2017 Lear et al.
2017/0046638 A1 2/2017 Chan et al.
2017/0048048 A1 2/2017 Seok
2017/0063566 A1 3/2017 Seminario et al.
2017/0064708 A1 3/2017 Noh et al.
2017/0068530 A1 3/2017 Berrange
2017/0085486 A1 3/2017 Chung et al.
2017/0090755 A1 3/2017 Sun
2017/0094592 A1 3/2017 Tabatabaei et al.
2017/0132636 A1 5/2017 Caldera
2017/0149614 A1 5/2017 Zheng et al.
2017/0163733 A1 6/2017 Grefen et al.
2017/0180122 A1 6/2017 Smith et al.
2017/0180380 A1 6/2017 Bagasra
2017/0213209 A1 7/2017 Dillenberger
2017/0220928 A1 8/2017 Hajizadeh
2017/0235585 A1 8/2017 Gupta et al.
2017/0255452 A1 9/2017 Barnes et al.
2017/0269970 A1 9/2017 Bequet et al.
2017/0352027 A1 12/2017 Zhang et al.
2017/0366421 A1 12/2017 Dam et al.
2017/0372300 A1 12/2017 Dunlevy et al.
2018/0035351 A1 2/2018 Kodaypak
2018/0048000 A1 2/2018 Horde et al.
2018/0054853 A1 2/2018 Rios Almanza et al.
2018/0063250 A1 3/2018 Justin et al.
2018/0077057 A1 3/2018 Zaidi et al.
2018/0084000 A1 3/2018 Baukes et al.
2018/0088928 A1 3/2018 Smith et al.
2018/0115519 A1 4/2018 Bonomi et al.
2018/0116004 A1 4/2018 Britt et al.
2018/0117446 A1 5/2018 Tran et al.
2018/0137219 A1 5/2018 Goldfarb et al.
2018/0145836 A1 5/2018 Saur et al.
2018/0160429 A1 6/2018 Seok
2018/0181759 A1 6/2018 Smith et al.
2018/0183676 A1 6/2018 Lindsey et al.
2018/0183678 A1 6/2018 Rao et al.
2018/0247045 A1 8/2018 David et al.
2018/0254900 A1* 9/2018 Princen ................ H04L 9/0861
2018/0264347 A1 9/2018 Tran et al.
2018/0268386 A1 9/2018 Wack et al.
2018/0285217 A1 10/2018 Smith et al.
2018/0285879 A1 10/2018 Gadnis et al.
2018/0367298 A1* 12/2018 Wright ................. H04L 9/0861
2018/0373555 A1 12/2018 Gupta et al.
2019/0019096 A1 1/2019 Yoshida et al.
2019/0035018 A1 1/2019 Nolan et al.
2019/0036957 A1 1/2019 Smith et al.
2019/0087115 A1 3/2019 Li
2019/0104437 A1 4/2019 Bartfai-Walcott et al.
2019/0138294 A1 5/2019 Smith et al.
2019/0146778 A1 5/2019 Smith et al.
2019/0180291 A1 6/2019 Schmeling et al.
2019/0286984 A1 9/2019 Vasudevan et al.
2019/0313283 A1 10/2019 Bartfai-Walcott et al.
2019/0340716 A1 11/2019 Cella
2019/0342271 A1* 11/2019 Chilakapati ............ H04L 63/08
2019/0347548 A1 11/2019 Amizadeh et al.
2019/0349190 A1 11/2019 Smith et al.
2019/0349261 A1 11/2019 Smith et al.
2019/0349426 A1 11/2019 Smith et al.
2019/0349433 A1 11/2019 Smith et al.
2019/0349733 A1 11/2019 Nolan et al.
2019/0354837 A1 11/2019 Zhou et al.
2020/0012763 A1 1/2020 Arngren et al.
2020/0036519 A1 1/2020 Bitauld et al.
2020/0104715 A1 4/2020 Denolf et al.
2020/0143243 A1 5/2020 Liang et al.
2020/0193266 A1 6/2020 Scheidegger et al.
2020/0231386 A1 7/2020 Shiu et al.
2020/0234386 A1 7/2020 Blackman et al.
2020/0267163 A1 8/2020 Wilson
2020/0272909 A1 8/2020 Parmentier et al.
2021/0011708 A1 1/2021 Smith et al.
2021/0056378 A1 2/2021 Yang et al.
2021/0081763 A1 3/2021 Abdelfattah et al.
2021/0097443 A1 4/2021 Li et al.
2021/0110276 A1 4/2021 Chu et al.
2021/0110302 A1 4/2021 Nam et al.
2021/0126826 A1 4/2021 Nolan et al.
2021/0210066 A1 7/2021 Oohashi et al.
2021/0256511 A1 8/2021 Peacemaker et al.
2021/0349636 A1 11/2021 Gold et al.
2021/0390376 A1 12/2021 Byrne et al.
2022/0014423 A1 1/2022 Smith et al.
2022/0019880 A1 1/2022 Dasgupta et al.
2022/0036194 A1 2/2022 Sundaresan et al.
2022/0114251 A1 4/2022 Guim Bernat et al.
2022/0118966 A1 4/2022 Kagaya et al.
2022/0191648 A1 6/2022 Smith et al.
2022/0198260 A1 6/2022 Xue et al.
2022/0200851 A1 6/2022 Smith et al.
2022/0230048 A1 7/2022 Li et al.
2022/0255796 A1 8/2022 Smith et al.
2022/0284582 A1 9/2022 Yang et al.
2022/0286354 A1 9/2022 Smith et al.
2022/0294690 A1 9/2022 Nolan et al.
2022/0303181 A1 9/2022 Nolan et al.
2023/0110131 A1 4/2023 Smith et al.
2024/0007414 A1 1/2024 Jain et al.

(56) References Cited

U.S. PATENT DOCUMENTS

| | | | |
|---|---|---|---|
| 2024/0205080 | A1 | 6/2024 | Smith et al. |
| 2024/0220974 | A1 | 7/2024 | Wright et al. |
| 2025/0039041 | A1 | 1/2025 | Smith et al. |
| 2025/0220403 | A1 | 7/2025 | Smith et al. |

FOREIGN PATENT DOCUMENTS

| | | | | |
|---|---|---|---|---|
| CN | 105763423 | A | 7/2016 | |
| CN | 105763426 | B | 4/2018 | |
| CN | 102591946 | B | 6/2018 | |
| CN | 105404701 | B | 11/2018 | |
| CN | 110024422 | A | 7/2019 | |
| CN | 110050474 | A | 7/2019 | |
| CN | 110024330 | B | 6/2022 | |
| CN | 110024352 | B | 1/2023 | |
| DE | 112017006701 | T5 | 9/2019 | |
| EP | 2667541 | B1 | 8/2015 | |
| EP | 3257191 | B1 | 4/2018 | |
| EP | 3563521 | A1 | 11/2019 | |
| EP | 3563545 | A1 | 11/2019 | |
| EP | 3563596 | A1 | 11/2019 | |
| EP | 3639536 | A2 | 4/2020 | |
| EP | 2566204 | B1 | 1/2021 | |
| EP | 3563546 | B1 | 11/2021 | |
| EP | 3934203 | A1 | 1/2022 | |
| GB | 2549085 | A | 10/2017 | |
| JP | 2006253837 | A | 9/2006 | |
| JP | 2007133860 | A | 5/2007 | |
| JP | 2007202036 | A | 8/2007 | |
| JP | 2007264922 | A | 10/2007 | |
| JP | 2007299342 | A | 11/2007 | |
| JP | 2010020713 | A | 1/2010 | |
| JP | 2011186823 | A | 9/2011 | |
| JP | 2012083849 | A | 4/2012 | |
| JP | 2014082624 | A | 5/2014 | |
| JP | 2015536617 | A | 12/2015 | |
| JP | 2018516026 | A | 6/2018 | |
| JP | 2020503784 | A | 1/2020 | |
| JP | 7205994 | B2 | 1/2023 | |
| KR | 20130117436 | A | 10/2013 | |
| KR | 20190100177 | A | 8/2019 | |
| TW | 201621646 | A | 6/2016 | |
| TW | 201627874 | A | 8/2016 | |
| TW | 201835784 | A | 10/2018 | |
| WO | 0065800 | A1 | 11/2000 | |
| WO | 2004073281 | A2 | 8/2004 | |
| WO | WO-2004099953 | A2 * | 11/2004 | ........... H04L 9/0827 |
| WO | 2009141385 | A2 | 11/2009 | |
| WO | 2012018130 | A2 | 2/2012 | |
| WO | 2015126734 | A1 | 8/2015 | |
| WO | 2015130752 | A1 | 9/2015 | |
| WO | 2017066002 | A1 | 4/2017 | |
| WO | 2017145019 | A1 | 8/2017 | |
| WO | 2017187395 | A1 | 11/2017 | |
| WO | 2018064154 | A1 | 4/2018 | |
| WO | 2018125989 | A2 | 7/2018 | |
| WO | 2018126029 | A2 | 7/2018 | |
| WO | 2018126065 | A1 | 7/2018 | |
| WO | 2018126075 | A1 | 7/2018 | |
| WO | 2018126076 | A1 | 7/2018 | |
| WO | 2018126077 | A1 | 7/2018 | |
| WO | 2020065800 | A1 | 4/2020 | |
| WO | 2022016102 | A1 | 1/2022 | |

OTHER PUBLICATIONS

Ergen et al., "MAC Protocol Engine for Sensor Networks," 2009 IEEE Global Telecommunications Conference, GLOBECOM, Nov. 2009, 7 pages.

Fromknecht et al., "CertCoin: A NameCoin Based Decentralized Authentication System 6.857 Class Project," MIT, May 14, 2014, 19 pages.

Fromknecht et al; "A Decentralized Public Key Infrastructure with Identity Retention" Published in IACR Cryptology ePrint Archive, Nov. 2014, 16 pages.

Antonopoulos, "Mastering Bitcoin: Unlocking Digital Cryptocurrencies," Chapter 9, Dec. 20, 2014, O'Reilly Publishing, Tokyo Japan, 15 pages.

Hardjono et al., "Anonymous Identities for Permissioned Blockchains," Draft v06C, Retrieved From URL:[https://www.the-blockchain.com/docs/MIT-ChainAnchor-DRAFT.pdf], Jan. 24, 2016, 16 pages.

Lewis et al., "A gentle introduction to smart contracts," bitsonblocks, [https://bitsonblocks.net/2016/02/01/gentle-introduction-smart-contracts/] Feb. 1, 2016, retrieved Apr. 4, 2023, 18 pages.

Hardjono et al., "Verifiable Anonymous Identities and Access Control in Permissioned Blockchains," Draft, Apr. 17, 2016, retrieved from https://arxiv.org/pdf/1903.04584.pdf on Mar. 11, 2019, 9 pages.

Hardjono et al., "Cloud-Based Commissioning of Constrained Devices using Permissioned Blockchains," Proceedings of ACM IoT Privacy, Trust & Security—IoTPTS 2016 Xi'an, China, May 2016, 8 pages.

Ohashi et al.: "Proposal and Implementation of Information Registration Method for Digital Content SmartProperty", Research Report Security Psychology and Trust (SPT), vol. 2016-SPT-18, No. 3, May 5, 2016, 9 pages. [English Abstract included].

Christidis et al., "Blockchains and Smart Contracts for the Internet of Things," IEEE Special Section on the Plethora of Research in Internet of Things (IoT), vol. 4, dated May 10, 2016, 12 pages.

Ohashi et al., "A Registration Method for Digital Content Management Systems Utilizing Blockchains", The Institute of Electronics Information and Communication Engineers, dated May 27, 2016, 18 pages. [English Machine Translation Inlcuded].

Ali Dorri et al., "Blockchain in Internet of Things: Challenges and Solutions," Aug. 18, 2016, arXiv:1608.05187, 13 pages.

Drescher, "Blockchain Basics: A Non-Technical Introduction in 25 Steps," Chapter 24, Mar. 16, 2017, 6 pages.

International Searching Authority, "Written Opinion," issued in connection with International Patent Application No. PCT/US2017/068806, mailed on Mar. 21, 2018, 5 pages.

International Searching Authority, "International Search Report," issued in connection with International Patent Application No. PCT/US2017/068806, mailed on Mar. 21, 2018, 4 pages.

International Searching Authority, "International Search Report," issued in connection with International Patent Application No. PCT/US2017/068830, mailed on Mar. 22, 2018, 3 Pages.

International Searching Authority, "Written Opinion," issued in connection with International Patent Application No. PCT/US2017/068830, mailed on Mar. 22, 2018, 5 Pages.

International Searching Authority, "Written Opinion," issued in connection with International Patent Application No. PCT/US2017/068828, mailed on Mar. 29, 2018, 6 pages.

International Searching Authority, "International Search Report," issued in connection with International Patent Application No. PCT/US2017/068828, mailed on Mar. 29, 2018, 4 pages.

International Searching Authority, "Written Opinion," issued in connection with International Patent Application No. PCT/US2017/068832, mailed on May 17, 2018, 9 pages.

International Searching Authority, "International Search Report," issued in connection with International Patent Application No. PCT/US2017/068832, mailed on Jul. 5, 2018, 5 pages.

International Searching Authority, "International Search Report," issued in connection with International Patent Application No. PCT/US2017/068743, mailed on Jul. 5, 2018, 6 pages.

International Searching Authority, "Written Opinion," issued in connection with International Patent Application No. PCT/US2017/068743, mailed on Jul. 5, 2018, 8 pages.

International Searching Authority, "International Search Report," issued in connection with International Patent Application No. PCT/US2017/068683, mailed on Jul. 12, 2018, 7 pages.

International Searching Authority, "Written Opinion," issued in connection with International Patent Application No. PCT/US2017/068683, mailed on Jul. 12, 2018, 10 pages.

International Searching Authority, "International Preliminary Report on Patentability," issued in connection with International Patent Application No. PCT/US2017/068830, mailed on Jul. 11, 2019, 7 pages.

(56) References Cited

OTHER PUBLICATIONS

International Searching Authority, "International Preliminary Report on Patentability," issued in connection with International Patent Application No. PCT/US2017/068832, mailed on Jul. 11, 2019, 11 pages.
International Searching Authority, "International Preliminary Report on Patentability," issued in connection with International Patent Application No. PCT/US2017/068683, mailed on Jul. 11, 2019, 12 pages.
International Searching Authority, "International Preliminary Report on Patentability," issued in connection with International Patent Application No. PCT/US2017/068743, mailed on Jul. 11, 2019, 10 pages.
International Searching Authority, "International Preliminary Report on Patentability," issued in connection with International Patent Application No. PCT/US2017/068828, mailed on Jul. 11, 2019, 8 pages.
International Searching Authority, "International Preliminary Report on Patentability," issued in connection with International Patent Application No. PCT/US2017/068806, mailed on Jul. 11, 2019, 7 pages.
United States Patent and Trademark Office, "Non-Final Office Action," issued in connection with U.S. Appl. No. 16/467,002, mailed on Apr. 17, 2020, 8 pages.
United States Patent and Trademark Office, "Non-Final Office Action," issued in connection with U.S. Appl. No. 16/466,978, dated Jun. 26, 2020, 19 pages.
United States Patent and Trademark Office, "Non-Final Office Action," issued in connection with U.S. Appl. No. 16/466,987, mailed on Jul. 23, 2020, 28 pages.
United States Patent and Trademark Office, "Non-Final Office Action," issued in connection with U.S. Appl. No. 16/466,992, Aug. 21, 2020, 11 pages.
European Patent Office, "Communication pursuant to Article 94(3) EPC," issued in connection with European Patent Application No. 17832879.5, dated Oct. 26, 2020, 5 pages.
European Patent Office, "Communication pursuant to Article 94(3) EPC," issued in connection with European Patent Application No. 17835976.6-1218, Oct. 26, 2020, 6 pages.
United States Patent and Trademark Office, "Final Office Action," issued in connection with U.S. Appl. No. 16/467,002, mailed on Oct. 29, 2020, 5 pages.
Intellectual Property India, Government of India, "Examination Report under sections 12 & 13 of the Patents Act, 1970 and the Patents Rules, 2003," issued in connection with Indian Patent Application No. 201947022378, dated Jan. 6, 2021, 6 pages.
United States Patent and Trademark Office, "Notice of Allowance and Fee(s) Due," issued in connection with U.S. Appl. No. 16/466,987, mailed on Jan. 15, 2021, 10 pages.
United States Patent and Trademark Office, "Advisory Action," issued in connection with U.S. Appl. No. 16/467,002, mailed on Jan. 22, 2021, 3 pages.
United States Patent and Trademark Office, "Corrected Notice of Allowability," issued in connection with U.S. Appl. No. 16/466,987, dated Feb. 4, 2021, 2 pages.
European Patent Office, "Communication pursuant to Article 94(3) EPC," issued in connection with European Patent Application No. 17835980.8-1218, Mar. 29, 2021, 4 pages.
European Patent Office, "Communication pursuant to Article 94(3) EPC," issued in connection with European Patent Application No. 17832873.8-1218, Mar. 29, 2021, 5 pages.
United States Patent and Trademark Office, "Notice of Allowance and Fee(s) Due," issued in connection with U.S. Appl. No. 16/466,992, dated Apr. 1, 2021, 5 pages.
United States Patent and Trademark Office, "Non-Final Office Action," issued in connection with U.S. Appl. No. 16/466,997, dated Apr. 13, 2021, 25 pages.
United States Patent and Trademark Office, "Notice of Allowance", issued in connection with U.S. Appl. No. 16/466,992, Apr. 19, 2021, 7 pages.
United States Patent and Trademark Office, "Final Office Action," issued in connection with U.S. Appl. No. 16/466,978, dated May 28, 2021, 10 pages.
United States Patent and Trademark Office, "Non-Final Office Action," issued in connection with U.S. Appl. No. 16/467,002, mailed on May 13, 2021, 9 pages.
Japanese Patent Office, "Decision to Grant a Patent" issued in connection with Japanese Patent Application No. 2022-210951, dated Sep. 10, 2024, 5 pages [English Translation Included].
United States Patent and Trademark Office, "Notice of Allowance and Fee(s) Due," issued in connection with U.S. Appl. No. 17/898,227, dated Sep. 25, 2024, 8 pages.
The State Intellectual Property Office of People's Republic of China, "Decision on Rejection" mailed in connection with Chinese Patent Application No. 202111034096.X, dated Nov. 1, 2024, 8 pages. [English Translation included].
Japanese Patent Office, "Written Opinion," issued in connection with Japanese Patent Application No. 2022-210951, dated Jun. 12, 2024, 14 pages. [English translation included].
European Patent Office, "Intention to Grant a European Patent Pursuant to Article 73(1) EPC," issued in connection with European Patent Application No. 17835980.8, dated Mar. 13, 2025, 5 pages.
European Patent Office, "Communication under Rule 97(1) EPC—Decision to Grant," issued in connection with European Patent Application No. 17835558.2, dated May 2, 2025, 2 pages.
European Patent Office, "Decision to Grant a European Patent Pursuant to Article 97(1) EPC," issued in connection with European Patent Application No. 17835980.8, dated Jul. 10, 2025, 2 pages.
Intellectual Property of India, "Intimation of grant," issued in connection with Indian Patent Application No. 201947022378, dated Jul. 19, 2023, 1 page.
Korean Intellectual Property Office, "Request for the Submission of an Opinion," issued in connection with Korean Patent Application No. 20197015664, issued on Sep. 4, 2023, 14 pages. [English translation included].
The State Intellectual Property Office of People's Republic of China, "First Office Action," mailed in connection with Chinese Patent Application No. 202111034096.X, dated Sep. 26, 2023, 8 pages. [English Translation included].
United States Patent and Trademark Office, "Notice of Allowance and Fee(s) Due," issued in connection with U.S. Appl. No. 17/542,206, mailed on Sep. 25, 2023, 9 pages.
European Patent Office, "Communication pursuant to Article 94(3) EPC," issued in connection with European Patent Application No. 21193365.0-1218, dated Oct. 5, 2023, 5 pages.
European Patent Office, "Communication pursuant to Article 94(3) EPC," issued in connection with European Patent Application No. 17835980.8-1218, dated Oct. 12, 2023, 5 pages.
United States Patent and Trademark Office, "Notice of Allowance and Fee(s) Due", issued in connection with U.S. Appl. No. 17/702,488, dated Oct. 20, 2023, 9 pages.
United States Patent and Trademark Office, "Corrected Notice of Allowability," issued in connection with U.S. Appl. No. 17/542,206, dated Jan. 10, 2024, 2 pages.
Korean Intellectual Property Office, "Written Decision on Registration," issued in connection with Korean Patent Application No. 12019-7015664, issued on Jan. 16, 2024, 6 pages. [English Translation Included].
European Patent Office, "Communication under Rule 71(3) EPC—Intention to Grant," issued in connection with European Patent Application No. 17835976.6-1218, dated Feb. 9, 2024, 10 pages.
European Patent Office, "Communication under Rule 71(3) EPC—Intention to Grant," issued in connection with European Patent Application No. 17835976.6, dated Feb. 20, 2024, 10 pages.
European Patent Office, "Communication under Rule 71(3) EPC," issued in connection with European Patent Application No. 17832873.8, dated Feb. 20, 2024, 9 pages.
Intellectual Property of Office of India, "Examination report under sections 12 & 13 of the Patents Act, 1970 and the Patents Rules, 2003," issued in connection with Indian Patent Application No. 202348036571, dated Mar. 6, 2024, 5 pages.

(56) References Cited

OTHER PUBLICATIONS

Japanese Patent Office, "Notice of Reasons for Refusal," issued in connection with Japanese Patent Application No. 2022-210951, dated Mar. 19, 2024, 15 pages. [English translation included].
The State Intellectual Property Office of People's Republic of China, "Second Office Action," mailed in connection with Chinese Patent Application No. 202111034096.X, dated Apr. 3, 2024, 9 pages. [English Translation included].
European Patent Office, "Decision to Grant," issued in connection with European Patent Application No. 17835976.6, dated May 31, 2024, 2 pages.
European Patent Office, "Decision to Grant," issued in connection with European Patent Application No. 17832873.8, dated Jun. 20, 2024, 2 pages.
United States Patent and Trademark Office, "Notice of Allowance and Fee(s) Due," issued in connection with U.S. Appl. No. 17/702,463, dated Jun. 26, 2024, 8 pages.
The State Intellectual Property Office of People's Republic of China, "Third Office Action," mailed in connection with Chinese Patent Application No. 202111034096.X, dated Aug. 5, 2024, 9 pages. [English Translation included].
The State Intellectual Property Office of People's Republic of China, "First Office Action and Search Report," issued in connection with Chinese Patent Application No. 201780074262.4, dated Jun. 9, 2021, 14 pages. [English translation included].
European Patent Office, "Communication pursuant to Article 94(3) EPC," issued in connection with European Patent Application No. 17835976.6-1218, Jun. 11, 2021, 4 pages.
European Patent Office, "Communication under Rule 164(2)(b) and Article 94(3) EPC," issued in connection with European Patent Application No. 17835558.2, dated Jun. 16, 2021, 9 pages.
European Patent Office, "Communication under Rule 71(3) EPC—Intention to Grant," issued in connection with European Patent Application No. 17832879.5, dated Jul. 9, 2021, 8 pages.
United States Patent and Trademark Office, "Notice of Allowance and Fee(s) Due," issued in connection with U.S. Appl. No. 16/466,997, dated Aug. 5, 2021, 8 pages.
United States Patent and Trademark Office, "Notice of Allowance and Fee(s) Due," issued in connection with U.S. Appl. No. 16/466,992, dated Aug. 9, 2021, 2 pages.
United States Patent and Trademark Office, "Corrected Notice of Allowability," issued in connection with U.S. Appl. No. 16/466,987, dated Aug. 2, 2021, 3 pages.
United States Patent and Trademark Office, "Requirement for Restriction / Election," issued in connection with U.S. Appl. No. 16/466,982, dated Aug. 27, 2021, 5 pages.
United States Patent and Trademark Office, "Advisory Action," issued in connection with U.S. Appl. No. 16/466,978, dated Sep. 7, 2021, 2 pages.
Taiwan Intellectual Property Office, "Letter of Examination Opinion & Search Report," issued in connection with Taiwanese Patent Application No. 106146289, dated Oct. 4, 2021, 22 Pages. [English machine translation included].
European Patent Office, "Decision to Grant a European patent pursuant to Article 97(1) EPC," issued in connection with European Application No. 17832879.5, dated Oct. 14, 2021, 2 pages.
The State Intellectual Property Office of People's Republic of China, "First Office Action and First Search," mailed in connection with Chinese Patent Application No. 201780074400.9, dated Nov. 3, 2021, 14 pages. [English Translation included].
Japanese Patent Office, "Search Report by Registered Search Organization," issued in connection with Japanese Patent Application No. 2019-535869, dated Nov. 10, 2021, 54 pages. [English translation included].
European Patent Office, "Search Report," issued in connection with European Patent Application No. 21193365.0, dated Nov. 11, 2021, 8 pages.
United States Patent and Trademark Office, "Notice of Allowance and Fee(s) Due," issued in connection with U.S. Appl. No. 16/466,982, dated Nov. 17, 2021, 7 pages.
United States Patent and Trademark Office, "Notice of Allowance and Fee(s) Due," issued in connection with U.S. Appl. No. 17/033,639, dated Nov. 24, 2021, 8 pages.
United States Patent and Trademark Office, "Notice of Allowance," issued in connection with U.S. Appl. No. 16/467,002, mailed on Dec. 2, 2021, 10 pages.
United States Patent and Trademark Office, "Notice of Allowance," issued in connection with U.S. Appl. No. 16/467,002, mailed on Dec. 14, 2021, 2 pages.
Japanese Patent Office, "Notice of Reasons for Refusal," issued in connection with Japanese Patent Application No. 2019-535869, Dec. 21, 2021, 16 pages. [English translation included].
United States Patent and Trademark Office, "Notice of Allowance and Fee(s) Due," issued in connection with U.S. Appl. No. 16/466,978, dated Dec. 22, 2021, 12 pages.
The State Intellectual Property Office of People's Republic of China, "Second Office Action and Supplementary Search," mailed in connection with Chinese Patent Application No. 201780074262.4, dated Jan. 21, 2022, 14 pages. [English Translation included].
United States Patent and Trademark Office, "Corrected Notice of Allowability," issued in connection with U.S. Appl. No. 17/033,639, dated Jan. 24, 2022, 3 pages.
Taiwan Intellectual Property Office, "Notice of Allowance," issued in connection with Taiwanese Patent Application No. 106146289, dated Feb. 11, 2022, 4 pages. [English machine translation included].
United States Patent and Trademark Office, "Corrected Notice of Allowability," issued in connection with U.S. Appl. No. 17/033,639, mailed on Mar. 4, 2022, 3 pages.
European Patent Office, "Communication pursuant to Article 94(3) EPC," issued in connection with European Patent Application No. 17835976.6-1218, Mar. 17, 2022, 5 pages.
The State Intellectual Property Office of People's Republic of China, "Notice of grant patent right for invention," mailed in connection with Chinese Patent Application No. 201780074400.9, dated Apr. 1, 2022, 3 pages. [English Translation included].
The State Intellectual Property Office of People's Republic of China, "First Office Action and First Search," mailed in connection with Chinese Patent Application No. 201780074210.7, dated Apr. 15, 2022, 15 pages. [English translation included].
United States Patent and Trademark Office, "Notice of Allowance and Fee(s) Due," issued in connection with U.S. Appl. No. 16/466,978, dated May 3, 2022, 12 pages.
European Patent Office, "Communication pursuant to Article 94(3) EPC," issued in connection with European Patent Application No. 17835980.8-1218, May 4, 2022, 5 pages.
European Patent Office, "Communication pursuant to Article 94(3) EPC," issued in connection with European Patent Application No. 17832873.8-1218, May 16, 2022, 6 pages.
The State Intellectual Property Office of People's Republic of China, "Third Office Action and Supplementary Search," mailed in connection with Chinese Patent Application No. 201780074262.4, dated Jul. 8, 2022, 15 pages. [English Translation included].
Japanese Patent Office, "Notice of Reasons for Refusal," issued in connection with Japanese Patent Application No. 2019-535869, Aug. 9, 2022, 6 pages. [English translation included].
The State Intellectual Property Office of People's Republic China, "First Office Action and Supplementary Search," issued in connection with Chinese Patent Application No. 201780074114.2, dated Sep. 5, 2022, 11 pages. [English Machine translation included].
The State Intellectual Property Office of People's Republic of China, "Second Office Action," issued in connection with Chinese Patent Application No. 201780074210.7, dated Sep. 26, 2022, 15 Pages. [English translation included].
United States Patent and Trademark Office, "Non-Final Office Action," issued in connection with U.S. Appl. No. 17/702,488, dated Sep. 28, 2022, 9 pages.
European Patent Office, "Communication pursuant to Article 94(3)EPC," in connection with European Patent Application No. 17835558.2, issued on Oct. 12, 2022, 5 pages.
The State Intellectual Property Office of People's Republic of China, "Notice of grant of patent right for invention," mailed in connection with Chinese Patent Application No. 201780074262.4, dated Oct. 26, 2022, 3 pages. [English Translation included].

(56) References Cited

OTHER PUBLICATIONS

Japanese Patent Office, "Decision to Grant a Patent," issued in connection with Japanese Patent Application No. 2019-535869, Nov. 21, 2022, 5 pages. [English translation included].
United States Patent and Trademark Office, "Notice of Allowance and Fee(s) Due," issued in connection with U.S. Appl. No. 17/459,653, dated Dec. 14, 2022, 8 pages.
United States Patent and Trademark Office, "Non-Final Office Action," issued in connection with U.S. Appl. No. 17/713,139, dated Jan. 12, 2023, 11 Pages.
The State Intellectual Property Office of People's Republic of China, "Decision of Rejection," issued in connection with Chinese Patent Application No. 201780074210.7, dated Jan. 19, 2023, 10 pages. [English translation included].
Taiwan Intellectual Property Office, "Notice of preliminary review opinion and Search report," issued in connection with Taiwanese Patent Application No. 111117966, dated Feb. 4, 2023, 6 pages. [English Machine Translation included].
Korean Intellectual Property Office, "Request for the Submission of an Opinion," issued in connection with Korean Patent Application No. 10-2019-7015664, dated Mar. 15, 2023, 12 Pages. [English Translation Included].
United States Patent and Trademark Office, "Corrected Notice of Allowability," issued in connection with U.S. Appl. No. 17/459,653, dated Mar. 22, 2023, 2 pages.
Intellectual Property of India, "Hearing Notice," issued in connection with Indian Patent Application No. 201947022378, dated Mar. 23, 2023, 3 pages.
United States Patent and Trademark Office, "Non-Final Office Action," in connection with U.S. Appl. No. 17/542,206, issued Apr. 27, 2023, 17 pages.
The State Intellectual Property Office of People's Republic of China, "Notice to Grant Patent Right for Invention," issued in connection with Chinese Patent Application No. 201780074114.2, dated Apr. 28, 2023, 3 pages. [English Translation Included].
United States Patent and Trademark Office, "Notice of Allowance and Fee(s) Due," issued in connection with U.S. Appl. No. 17/713,139, dated May 18, 2023, 7 Pages.
Taiwanese Patent Office, "Notice of Allowance," issued in connection with Taiwan Patent Application No. 111117966, dated May 22, 2023, 3 pages. [English translation included].
United States Patent and Trademark Office, "Final Office Action," in connection with U.S. Appl. No. 17/702,488, issued May 25, 2023, 7 pages.
United States Patent and Trademark Office, "Non-Final Office Action," issued in connection with U.S. Appl. No. 18/913,652, dated Mar. 12, 2026, 12 pages.
China National Intellectual Property Administration, "Review Decision," issued in connection with Chinese Patent Application No. 201780074210.7, dated Jun. 17, 2024, 28 pages. [English machine translation included.].
China National Intellectual Property Administration, "The Third Office Action (Notice of Review)," issued in connection with Chinese Patent Application No. 201780074210.7, dated Mar. 19, 2024, 20 pages. [English machine translation included.].
European Patent Office, "Communication under Rule 71(3) EPC—Intention to Grant," issued in connection with European Patent Application No. 17835558.2, dated Jan. 9, 2025, 9 pages.
European Patent Office, "Communication Pursuant to Article 94(3) EPC," issued in connection with European Patent Application No. 21193365.0, dated Feb. 2, 2026, 5 pages.

* cited by examiner 102
104
126
130
128
124
T3
138
106
T2
136
110
134
T1
108
114
112
116
118
120
119
122
100

200

300

400

604
608
602
606
600

800

900

1200

1300

1700

1800

2200

2300

2400

2700

2800

2900

3300

3700

3802

Floating Service

3800

| Feature | How Important? | Host #1 | Host #2 | Host #3 |
|---|---|---|---|---|
| Availability > 98% | Required (10) | 10 | 5 | 10 |
| AES Present | Preferable (7) | 3 | 7 | 7 |
| SGX Present | Not Needed (0) | 0 | 0 | 0 |
| TXT Present | Preferable (5) | 0 | 0 | 5 |
| Disk Space > 10Gb | Required (10) | 4 | 10 | 10 |
| Memory > 16Gb | Required (10) | 5 | 10 | 10 |
| Response Time <3 sec | Desirable (8) | 0 | 3 | 0 |
| Multinode = Yes | Preferable (5) | 0 | 5 | 5 |
| Tenancy = Shared | Don't Mind (2) | 2 | 1 | 2 |
| ... | | | | |
| ... | | | | |
| Cost (per hr) | | 0.004 | 0.012 | 0.014 |
| Possible? | | Rejected | Possible | Acceptable |
| Decision Score (Value) | | 0.00016667 | 0.00029268 | 0.000285714 |

| Node/ Location[+] | Type | Bin | % Non Events | % of Events | WoE $\log_n$(% Non-Events / % Events) | Div | Cacq ($IC) |
|---|---|---|---|---|---|---|---|
| 001/FS-URI | RAW-CO2 | 1 | 5% | 6% | -0.0952 | 0.0005 | 0.5 |
| 001/FS-URI | RAW-CO2 | 2 | 12% | 10% | 0.2002 | 0.0045 | 0.5 |
| 001/FS-URI | RAW-CO2 | 3 | 13% | 12% | 0.1522 | 0.0029 | 0.5 |
| 001/FS-URI | RAW-CO2 | 4 | 16% | 15% | 0.0774 | 0.0009 | 0.5 |
| 001/FS-URI | RAW-CO2 | 5 | 17% | 16% | 0.0401 | 0.0003 | 0.5 |
| 001/FS-URI | RAW-CO2 | 6 | 16% | 16% | -0.0236 | 0.0001 | 0.5 |
| 001/FS-URI | RAW-CO2 | 7 | 38% | 12% | 1.1379 | 0.2926 | 0.5 |
| 001/FS-URI | RAW-CO2 | 8 | 5% | 7% | -0.4123 | 0.0095 | 0.5 |
| 001/FS-URI | RAW-CO2 | 9 | 5% | 6% | -0.2123 | 0.0025 | 0.5 |
| | Total: | | | | | 0.3138 | |

SERVICE PROVISION TO IoT DEVICES

CROSS REFERENCE TO RELATED APPLICATION

This patent arises from a continuation of U.S. patent application Ser. No. 17/702,488 (now U.S. Pat. No. 11,816,689) which was filed on Mar. 23, 2022, which is a continuation of U.S. patent application Ser. No. 16/467,002, (now U.S. Pat. No. 11,296,935) which was filed on Jun. 6, 2019, which is a national stage entry of International Application No. PCT/US2017/068832, which was filed on Dec. 28, 2017, which claims the benefit of U.S. Provisional Patent Application No. 62/441,070, which was filed on Dec. 30, 2016. U.S. patent application Ser. No. 16/467,002, International Patent Application No. PCT/US2017/068832, and U.S. Provisional Patent Application 62/441,070 are hereby incorporated herein by reference in their entireties. Priority to U.S. patent application Ser. No. 16/467,002, International Patent Application No. PCT/US2017/068832, and U.S. Provisional Patent Application 62/441,070 is hereby claimed.

TECHNICAL FIELD

The present techniques relate generally to Internet of Things (IoT) devices. More specifically the present techniques relate to devices that can perform remote sensing and actuation functions.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

FIG. 38 is a schematic diagram of an example floating service data structure to manage a floating service and the options, conditions and terms in accordance with some embodiments.

FIG. 44 is a schematic diagram of an example data structure to assess and assign a value to a unit of data in accordance with some embodiments.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Internet-of-Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QOS) terms specified in service level and service delivery agreements. The use of IoT devices and networks present a number of new challenges in a heterogeneous network of connectivity including a combination of wired and wireless technologies as depicted in FIGS. 1 and 2.

Figure 1:
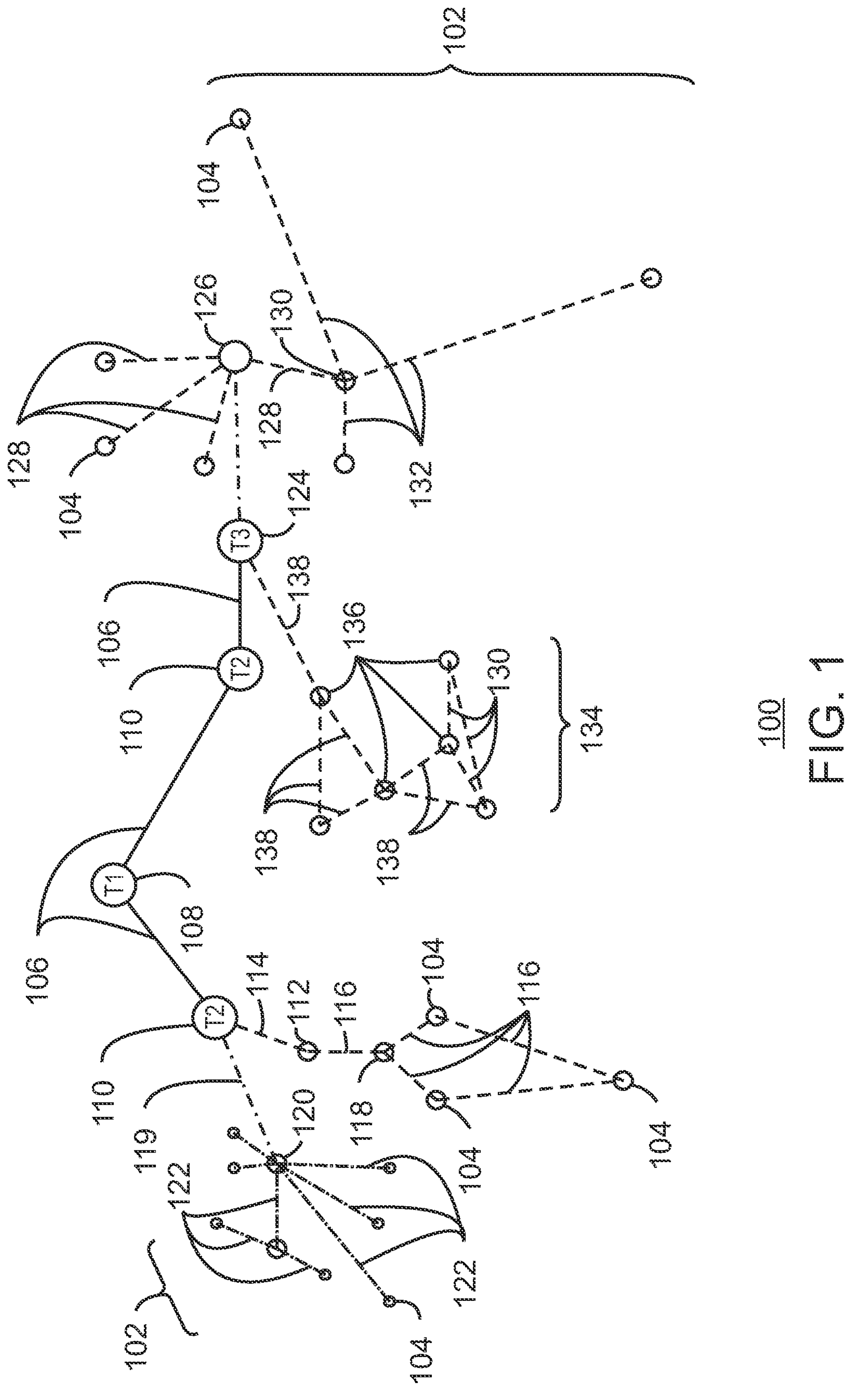
FIG. 1 is a drawing of interconnections that may be present in the Internet in accordance with some embodiments.
Figure 2:
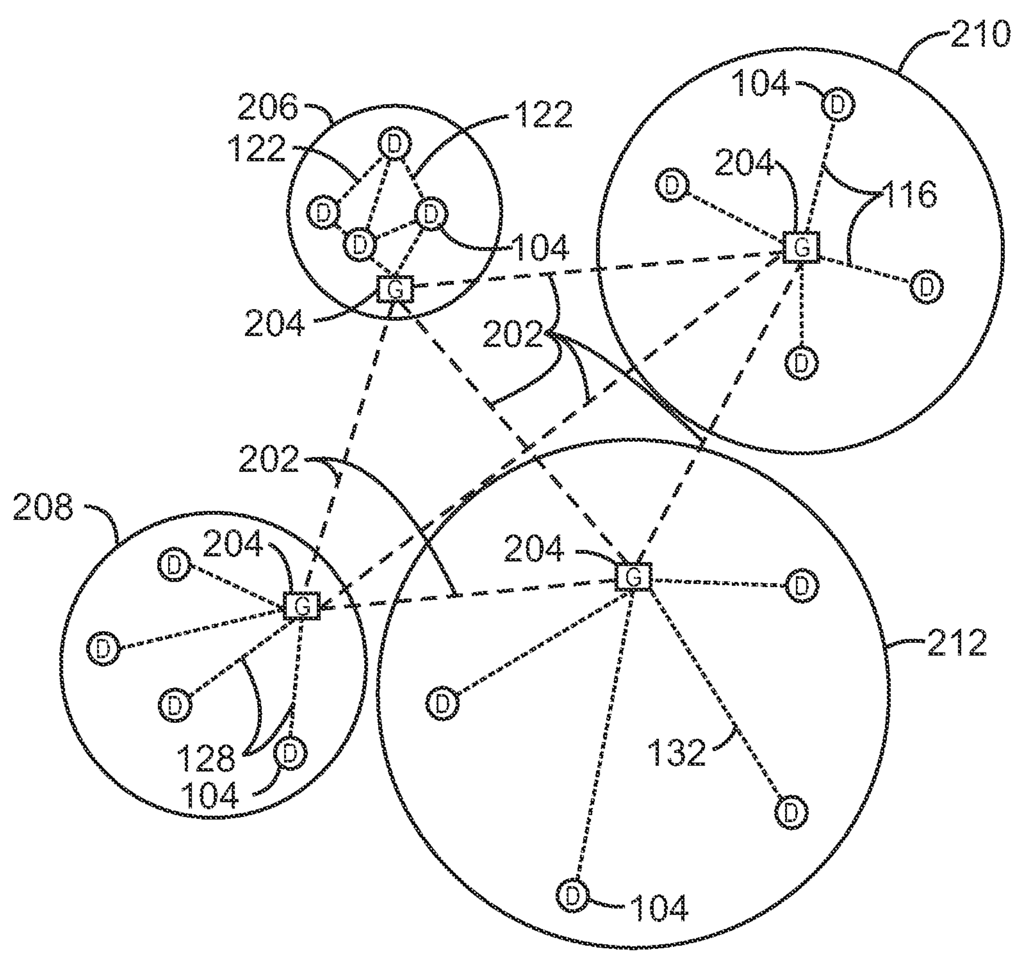
FIG. 2 is a drawing of a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 10.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QOS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each.

Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
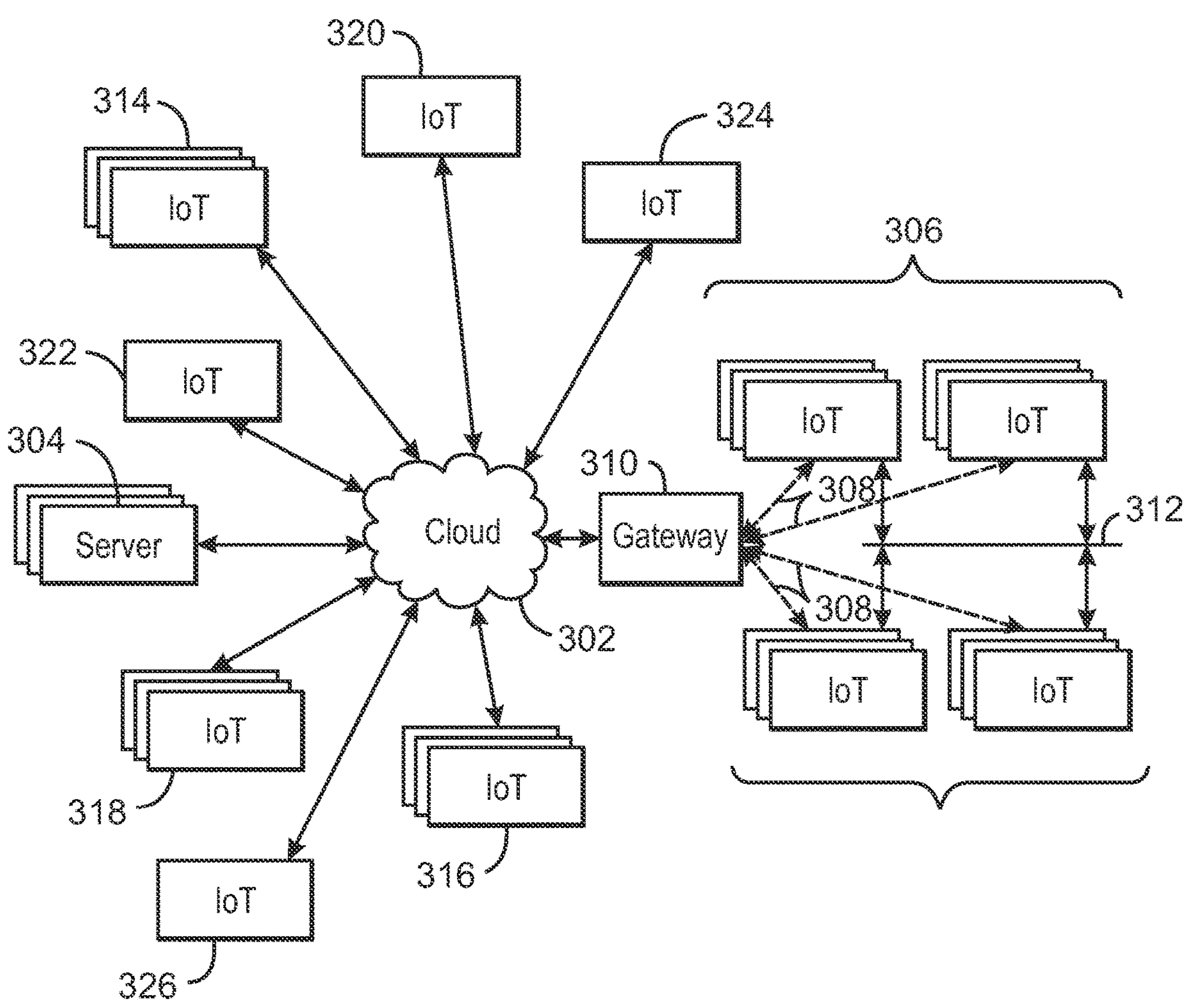
FIG. 3 is a drawing of a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
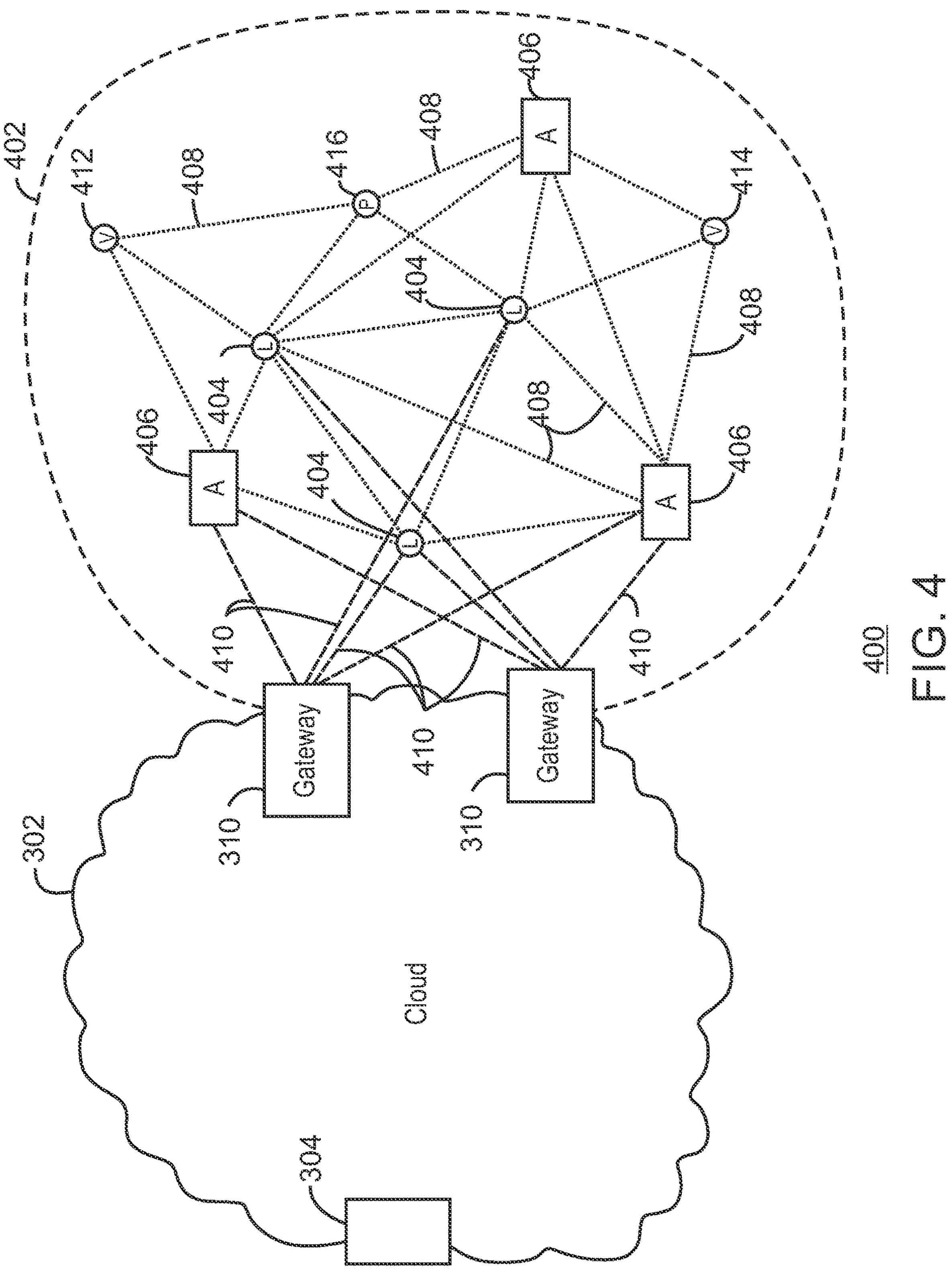
FIG. 4 is a drawing of a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, traffic analyses, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC)

standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Figure 5:
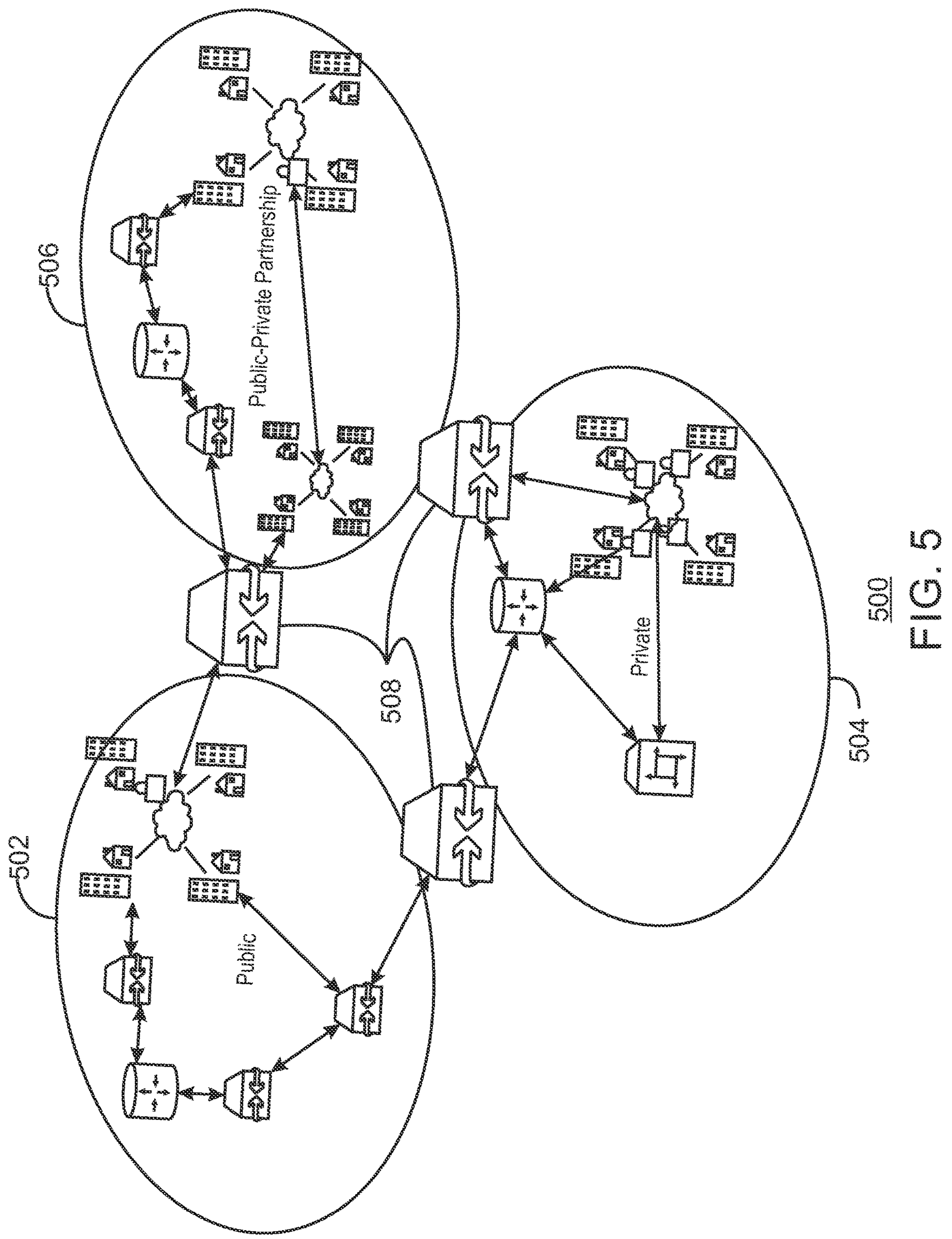
FIG. 5 is a schematic drawing illustrating interoperability across public domains, private domains, and public-private domains in accordance with some embodiments.

FIG. 5 is a schematic drawing 502 illustrating interoperability across public domains 502, private domains 504, and public-private domains 506 in accordance with some embodiments. The network topology may be in a continuous state of change, making any attempt at permanent maps impossible. Accordingly, IoT devices may use the backbone resources, such as domain name servers (DNS) to send packets between domains. The packets may be routed between the domains 502, 504, and 506 through the Internet backbone, shown as routers 508.

In some aspects, the routers 508 provide the edge connections that couple the domains to one another. As described herein, any number of services may be provided at the edges of the domains 502, 504, and 506 to enhance the interconnectivity. For example, interconnections between the public domain 502 and the private domains 504 may provide opportunities for micropayments for domain access, explicit permission and tracking for domain access, and the separation of public and private traffic, among others. Similarly, interconnections between the public domain 502 and the public-private domain 506 may provide opportunities for services such as time-based leases, resource marketplaces, and distributed identity servers, among others. Interconnections between the private domains 504 and the public-private domains 506 may provide opportunities for inline service interconnects, behavior based threat analysis, and proof-of-provenance, among others.

Figure 6:
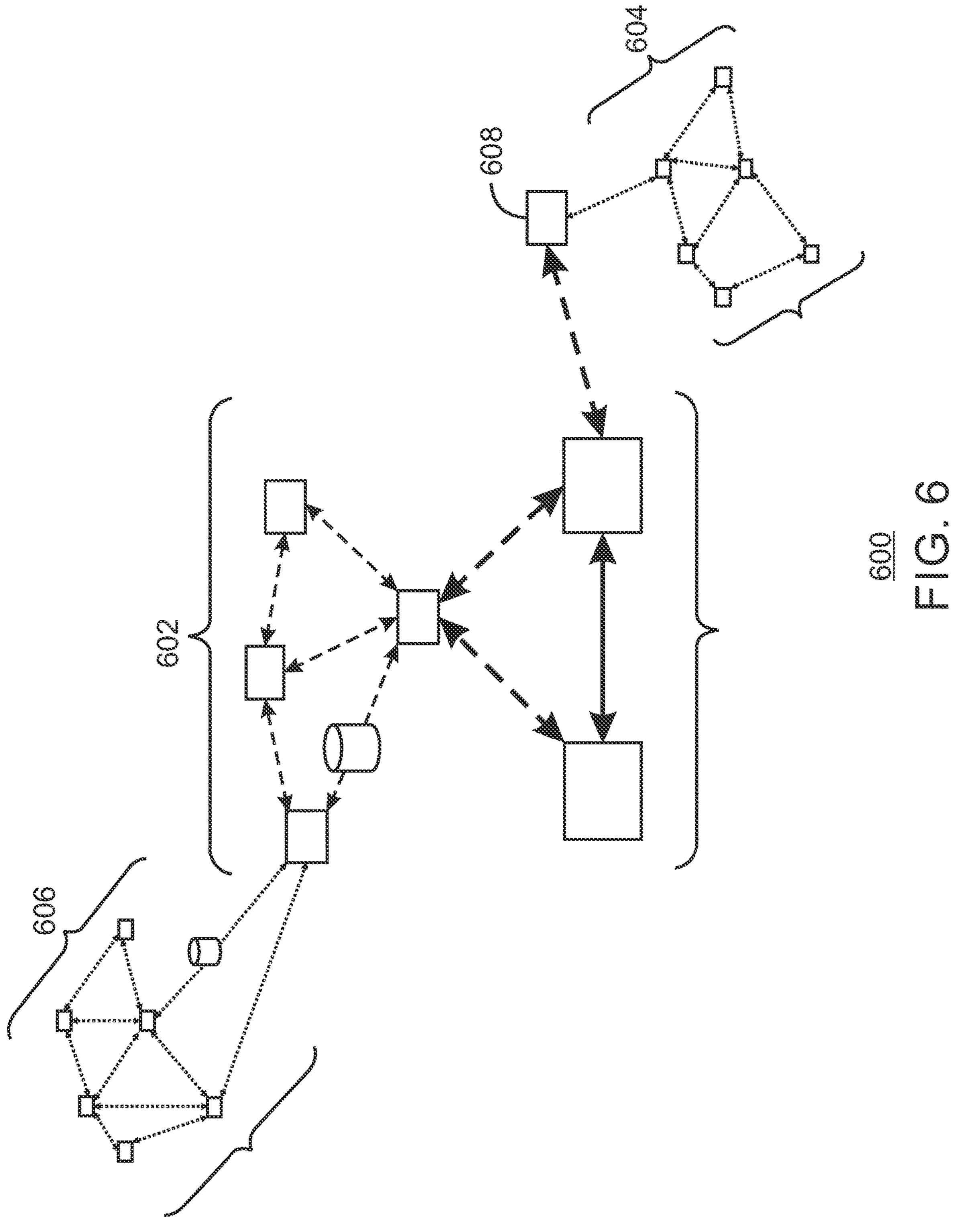
FIG. 6 is a schematic drawing of interoperability across a heterogeneous network of wired networks and wireless networks in accordance with some embodiments.

FIG. 6 is a schematic drawing of interoperability across a heterogeneous 600 network of wired networks 602 and wireless networks 604 and 606 in accordance with some embodiments. The wireless networks 604 and 606 may be communicatively coupled by devices in the wired network 602. This provides opportunities for efficiency improvements in communications between devices in the wireless networks 604 and 606, as well as improvements in communications between devices in a wireless network 604 or 606 and a device in the wired network 602. For example, edge device 608 coupling a first wireless network 604 to the wired network 602 may provide a data to information transform to reduce the size of the payload. Further, the edge device 608 may have a permissioning system that allows packets from the first wireless network 604 to pass, while blocking unpermitted packets from transferring. The permissioning system may include systems to make micropayments to allow the information to move across the wired network 602. As an example, the first wireless network 604 may be a ground moisture sensor array on an agricultural site. The reporting frequency may depend on the rate of change, which may increase costs due to the need to purchase bandwidth to match the highest reporting rate. Thus, a micropayment system may lower costs by allowing transactions to paid for on an as-needed basis.

Figure 7:
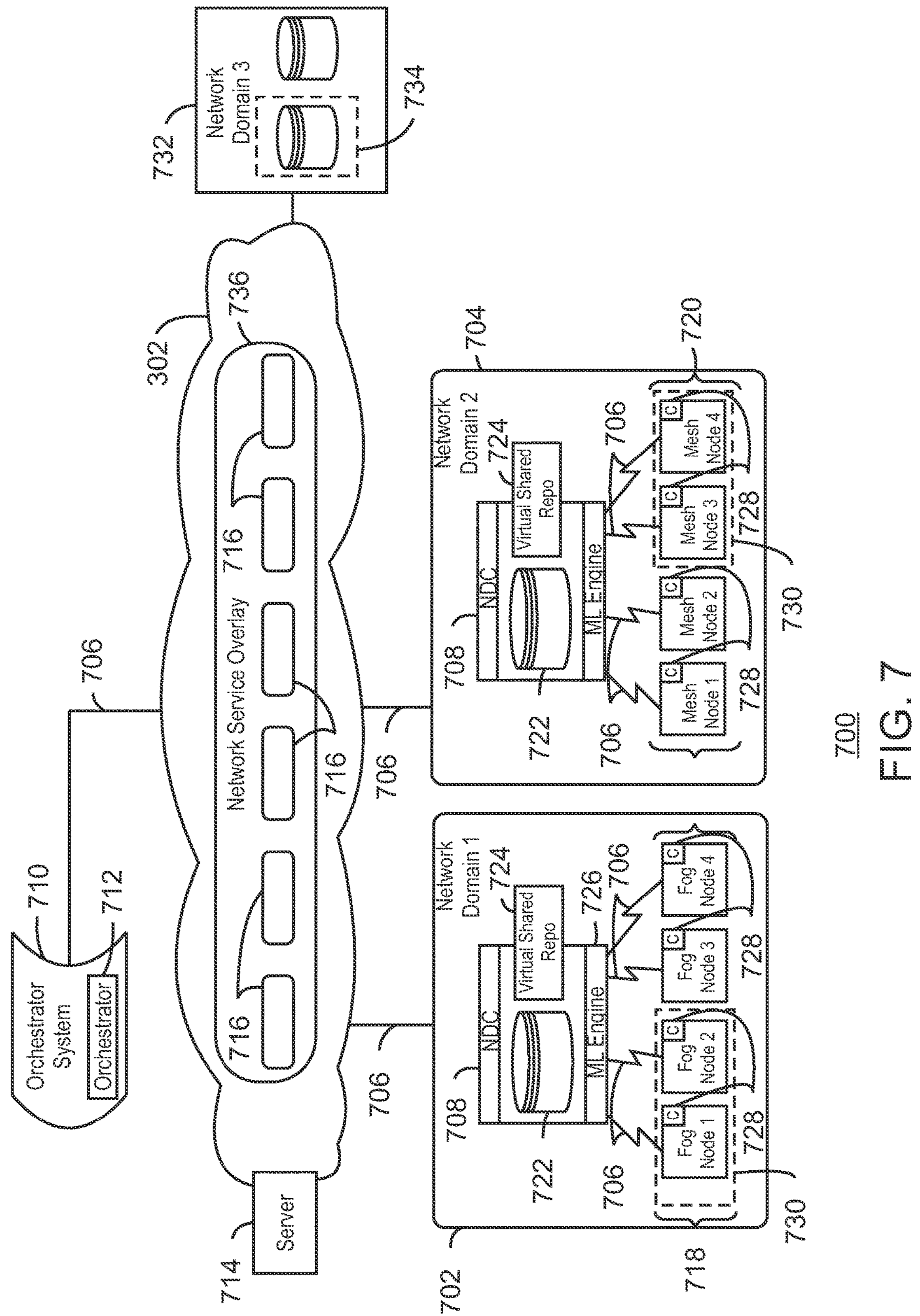
FIG. 7 is a schematic diagram of a service network overlay function across a heterogeneous network in accordance with some embodiments.

FIG. 7 is a schematic diagram of a service network overlay function across a heterogeneous network (HetNet) 700 in accordance with some embodiments. The technique allows the creation of service chains across heterogeneous networks, which may allow for the automatic provisioning and reconfiguration of IoT devices in a fog or mesh network. For example, IoT devices may be functionally clustered to form a service, such as a temporary virtual or fog device, as described with respect to FIG. 4. In the HetNet, network 700, domains 702 and 704 may include IoT devices that may be grouped together to perform a particular function, such as a traffic control function at an intersection. The devices may be connected to each other, and to the cloud 302, through any numbered of wired and wireless links 706.

A network domain 702 or 704 may include a network domain controller (NDC) 708, or service coordinator, which runs on a device within the network domain 702 or 704. The NDC 708 may be dynamically moved to a network domain 702 or 704 or may be pre-installed on the device prior to deployment. The NDC 708 may communicate with a higher level orchestrating system 710. The NDC 708 may act as a service coordinator, identifying units or components that may participate in the service. It may be noted that other devices may act as the service coordinator, such as endpoint IoT devices, data aggregators, devices in the cloud 302, or devices in other network domains 702 or 704.

Service management requests to perform a service, or create a fog device to perform a service, may be passed to the NDC 708 from an orchestrator 712. Although shown as part of the higher level orchestrating system 710, the orchestrator 712 may be located in another unit in the cloud, such as a gateway interface to the domain 702 or 704, a server 714 acting as a data consumer, or in the NDC 708.

Management applications in the orchestrator 712 may include the creation, updating, deletion, and migration of network service overlays 716. The network service overlays 716 may function as microprograms, for example, code segments designed to complete a specific task, such as obtaining a temperature from a location, or increasing traffic flow in one direction along a road, among others. Further, the network service overlays 716 may function at higher levels, including code sequences for a service that include a number of calls to lower level network service overlays 716.

The orchestrator 712 may decompose the service, or virtual service network, into network service elements that may be completed by associated network service overlays 716. An NDC 708 that is registered with the orchestrator 716 may submit a provider request to the orchestrator 712 to provide the resources, such as network service overlays or devices in the other domain 702 or 704, to satisfy one or many of the service elements for a service management request.

After the NDC 708 is acknowledged by the orchestrator 712 as being a service coordinator, it is responsible for fulfilling the service request, for example, managing the network service elements providing the service. As used herein, a network service element may be a code operated component of a system to provide data for the service. Multiple network service elements may be grouped together to provide a service, which may be a fog device 402, as described with respect to FIG. 4. It can be noted that a network service element may include a node 718 or 720, a single sensor from a node 718 or 720, a program running on a unit, such as a data aggregator 406, or any number of other physical or virtual devices or systems.

An NDC 708 in the first domain 702 may also communicate with an NDC 708 in the second domain 704, for example, when a service will include devices from multiple network domains. The NDC 708 may use a database 722 to store data and meta-data, such as resources, from nodes 718 or 720 registered to a particular domain 702 or 704, including attached devices and capabilities. The NDC 708 may also maintain a shared virtual repository 724 where it advertises network service elements that need action and stores identities of service components providing network service elements.

The NDC 708 may use a machine learning (ML) engine 726 which it uses to select which nodes 718 or 720, or combination of nodes 718 or 720, will be used to satisfy the requirements of the service. The ML engine 726 may use simulations, neural networks, statistical analysis, and any number of other techniques to determine which components may complete a network service element.

The NDC 708 may use a variety of criteria to select which nodes 718 or 720, or other devices, will host network service elements. The selection criteria may include latency requirements, specific bandwidth needs, or reliability metrics. The data is stored in the database 722, and may be based on historic performance data. The NDC 708 may also act as mediator when multiple end nodes bid to fulfill an advertisement request for the same network service element. The NDC 708 is responsible for publishing the components or tasks it was assigned by the orchestrator 712.

A network client 728 may reside on each device, or node 718 or 720, in the network domain 702 or 704. It may be registered with the NDC 708 or other service coordinator to provide information about the node 718 or 720 and any connected elements such as sensors, cameras, actuators, and the like. The type of information it provides may include performance and system telemetry information, such as power, performance, and reliability measurements. The network client 728 also enables control by the NDC 708, or other service coordinator, to change the operation or configuration of the node 718 or 720 to ensure performance criteria are met. For example, an NDC 708 may modify the duty cycle for collecting data from an attached sensor. The NDC 708 may also configure the networking and transport settings of the end node 718 or 720 communicating within the network domain 702 or 704, such as a gateway 310, described with respect to FIGS. 3 and 4. The network client 718 may subscribe to or poll the shared virtual repository 724 for any network service elements it can complete.

The virtual shared repository 724 may include a list of all tasks, for example, network service elements, requiring execution. A node 718 or 720 can advertise its ability to perform a task and request the task assignment. The NDC 708 will perform a lookup of the requesting node 718 or 720 to ensure it has not previously violated or failed to execute a function. If the NDC 708 decides to assign the task to the node 718 or 720, it marks the task in the virtual shared repository 724 as assigned. The virtual shared repository 724 may be part of the database 722 or may be a standalone system.

The service and the network service element are not limited to a single node 718 or 720, or even a single domain 702 or 704. For example, a service may be a fog device 730 that is assigned nodes 718 and 720 in both domains 702 and 704. As shown, the fog device 730 crosses multiple domains 702 and 704 and is provided for nodes 718 and 720 under the direction of the NDC 708 in the first domain 702 and the NDC 708 in the second domain 704. A third network domain 732 may be accessed over the cloud 302 and may include, for example, a database 734 to provide long term storage of data as a network service element. The components, such as nodes 718 or 720 and database 734, that are located in other domains 702, 704, or 732, may be identified by the orchestrator 712, and may be incorporated into a shared virtual domain to share resources.

The network service overlays 716 may be stored in a shared repository 736 of tasks and components, that may also include other items requested by the orchestrator 712, the NDC 708, or other components. In addition to network service overlays 716 being pushed to nodes 718 and 720 to form a fog device 730, the nodes 718 and 720 may also request, or pull, network service overlays 716 to complete a task, such as a network service element, for which they need code or other configuration information.

Figure 8:
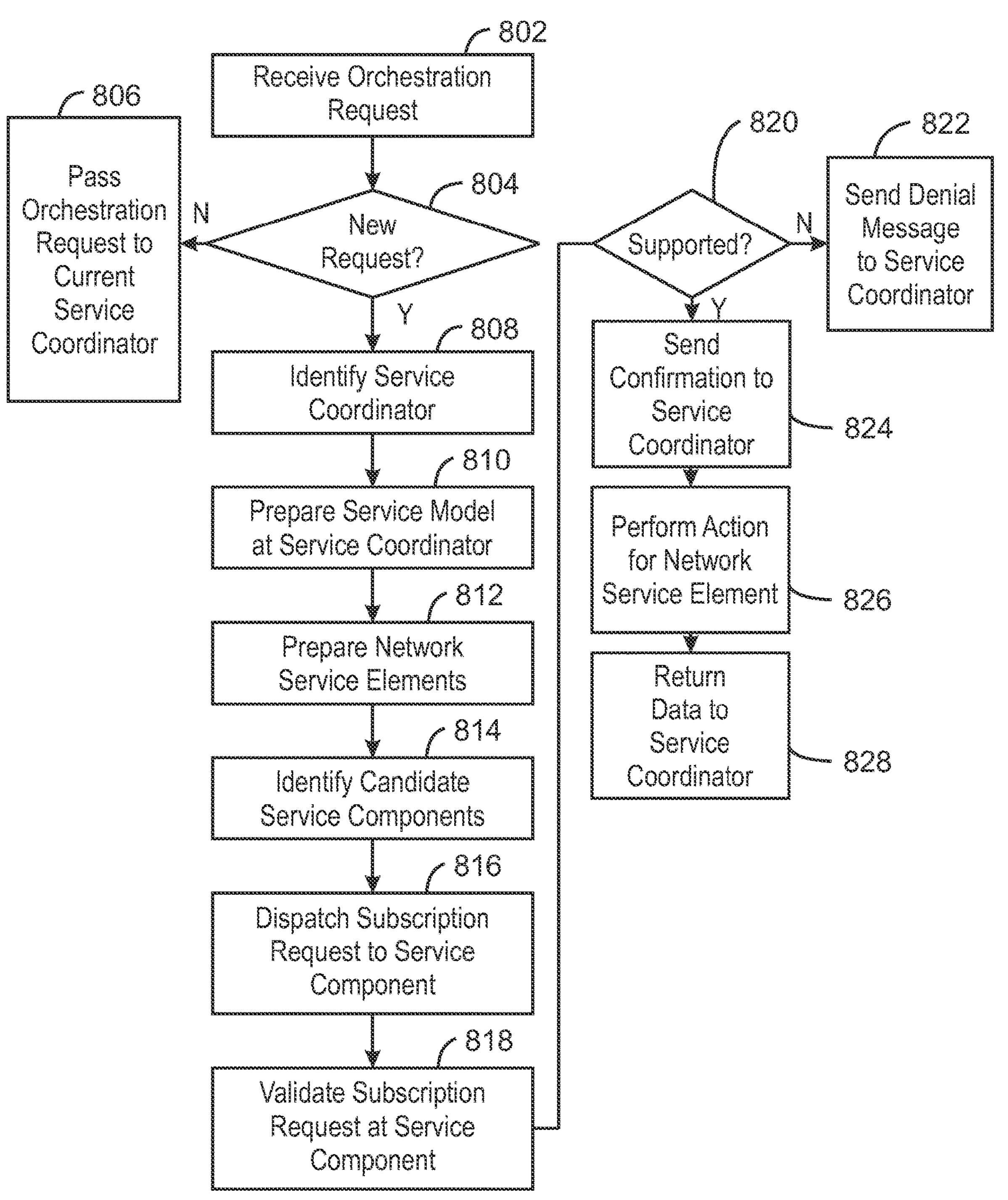
FIG. 8 is a process flow diagram of an example method for handling new requests for a service in accordance with some embodiments.

FIG. 8 is a process flow diagram of an example method 800 for handling new requests for a service in accordance with some embodiments. The method 800 of FIG. 8 may be implemented by the IoT device 1000 described with respect to FIG. 10. The method 800 starts at block 802, when an orchestration request is received, for example, at a network domain controller or other service coordinator. At block 804, a determination is made as to whether the service request is new, for example, to form a new service or fog device. If not, at block 806, the orchestration request is passed to an existing service coordinator. For example, the service request may be a request for data or information that is currently a purpose of the service or fog device, or it may repurpose the fog device to provide different information. If so, the service coordinator may modify the service by adding or dropping nodes. Further, the service coordinator or service components may request network service overlays to be downloaded to allow completion of network service elements.

If the orchestration request is for a new service, at block 808, a service coordinator may be identified. The service coordinator may be an NDC located in a domain related to the service request, such as the NDC that services the largest number of nodes that would provide information for the service request.

At block 810, a service model may be prepared. The service model may be considered as a virtual parts list for a fog device or service to be used to fulfil the service request. The service model may identify what types of network service elements, end nodes, and other service providers are needed for the service. The service model may be constructed at the service coordinator or may be prepared at an orchestrator and downloaded to the service coordinator. At block 812, the service coordinator may prepare the network service elements. These may be the portions of the service that identify the specific data requests, actions, and the like. The network service elements may already be present in a data store on the service coordinator, or may be network service overlays that are pulled from another store, such as in the cloud.

At block 814, the service coordinator may identify candidate service components, such as individual endpoint nodes, data sources, code, and the like, that are capable of providing specific network service elements. The individual endpoint nodes may be IoT devices that have registered their identity and capability with the NDC, as described with respect to FIG. 9. At block 816, the service coordinator may dispatch subscription requests for network service elements to the service components that have been identified.

At block 818, the service component may validate the subscription request. This may be performed by comparing the service request to the sensors and other devices present and operational in the service component to ensure that the service component is capable of performing the network service element in the service request. At block 820, a determination is made as to whether the service request is supported. If not, at block 822, a denial message is sent to the service coordinator. The service coordinator may then remove the service component from the list of devices capable of fulfilling that network service element and look for another device capable of providing the network service element.

If the service component is capable of fulfilling the service request by providing the data or actions for the network service element, at block 824, it may send a confirmation message to the service coordinator, which may add it to the list of devices. As described herein, a block chain transaction may be used to record the service component in a transaction, and a group identification may be issued to allow the service component to communicate as part of the group. The service component may have a network service overlay to implement the network service element in a local store, or may download the network service overlay from the service coordinator, or from a store in the cloud.

At block 826, the service component may perform the action for the network service element. This may be the collection of data from a sensor, such as temperature, wind speed, precipitation, and the like, associated with the service component. In some examples, the network service element may be completed by the service component performing an action, such as turning a light on or off, activating a compressor to lower a temperature, and the like.

At block 828, the service component returns data or an acknowledgement to the service coordinator. This may be the data associated with a sensor reading, or confirmation that an action has been taken.

Figure 9:
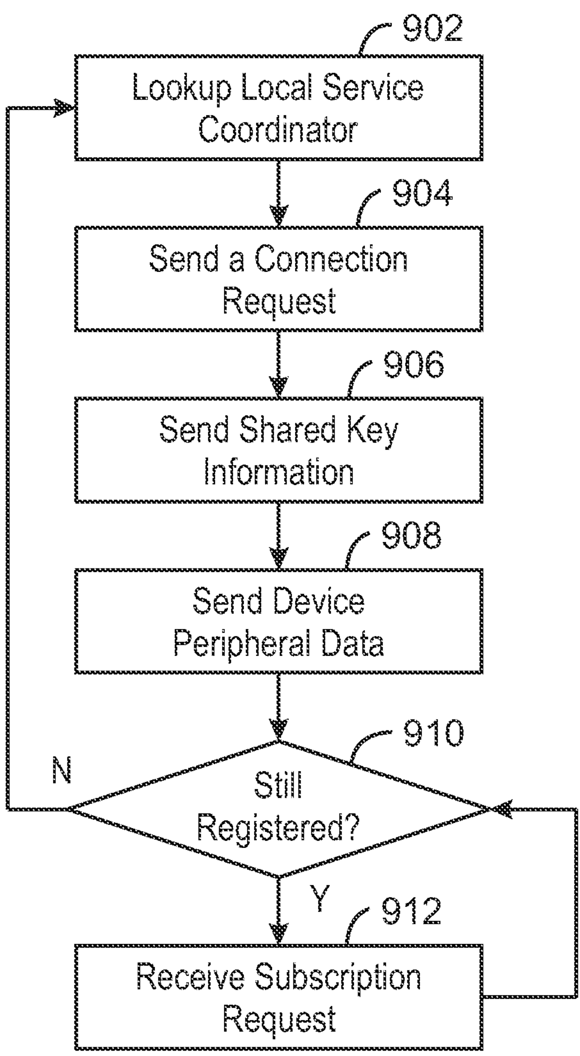
FIG. 9 is a process flow diagram of an example method for registering an endpoint, or service component, with an network domain controller (NDC), or other service coordinator in accordance with some embodiments.

FIG. 9 is a process flow diagram of an example method 900 for registering an endpoint, or service component, with an NDC, or other service coordinator in accordance with some embodiments. The method 900 of FIG. 9 to may be implemented by the IoT device 1000 described with respect to FIG. 10. The block 902 represents, for example, when a service component, such as an IoT device or endpoint node, looks up a local service coordinator. This may be an NDC operating in the network domain that includes the service component. At block 904, the service component sends a connection request to the service coordinator. Upon receiving an acknowledgement from the service coordinator, at block 906, the service component may send a shared key, or other identifying information, such as a blockchain generated key, to the service coordinator. Upon receiving a confirmation that the service component is registered to the local service coordinator, at block 908, the service component may send the service coordinator the device peripheral data, such as attached sensors, actuators, and the like. At block 910, a determination is made as to whether the service component is still registered. If not, process flow may return to block 902 to reregister the device. At block 912, a subscription request may be received by the service component. Once the service component has acted on the subscription, it may return to block 912 to determine if the device is still registered. If the service component is no longer registered, process flow may return to 902 to repeat the process.

Figure 10:
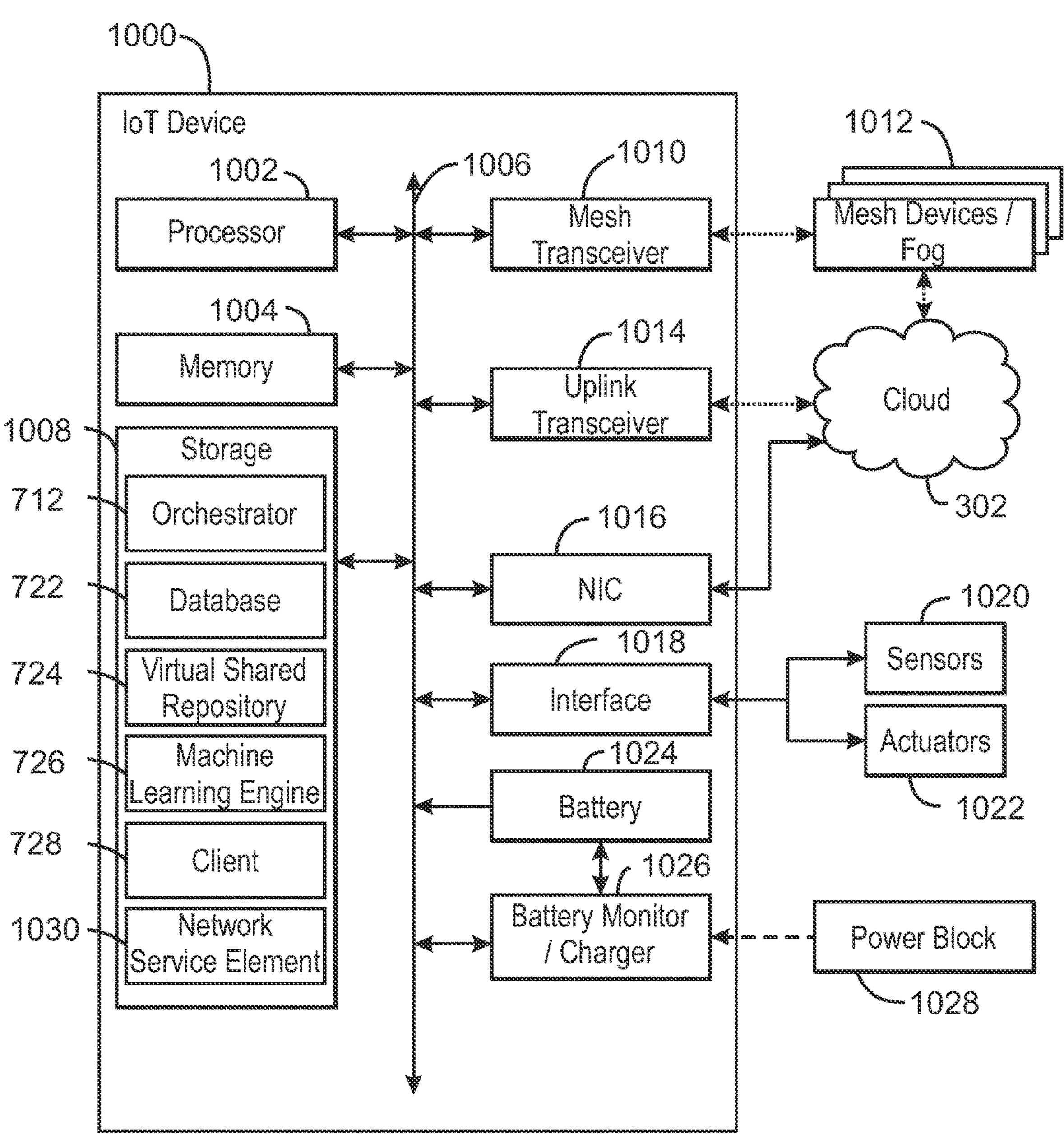
FIG. 10 is a block diagram of an example of components that may be present in an IoT device for coordinating or fulfilling service requests in accordance with some embodiments.

FIG. 10 is a block diagram of an example of components that may be present in an IoT device 1000 for coordinating or fulfilling service requests in accordance with some embodiments. Like numbered items are as described with respect to FIGS. 3 and 7. It can be noted that different components may be selected and used for the IoT device 1000 than for those selected for any other IoT devices discussed herein. The IoT device 1000 may be an orchestrator, an NDC, an endpoint node, or function as a combination of these systems.

The IoT device 1000 may include any combinations of the components shown in the example. The components may be implemented as ICs, portions thereof, discrete electronic devices, or other modules, logic, hardware, software, firmware, or a combination thereof adapted in the IoT device 1000, or as components otherwise incorporated within a chassis of a larger system. The block diagram of FIG. 10 is intended to show a high level view of components of the IoT device 1000. However, some of the components shown may be omitted, additional components may be present, and different arrangement of the components shown may occur in other implementations.

The IoT device 1000 may include a processor 1002, which may be a microprocessor, a multi-core processor, a multithreaded processor, an ultra-low voltage processor, an embedded processor, or other known processing element. The processor 1002 may be a part of a system on a chip (SoC) in which the processor 1002 and other components are formed into a single integrated circuit, or a single package, such as the Edison™ or Galileo™ SoC boards from Intel. As an example, the processor 1002 may include an Intel® Architecture Core™ based processor, such as a Quark™, an Atom™, an i3, an i5, an i7, or an MCU-class processor, or another such processor available from Intel® Corporation, Santa Clara, CA. However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1002 may communicate with a system memory 1004 over a bus 1006. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1008 may also be coupled to the processor 1002 via the bus 1006. To enable a thinner and lighter system design, the mass storage 1008 may be implemented via a solid state drive (SSD). Other devices that may be used for the mass storage 1008 include flash memory cards, such as SD cards, microSD cards, XD picture cards, and the like, and USB flash drives.

In low power implementations, the mass storage 1008 may be on-die memory or registers associated with the processor 1002. However, in some examples, the mass storage 1008 may be implemented using a micro hard disk drive (HDD). Further, any number of new technologies may be used for the mass storage 1008 in addition to, or instead of, the technologies described, such resistance change memories, phase change memories, holographic memories, or chemical memories, among others. For example, the IoT device 1000 may incorporate the 3D XPOINT memories from Intel® and Micron®.

The components may communicate over the bus 1006. The bus 1006 may include any number of technologies, including industry standard architecture (ISA), extended ISA (EISA), peripheral component interconnect (PCI), peripheral component interconnect extended (PCIx), PCI express (PCIe), or any number of other technologies. The bus 1006 may be a proprietary bus, for example, used in a SoC based system. Other bus systems may be included, such as an I2C interface, 13C interface, an SPI interface, point to point interfaces, and a power bus, among others.

The bus 1006 may couple the processor 1002 to a mesh transceiver 1010, for communications with other mesh devices 1012. The mesh transceiver 1010 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1012. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1010 may communicate using multiple standards or radios for communications at different range. For example, the IoT device 1000 may communicate with geographically proximate devices, e.g., within about 10 meters, using a local transceiver based on BLE, or another low power radio, to save power. More distant mesh devices 1012, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1010 may be incorporated into an MCU as an address directly accessible by the chip, such as in the Curie® units available from Intel.

An uplink transceiver 1014 may be included to communicate with devices in the cloud 302. The uplink transceiver 1014 may be LPWA transceiver that follows the IEEE 802.15.4, IEEE 802.15.4g, IEEE 802.15.4e, IEEE 802.15.4k, or NB-IoT standards, among others. The IoT device 1000 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1010 and uplink transceiver 1014, as described herein. For example, the radio transceivers 1010 and 1012 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1010 and 1012 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, “car radio phone”), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WIDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1014, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1016 may be included to provide a wired communication to the cloud 302 or to other devices, such as the mesh devices 1012. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1016 may be included to allow connect to a second network, for example, a NIC 1016 providing communications to the cloud over Ethernet, and a second NIC 1016 providing communications to other devices over another type of network.

The bus 1006 may couple the processor 1002 to an interface 1018 that is used to connect external devices. The external devices may include sensors 1020, such as accelerometers, level sensors, flow sensors, temperature sensors, pressure sensors, barometric pressure sensors, and the like. The interface 1018 may be used to connect the IoT device 1000 to actuators 1022, such as power switches, valve actuators, an audible sound generator, a visual warning device, and the like.

While not shown, various input/output (I/O) devices may be present within, or connected to, the IoT device 1000. For example, a display may be included to show information, such as sensor readings or actuator position. An input device, such as a touch screen or keypad may be included to accept input.

A battery 1024 may power the IoT device 1000, although in examples in which the IoT device 1000 is mounted in a fixed location, it may have a power supply coupled to an electrical grid. The battery 1024 may be a lithium ion battery, a metal-air battery, such as a zinc-air battery, an aluminum-air battery, a lithium-air battery, a hybrid super-capacitor, and the like.

A battery monitor/charger 1026 may be included in the IoT device 1000 to track the state of charge (SoCh) of the battery 1020. The battery monitor/charger 1026 may be used to monitor other parameters of the battery 1024 to provide failure predictions, such as the state of health (SoH) and the state of function (SoF) of the battery 1024. The battery monitor/charger 1026 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1026 may communicate the information on the battery 1024 to the processor 1002 over the bus 1006. The battery monitor/charger 1026 may also include an analog-to-digital (ADC) convertor that allows the processor 1002 to directly monitor the voltage of the battery 1026 or the current flow from the battery 1024. The battery parameters may be used to determine actions that the IoT device 1000 may perform, such as transmission frequency, mesh network operation, sensing frequency, and the like.

A power block 1028, or other power supply coupled to a grid, may be coupled with the battery monitor/charger 1026 to charge the battery 1024. In some examples, the power block 1028 may be replaced with a wireless power receiver to obtain the power wirelessly, for example, through a loop antenna in the IoT device 1000. A wireless battery charging circuit, such as an LTC4020 chip from Linear Technologies of Milpitas, CA, among others, may be included in the battery monitor/charger 1026. The specific charging circuits chosen depend on the size of the battery 1024, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1028 may be augmented or replaced with solar panels, a wind generator, a water generator, or other natural power systems.

The mass storage 1008 may include a number of modules to implement the coalition group formation, or the coordinating or fulfilling of service requests described herein. Although shown as code blocks in the mass storage 1008, it may be understood that any of the modules may be fully or partially replaced with hardwired circuits, for example, built into an application specific integrated circuit (ASIC).

The mass storage 1008 may include an orchestrator 712 to submit service requests to other units, such as service coordinators. A database 722 may store data, meta-data, and resources from nodes registered to a particular domain, including attached devices and capabilities. A virtual shared repository 724 may be used to advertise network service elements that need action and store identities of service components providing network service elements. A machine learning engine 726 may be used to select which service components, such as mesh devices 1012 or devices in the cloud 302, may be used to satisfy the requirements of the service. A client 728 may register with the service coordinator and provide information on connected devices and capabilities. The client 728 may advertise the availability of the IoT device 1000 to fulfill a network service element 1030. The client 728 may respond to a service request with a confirmation that the IoT device 1000 can complete the actions for the network service element 1030, or send a denial informing the service coordinator that it cannot complete the actions. The client 728 may access the service coordinator to obtain any network service overlays needed to complete the network service element 1030 or may directly access a store in the cloud 302 to download the needed network service overlays.

Figure 11:
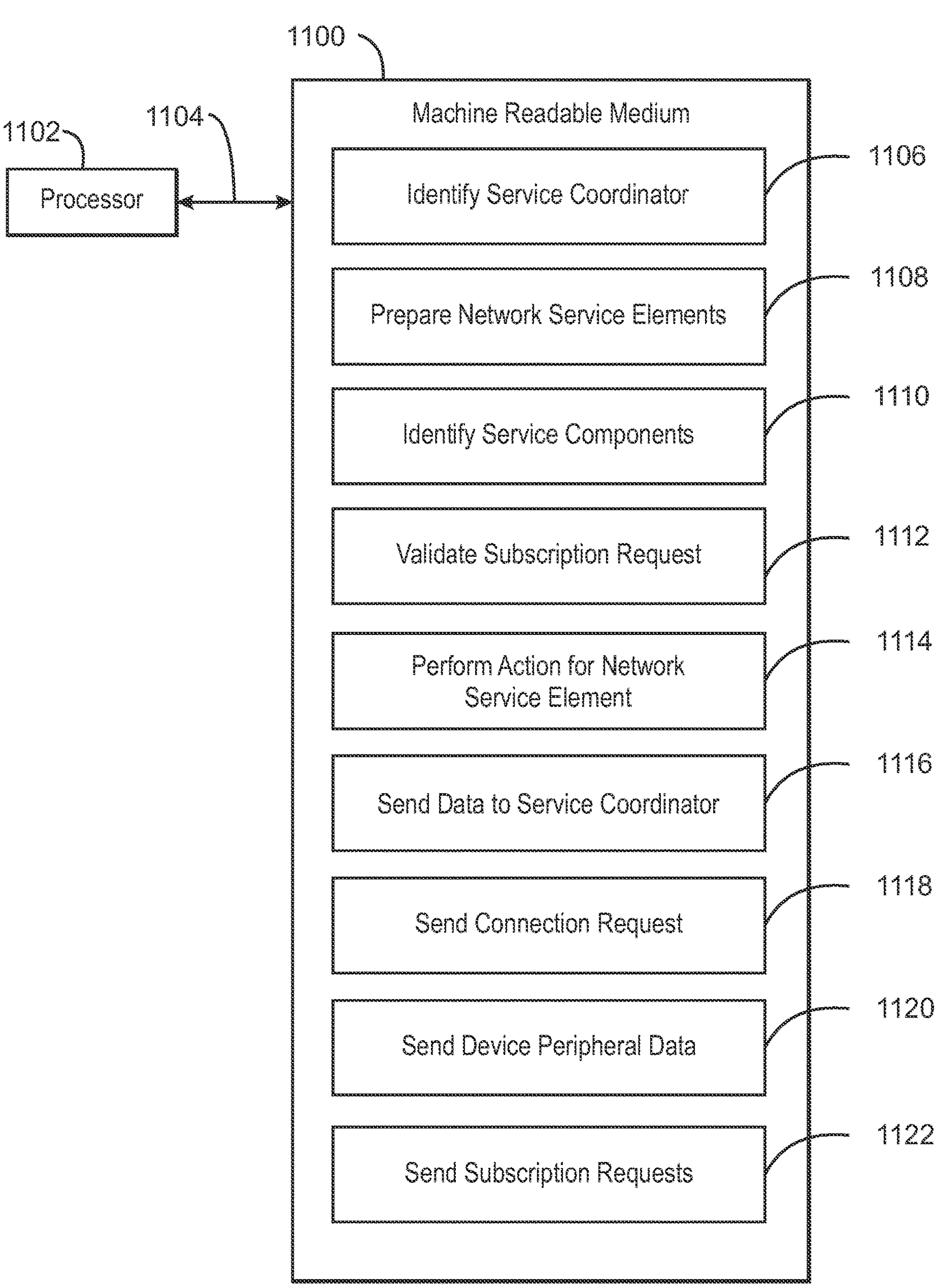
FIG. 11 is a block diagram of a non-transitory, machine readable medium including code to direct a processor, or processors, to coordinate or fulfill service requests in accordance with some embodiments.

FIG. 11 is a block diagram of an exemplary non-transitory, machine readable medium 1100 including code to direct a processor 1102, or processors, to coordinate or fulfill service requests in accordance with some embodiments. The processor 1102 may access the non-transitory, machine readable medium 1100 over a bus 1104. The processor 1102 and bus 1104 may be selected as described with respect to the processor 1002 and bus 1006 of FIG. 10. The non-transitory, machine readable medium 1100 may include devices described for the mass storage 1008 of FIG. 10 or may include optical disks, thumb drives, or any number of other hardware devices.

The non-transitory, machine readable medium 1100 may include code 1106 to direct the processor 1102 to identify a service coordinator, such as a network domain controller in the local domain. Code 1108 may be included to direct the processor 1102 to prepare the network service elements for a service request. Code 1110 may be included to direct the processor 1102 to identify candidate service components that are capable of providing specific network service elements. Code 1112 may be included to direct the processor 1102 to validate a subscription request. Code 1114 may be included to direct the processor 1102 to perform the action for a network service element. Code 1116 may be included to direct the processor 1102 to return data or an acknowledgement to a service coordinator. Code 1118 may be included to direct the processor 1102 to send a connection request to the service coordinator. Code 1120 may be included to direct the processor 1102 to send the service coordinator the device peripheral data, such as attached sensors, actuators, and the like. Code 1122 may be included to direct the processor 1102 to send subscription requests to other units. It can be noted of these units may be present in every device. For example, an end point node may not function as a service coordinator or orchestrator, and, in that example, would not include code blocks 1106, 1108, 1110, and 1122 that perform those functions.

Security in IoT networks is a consideration, especially as the networks grow in size. Private key storage, updates and in-transit interception, rogue key detection, and rapid new key generation are potential concerns. However, in many cases IoT devices are constrained by memory, processing power, and other issues, such as limited components. Further, IoT networks may have limited bandwidth to share data and all other functions. Thus, it is useful to maximize the efficiency of communications between the devices.

In the techniques described herein, IoT nodes in a network may not need to receive or dispatch a full private key, for example, with each message. Instead, they may dispatch and receive fractional parts of the key. In addition to improving the efficiency of communications, this may reduce the attack surface for a secure IoT network, as no individual node needs to store the full key sequences in persistent storage.

Figure 12:
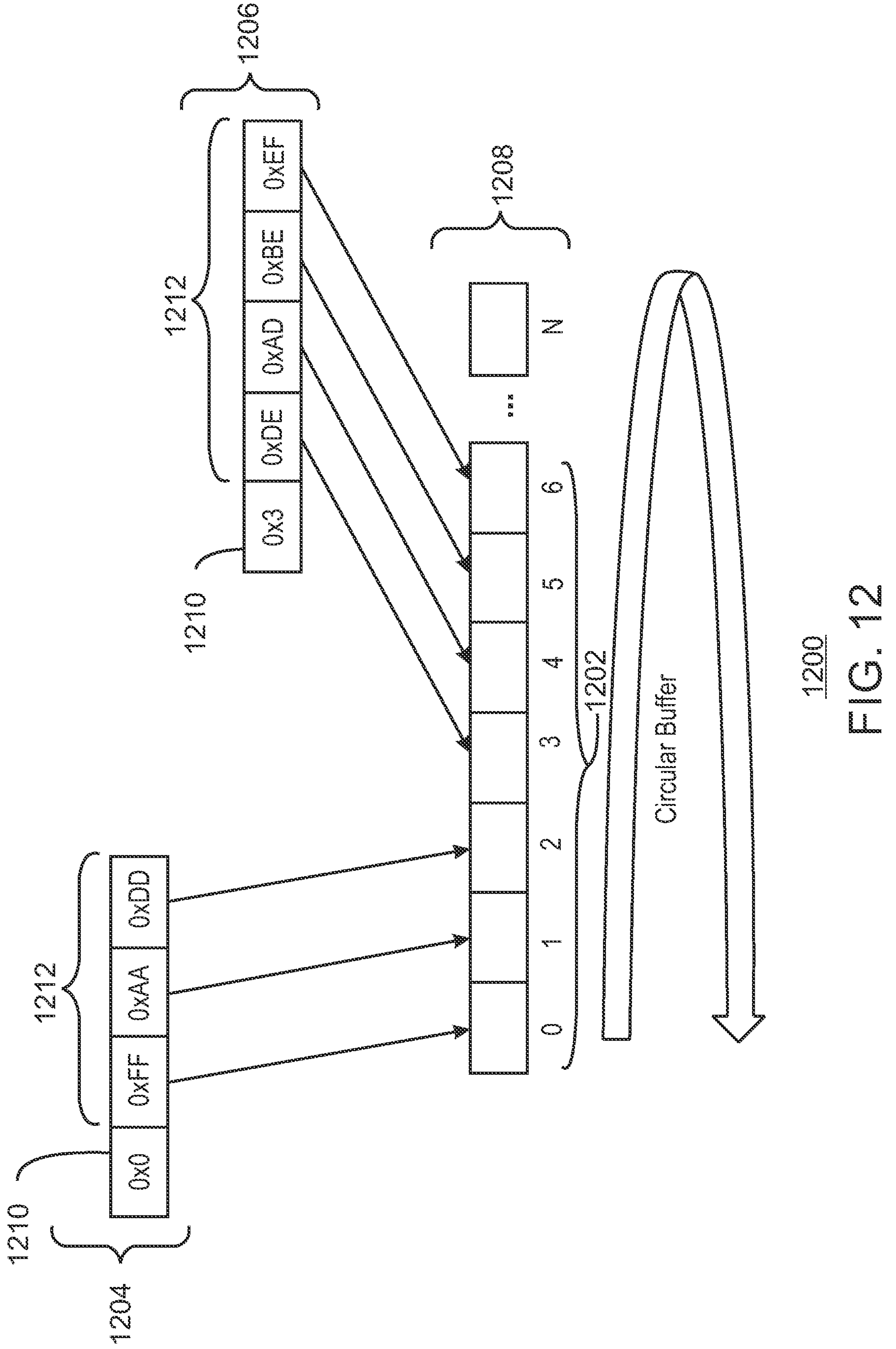
FIG. 12 is a schematic diagram of the construction of a key using fractional keys and exchanged between nodes in an IoT network in accordance with some embodiments.

FIG. 12 is a schematic diagram of the construction of a key 1202 using fractional keys 1204 and 1206 exchanged between nodes in an IoT network in accordance with some embodiments. In this example, a water filling approach may be used for the construction of the key 1202 using the fractional keys 1204 and 1206. The key 1202 may be assembled in a circular buffer 1208. Each fractional key 1204 or 1206 may include an offset 1210 which indicates where the portion of the key 1212 in each fractional key 1204 or 1206 is to be inserted into the circular buffer 1208. The key 1202 may be used to access services for the IoT network, communicate with other IoT networks, and the like.

Although, two fractional keys 1204 and 1206 are shown in this example, multiple fractional keys of various sizes may be stored in the circular buffer. A complete key may be identified when sufficient fractional keys have been added to fill the circular buffer. This approach may result in overlapping key indices which enables partial key verification as overlapping fractional key bytes should be identical. Likewise, this enables rogue device detection before full key sequences have been constructed. If any overlapping fractional key bytes do not match, an alert may be sent out to other devices in the mesh, or to other users, noting that a device may be compromised.

Generally, according to some aspects, no single device in the IoT network stores the complete key. Accordingly, no single device may be attacked or analyzed using a microscope to determine the full key. Once the full key 1202 is assembled, it may be used by the IoT network, or fog device, to access other devices, for example, in the cloud.

Figure 13:
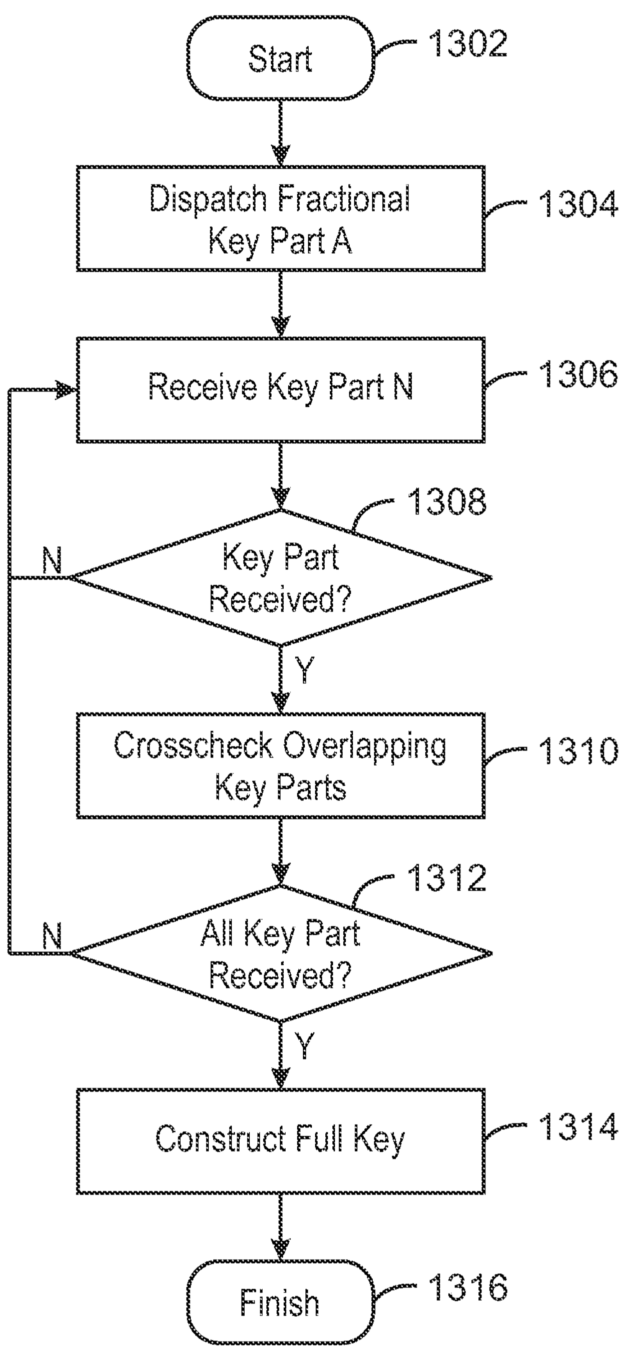
FIG. 13 is a process flow diagram of an example method for assembling a full key from fractional keys stored in individual nodes in an IoT network in accordance with some embodiments.

FIG. 13 is a process flow diagram of an example method 1300 for assembling a full key from fractional keys stored in individual nodes in an IoT network in accordance with some embodiments. The method 1300 of FIG. 13 may be implemented by the IoT device 1500 described with respect to FIG. 15. The block 1302 represents, for example, for example, when a full key is needed by fog device to access the system in the cloud.

At block 1304, the first portion of a fractional key is dispatched. This may occur when a node constructs a payload, and initiates a wired or wireless communications to send the payload, including the fractional key, to a node that has requested it. The dispatch of the fractional key may also function as a request for other nodes to send fractional keys to peer nodes.

At block 1306, the requesting node receives a portion of the fractional key from a sending node. At block 1308, the requesting node analyzes the payload to determine if it includes a fractional key and offset. If not, process flow returns to block 1306.

If, at block 1308, it is determined that a payload includes a fractional key, then, at block 1310, the requesting node may crosscheck the fractional key to determine if the received fractional key overlaps other portions. This may be performed in a number of ways including, for example, making a comparison of the buffer index. Further, the fractional key part may be stored in the circular buffer, and, if any portions overlap other keys, they may be compared to confirm that the overlapping portions match. Any failure of overlapping portions to match may indicate that the device has been compromised. If so, the assembly process may be stopped and an alert sent out.

Further security may be provided by other techniques. For example, a "dirty bit" may be maintained for each "cell" in the circular key buffer that may be allocated for use by a fractional key. A security weakness may be introduced when a previously used cell is selected as a member of a subsequent key fraction. To correct for this possible weakness, the dirty bit may be set upon first allocation and checked upon subsequent overlap verification. If an overlap check reveals the dirty bit, then the circular buffer offset calculation is repeated, to determine if this results in a non-dirty cell. This process repeats until enough virgin key material is found for the key generation method.

At block 1312, a determination may be made as to whether all fractional keys have been received. If not, process flow may return to block 1306. If all fractional keys have been received, at block 1314 the full key may be constructed.

The method 1300 ends at block 1316. This may take place, for example, when the full key is provided to another device on behalf of a fog device.

Figure 14:
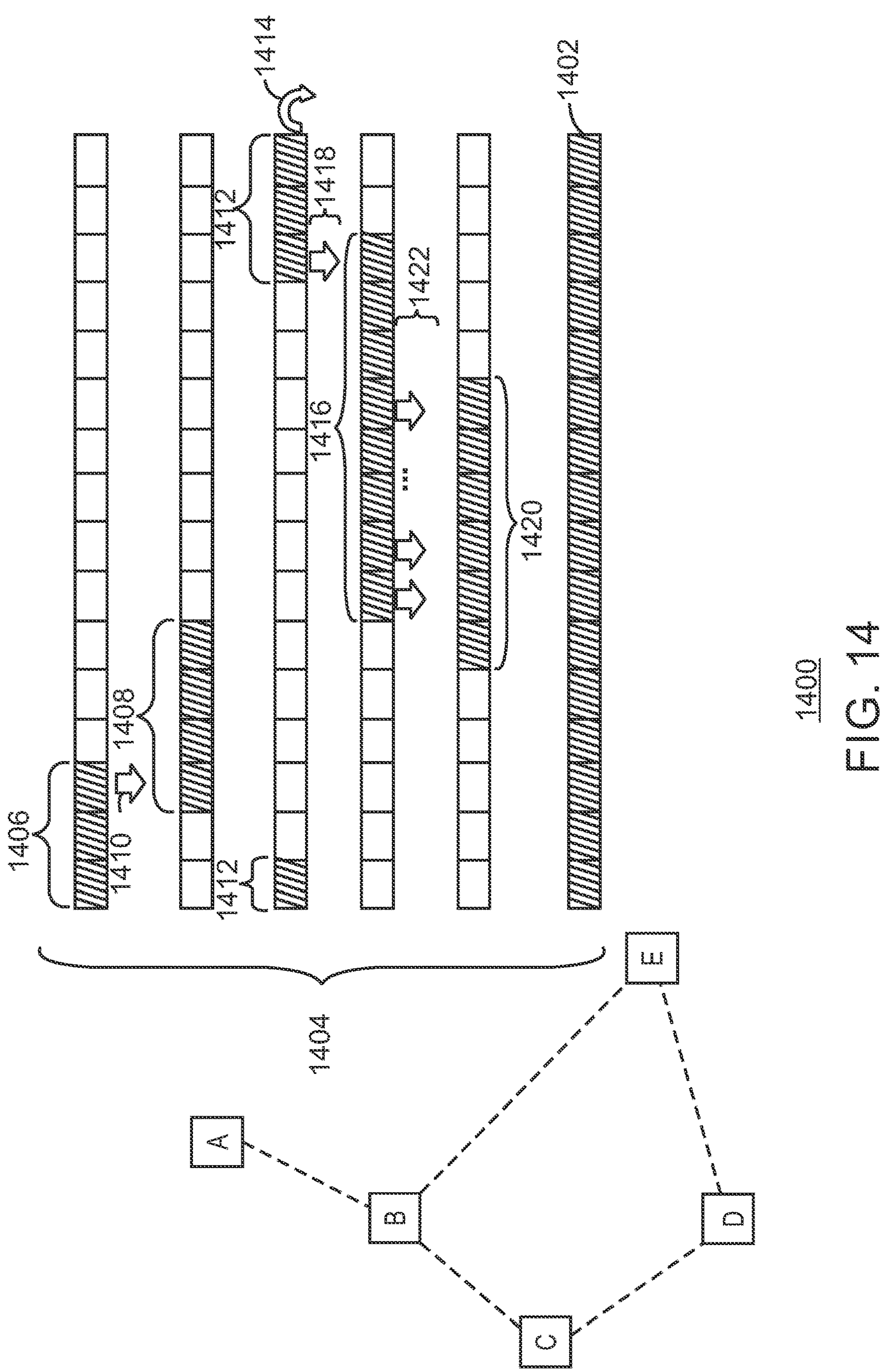
FIG. 14 is a schematic diagram of the assembly of a complete key from fractional keys provided by five nodes A-E in accordance with some embodiments.

FIG. 14 is a schematic diagram of the assembly of a complete key 1402 from fractional keys provided by five nodes A-E in accordance with some embodiments. In this example, the five nodes A-E exchange their fractional keys with each other. Each node A-E may construct the full key by placement of the received keys in the designated offset in a circular buffer. The offset may be denoted by {N:x,O:y}, in which x is the number of bytes, N, in the fractional key and y is the starting index, or offset O, of the fractional key in the full key 1402.

For example, if a circular buffer 1404 is located in node A, the fractional key A 1406 from node A may already be located in the circular buffer 1404. The fractional key B 1408 may then be received from node B. In this example, the first byte of fractional key B 1408 overlaps the last byte of fractional key A 1406, and a byte comparison 1410 may be performed to ensure that the overlapping byte matches between the two fractional keys 1406 and 1408. If the byte comparison 1410 determines that the overlapping byte matches between the two fractional keys 1406 and 1408, then the fractional key from node B may be loaded into the circular buffer 1404.

Node A may then receive fractional key C 1412 from node C. As fractional key C 1412 does not overlap either of the previous fractional keys 1406 and 1408 it may be loaded into the buffer with no byte comparisons. Fractional key C 1412 may have an offset and length that overlaps the end of the circular buffer 1404, accordingly, the last byte of fractional keys see 1412 may be rotated to fall in the beginning of the circular buffer 1404 as indicated by the arrow 1414.

Node A may then receive fractional key D 1416 from node D. As the last bite of fractional key D 1416 overlaps the first bite of fractional key C 1412, a byte comparison 1418 may be performed to ensure that the two bytes match. Once this is confirmed, then fractional key D 1416 may then be loaded into the circular buffer 1404.

Node A may then receive fractional key E 1420 from node E. As there is a substantial overlap in the bytes between fractional keys D and E 1416 and 1420, a byte comparison 1422 may be performed on each of these bites to ensure that they match. If so, the node E fractional key E 1420 may then be loaded into the circular buffer 1404 to form the complete key 1402.

As overlaps occur, byte verification takes place to confirm that the overlapping fractional parts match. If not, the process may be terminated and the potential for a compromised node may be reported. The overlapping bytes may also provide redundancy in cases where one or more nodes may not be able to exchange their fractional keys with other nodes in the network. This situation may otherwise result in a failure for all nodes to construct the complete key 1402, if all of the fractional keys orthogonal, for example, had no byte overlaps.

Figure 15:
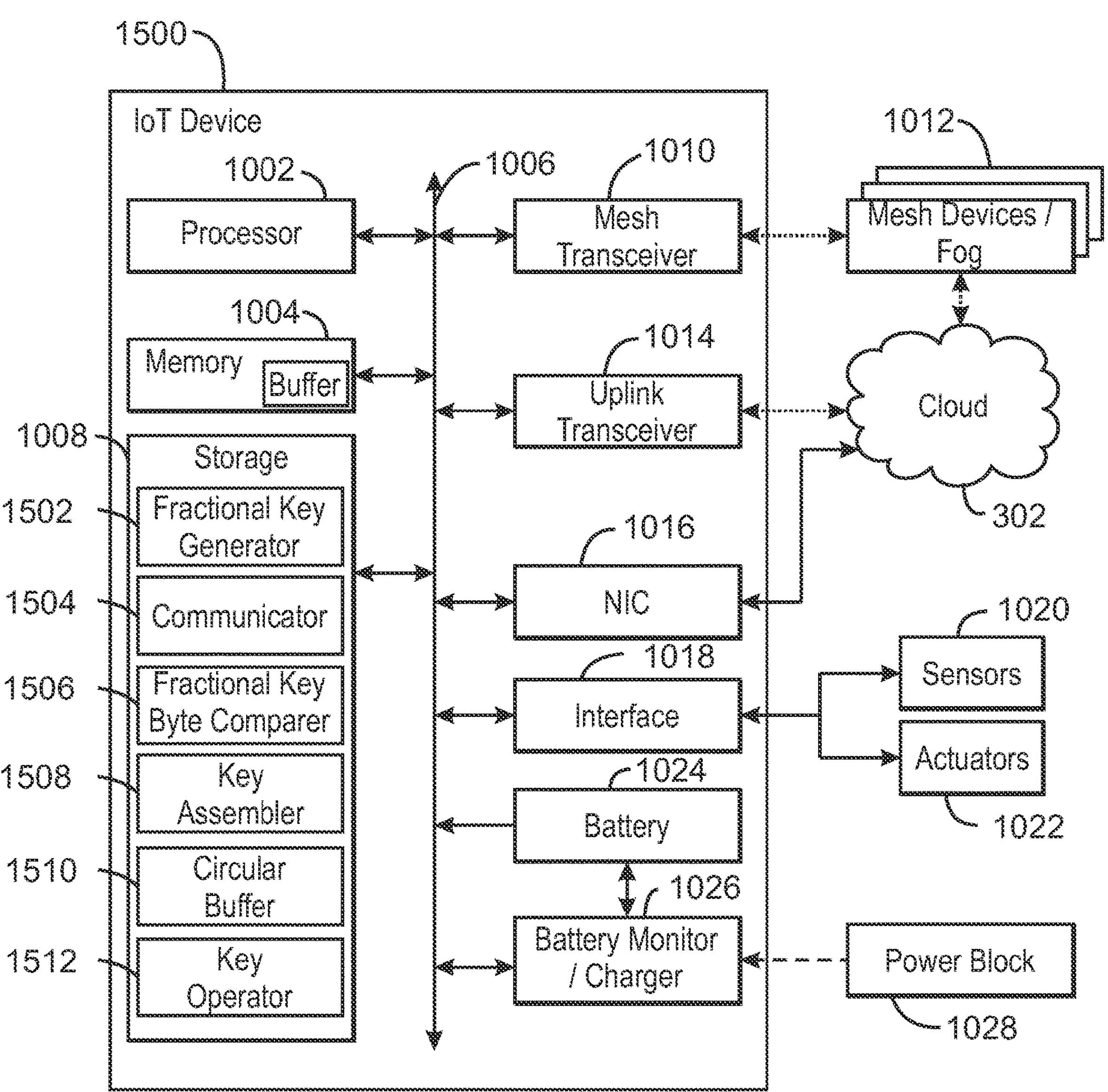
FIG. 15 is a block diagram of an example of components that may be present in an IoT device for assembling multiple fractional keys from different nodes in an IP mesh network into a single complete key in accordance with some embodiments.

FIG. 15 is a block diagram of an example of components that may be present in an IoT device 1500 for assembling multiple fractional keys from different nodes in an IP mesh network 1012 into a single complete key in accordance with some embodiments. Like numbered items are as described with respect to FIGS. 3 and 10. It can be noted that different components may be selected and used for the IoT device 1500 than for those selected for the IoT device 1000 discussed with respect to FIG. 10, and other IoT devices discussed herein.

The mass storage 1000 may include a number of modules to implement the coalition group formation described herein. Although shown as code blocks in the mass storage 1008, it may be understood that any of the modules may be fully or partially replaced with hardwired circuits, for example, built into an application specific integrated circuit (ASIC).

The mass storage 1008 may include a communicator 1502 that sends packets to and receives packets from mesh devices 1012 or devices in the cloud 302 over one more communications links, for example, through a mesh transceiver 1010, an uplink transceiver 1014, and a NIC 1016, among others. In addition to the functions described with respect to FIG. 15, the communicator 1504 may perform other functions, such as translation of packets between protocols, performing proof-of-provenance additions, and the like. Further, the communicator 1504 may be part of an easement system.

A fractional key generator 1502 may generate a fractional key, for example, from a random number generator, a block chain, or from a key saved to the device during manufacturing. As an example, the key may be generated using an Intel Digital Random Number Generator (DRNG) or a pseudo-random number generator (PRNG) that is seeded using a DRNG. The fractional key generator 1502 may use any number of other techniques to generate the fractional key, such as accessing a key from a blockchain, as described herein.

Another exemplary fractional key generation method may use a DRNG that accepts a random seed, for example, obtained from the DRNG when it is not in PRNG mode, in which the search space over the circular buffer may be effectively unlimited, as determined by the DRNG word size architecture. In this example, the offset into the circular buffer is taken as the seed to the Intel DRNG in PRNG mode. Hence, the circular buffer may effectively be of infinite size ensuring collisions within the buffer are probabilistically impossible.

The communicator 1504 may build frames that include fractional keys in the payload of the frame. In some examples, a frame including a fractional key may be passed from another IoT device in the mesh devices 1012, such as a more remote device. In this example, the IoT device 1500 may assemble fractional keys received from other IoT devices in the mesh devices 1012, to form a final key.

A byte comparer 1506 may be included to compare overlapping bytes of fractional keys received from different devices to ensure that the overlapping bytes are identical. The byte comparer 1506 may stop the process of assembling a final key, if any of the overlapping bytes do not match, as this may indicate that an IoT device has been compromised.

A key assembler 1508 may assemble each of the fractional keys in a circular buffer 1510 to form the final key. The key operator 1512 may use the final key in an operation, such as providing the key to a gateway to confirm an identity of a mesh or fog device 1012.

Figure 16:
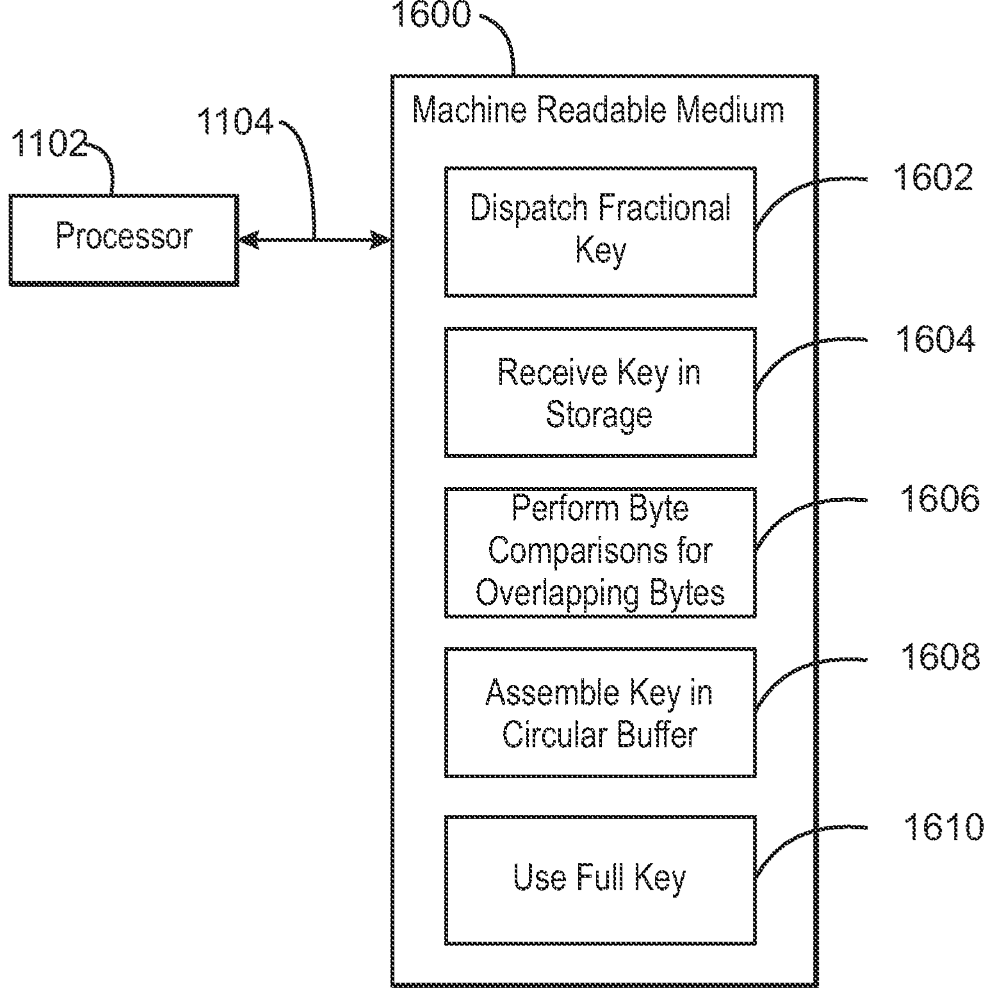
FIG. 16 is a block diagram of a non-transitory, machine readable medium including code to direct a processor to receive fractional keys, assemble the fractional keys into a final key, and use the final key in accordance with some embodiments.

FIG. 16 is a block diagram of a non-transitory, machine readable medium 1600 including code to direct a processor 1102 to receive fractional keys, assemble the fractional keys into a final key, and use the final key in accordance with some embodiments. The processor 1102 may access the non-transitory, machine readable medium 1600 over a bus 1104. The processor 1102 and bus 1104 may be as described with respect to FIG. 11. The non-transitory, machine readable medium 1600 may include devices described for the mass storage 1008 of FIG. 10 or may include optical disks, thumb drives, or any number of other hardware devices.

The non-transitory, machine readable medium 1600 may include code 1602 to direct the processor 1102 to dispatch a fractional key to a receiving device. Code 1604 may be included to direct the processor 1102 to receive a fractional key and store the fractional key. Code 1606 may be included to direct the processor 1102 to perform byte comparisons for overlapping bytes, for example, to ensure that the overlapping bytes match before assembling a final key. Code 1608 may be included to direct the processor 1102 to write the fractional key to the circular buffer, and assemble the final key in the circular buffer from the fractional keys received from devices. Code 1610 may be included to direct the processor 1102 to use the final key, for example, to access a device in the cloud on behalf of the device or the devices in the IoT network.

A monetary concern about the security of a key based approach to cryptocurrencies is raised by the emergence of digital wallets and anonymous key-based identities in a blockchain context. A digital wallet is a system that allows an individual to make an electronic payment for a transaction. The digital wallet may be linked to a bank account or may store a balance transferred from another account. In some examples, the digital wallet may be implemented in software in an electronic device, such as a smart phone, including communications, encryption, and other systems to implement the functionality. In other examples, the digital wallet may be implemented as an RFID tag, where the systems exist on a central server accessed from a communication system.

A transaction on a blockchain is signed by the private keys of the digital wallet owner and the loss, or exposure, of those private keys enables an attacker to sweep the digital wallet. This is a process whereby any unspent balance of currency owned by that digital wallet is transferred to another owner, e.g., belonging to the attacker.

Generally, blockchain consensus mechanisms have no method to identify such a transaction as fraudulent. Searching the blockchain after the fact may identify the route that the currency has taken, but the unregulated nature of such technologies means that the practical methods available to reverse the transaction are prohibitive and do not scale. This may be made more difficult because the identities of the parties involved are not known without some deeper investigation. Further, subsequent transactions of the same coins to third parties become problematic to roll back. Accordingly, it may be preferable to prevent the situation in the first place and seek to reduce the exposure of actors in a blockchain by introducing the concept of demand driven key generation.

Figure 17:
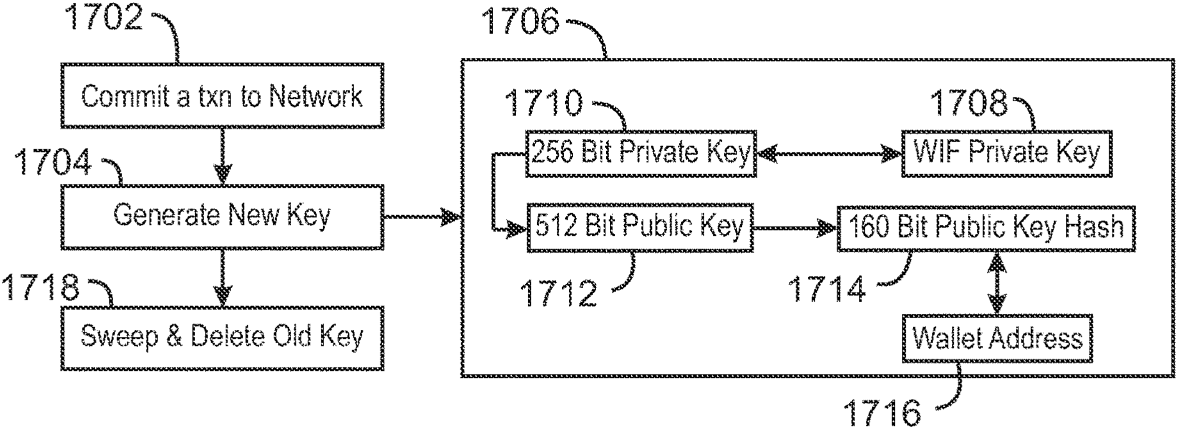
FIG. 17 is a schematic diagram of a procedure for generating keys on demand for devices on lossy networks in accordance with some embodiments.

FIG. 17 is a schematic diagram of a procedure 1700 for generating keys on demand for devices on lossy networks in accordance with some embodiments. As described herein, demand driven key generation may allow digital wallets to generate new keys for transactions, using any of the techniques for key generation described herein, in an on-demand fashion, rather than on a regular time-scheduled one. On-demand would equate to performing a new key generation for every transaction and using it only once. The same mechanism could be applied to system access and other popular applications of key based technologies.

The procedure may start at block 1702 when a transaction is committed to a network. This may occur, for example, when a purchase is made and a digital wallet is used to pay for the purchase. The purchase may be made online, or at a retail establishment, for example, when a device including a digital wallet is tapped on the communications pad.

At block 1704, a new key may be generated. This may be performed by the procedure shown in block 1706, which may be related to the standard bit coin examples. Further, other procedures discussed herein may be used. In this procedure, a wallet import format (WIF) private key may be used to import a 256-bit private key 1710. The 256-bit private key 1710 may be used to generate a 512-bit public key 1712, which may be used to generate a 160-bit public key hash 1714 that may be associated with the wallet address 1716. At block 1718 the old key may be deleted. Generating the new key is not limited to the procedure shown in block 1706. For example, a new key may be generated using the procedure described with respect to FIG. 18.

Figure 18:
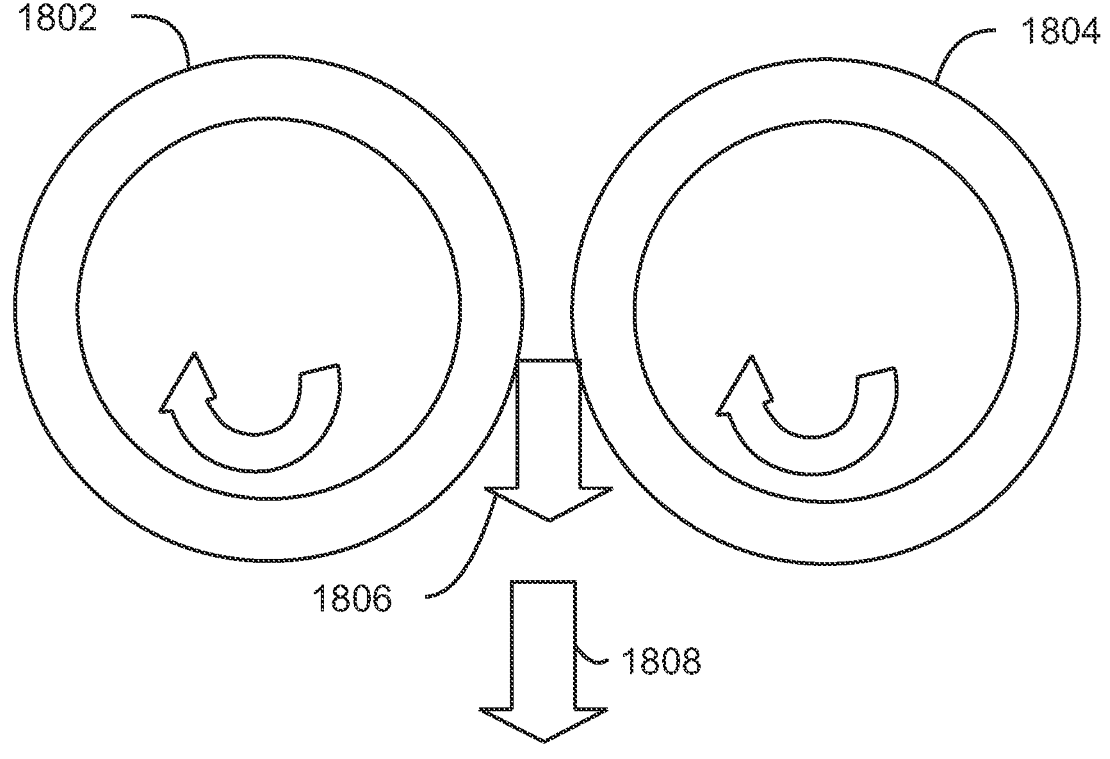
FIG. 18 is a schematic diagram of a key generation method that may be used in the on-demand process for key generation described above, as well as for generating keys in other contexts in accordance with some embodiments.

FIG. 18 is a schematic diagram of a key generation method 1800 that may be used in the on-demand process for key generation described above, as well as for generating keys in other contexts in accordance with some embodiments. The method 1800 of FIG. 18 may be implemented by the IoT device 2000 described with respect to FIG. 20. Rapid key generation in lossy high-latency networks remains a challenging task due to the often false assumptions that an IoT network has end-to-end connectivity, persistent secure connections, a centralized key authority and issuing agent, and inexpensive communications, and networking to support key exchanges. The method 1800 for local key generation may be used when commanding nodes dispatch offset values and full or partial keys are not needed. A full fractional key 1802 may be used with the local key 1804 for example provided by vendor. The local key 1804 may be stored in a circular buffer, and a new key may be generated by a circular exclusive or (XOR) operation 1806 of the full fractional key 1802 and the local key 1804.

The new key 1808 may then be used as needed for access. A key offset may be used to generate multiple new keys, by changing the offset between the full fractional key 1802 and the local key 1804. In this example, a remote control node may send only an offset value for generating the new key.

Figure 19:
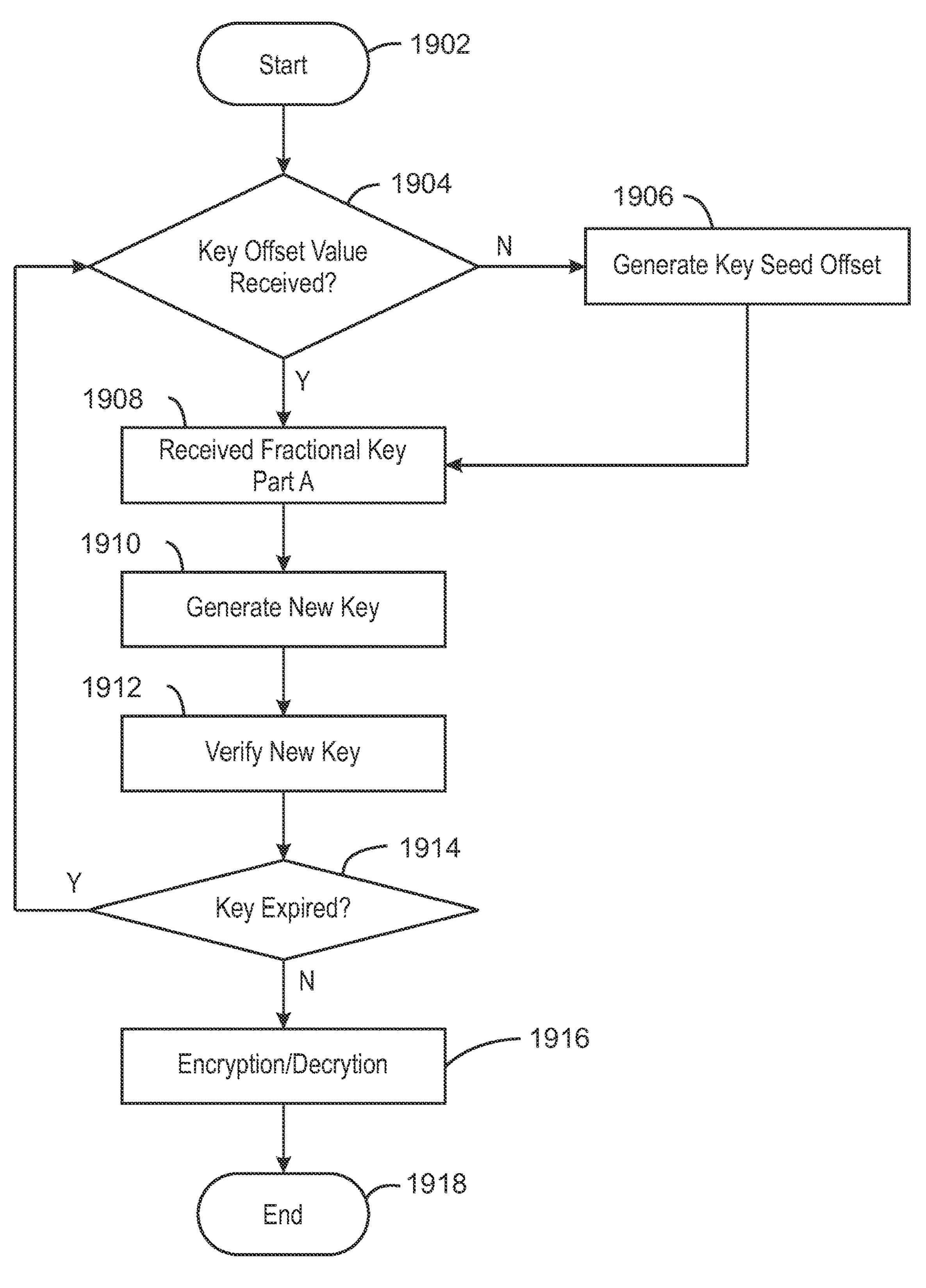
FIG. 19 is a process flow diagram of an example method for generating keys in accordance with some embodiments.

FIG. 19 is a process flow diagram of an example method 1900 for generating keys in accordance with some embodiments. The method 1900 of FIG. 19 may be implemented by the IoT device 2000 described with respect to FIG. 20. Generally, key management is relatively static. Keys, once generated, are used until a compromised situation has been detected, an occasional refresh is required, and the like. However, in IoT networks, disruption and lack of end to end connectivity may be common occurrences. Accordingly, key refresh, and secure dispatch of keys to a large network of devices may be challenging. The techniques described herein may allow for constantly changing keys without direct human intervention. The method 1900 may start at block 1902, for example, when an operating system determines that it is time to change a key or a request to change the key is received.

At block 1904, a determination is made as to whether a key offset value has been received. If not, at block 1906 an offset value for the key may be generated in an IoT device. At block 1908, a fractional key may be received by the IoT device. This may not be needed for example, if a fractional key has already been received by the IoT device. The fractional key may be used, along with other fractional keys received from other IoT devices, to assemble a full fractional key, for example, as described with respect to FIGS. 12 through 16.

At block 1910, a new key may be generated, for example, as described with respect to FIG. 15 or 18. At block 1912, the new key may be verified. The verification may be performed by decrypting a standard message from another node.

At block 1914, a determination may be made as to whether the key is expired. If so, the method 1900 may return to block 1904 to generate a new key.

If the key is not expired at block 1914, at block 1916 the encryption or decryption of a data file may take place. At block 1918, the method 1900 ends, for example, with the transmission of an encrypted file or use of a decrypted file.

In the method, offset values to the internal circular key generators may be dispatched to nodes. Further, although fractional keys may be dispatched to nodes, the nodes may generate their own keys, decreasing a need to send new keys to nodes. Key re-generation may be performed on a regular time-scheduled basis.

Figure 20:
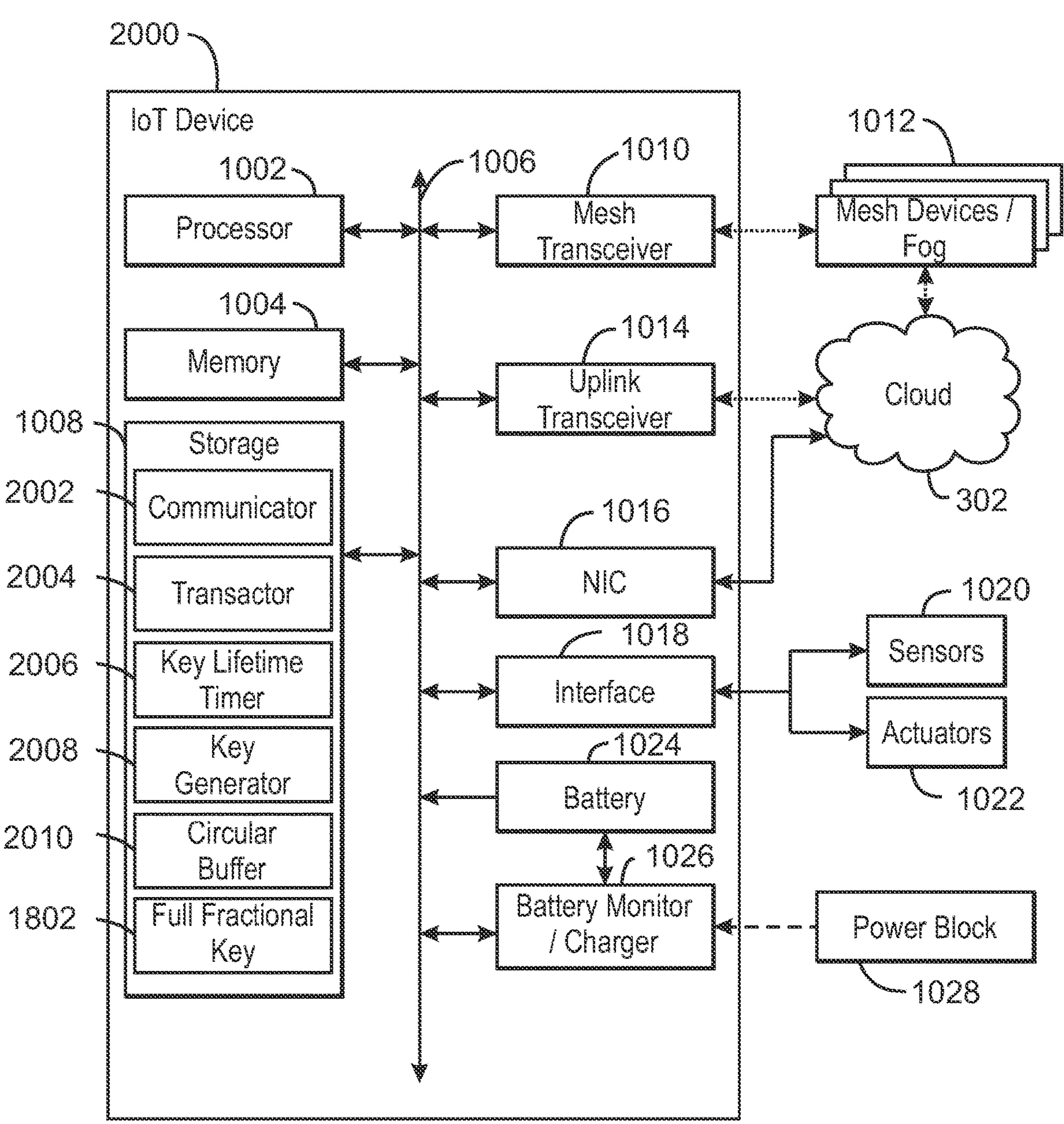
FIG. 20 is a block diagram of an example of components that may be present in an IoT device for generating keys on demand in accordance with some embodiments.

FIG. 20 is a block diagram of an example of components that may be present in an IoT device 2000 for generating keys on demand in accordance with some embodiments. Like numbered items are as described with respect to FIGS. 3 and 10. It can be noted that different components may be selected and used for the IoT device 2000 than for those selected for the IoT device 1000 discussed with respect to FIG. 10, and other IoT devices discussed herein.

The mass storage 1000 may include a number of modules to implement the key generation process described herein.

Although shown as code blocks in the mass storage 1008, it may be understood that any of the modules may be fully or partially replaced with hardwired circuits, for example, built into an application specific integrated circuit (ASIC).

The mass storage 1008 may include a communicator 2002 that sends packets to and receives packets from mesh devices 1012 or devices in the cloud 302 over one more communications links, for example, through a mesh transceiver 1010, an uplink transceiver 1014, and a NIC 1016, among others. In addition to the functions described with respect to FIG. 20, the communicator 2004 may perform other functions, such as translation of packets between protocols, performing proof-of-provenance additions, and the like. Further, the communicator 2004 may be part of an easement system.

A transactor 2004 may commit a transaction to a network, for example, to purchase or rent an item, such as from a device in the cloud 302 or the fog 1012. The transactor 2004 may use a previously generated key, triggering the generation of a new key after the transaction is finished. In another example, the transactor 2004 may generate a new key for committing the transaction to the network.

In other examples, the transactor 2004 may use a key for a particular period of time. A key lifetime timer 2006 may control the period of time the key may be used before a new key is generated. For example, the key lifetime timer 2006 may allow a key to last for one minute, 5 minutes, 30 minutes, an hour, or longer.

A key generator 2008 may generate the new key, for example, using a circular buffer 2010 to perform an XOR of a full fractional key 1802 with the local key 1804, as described with respect to FIG. 18. The full fractional key 1802 may be assembled from fractional keys received from other IoT devices, as described further with respect to FIGS. 12 to 16. For example, the communicator 2002 may receive frames that include fractional keys in the payload of the frame. In this example, the IoT device 1500 may assemble fractional keys received from other IoT devices in the mesh devices 1012, to form the full fractional key 1802.

Figure 21:
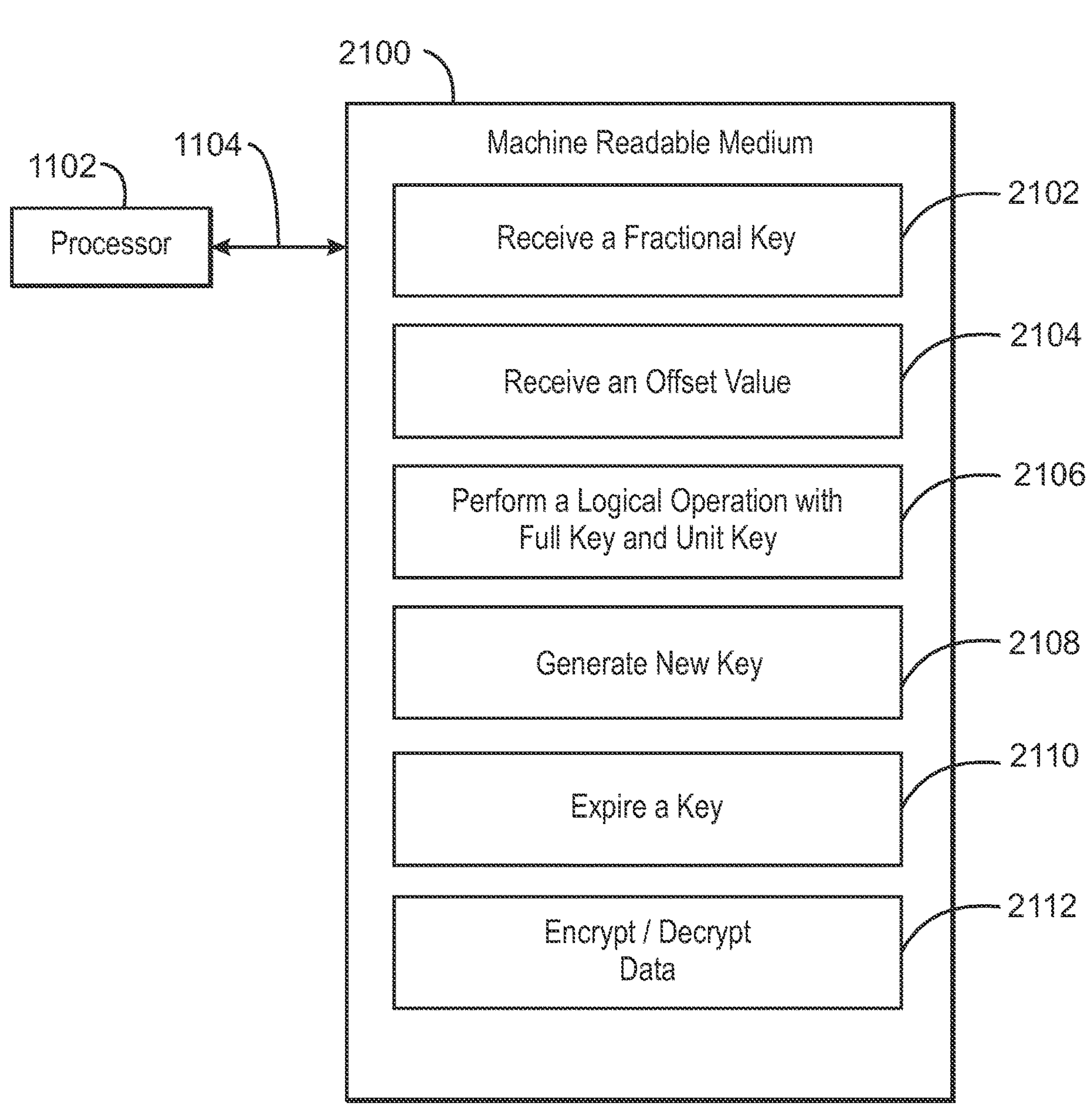
FIG. 21 is a block diagram of a non-transitory, machine readable medium including code to direct a processor to generate keys on demand in accordance with some embodiments.

FIG. 21 is a block diagram of a non-transitory, machine readable medium 2100 including code to direct a processor 1102 to generate keys on demand in accordance with some embodiments. The processor 1102 may access the non-transitory, machine readable medium 2100 over a bus 1104. The processor 1102 and bus 1104 may be as described with respect to FIG. 11. The non-transitory, machine readable medium 2100 may include devices described for the mass storage 1008 of FIG. 10 or may include optical disks, thumb drives, or any number of other hardware devices.

The non-transitory, machine readable medium 2100 may include code 2102 to direct the processor 1102 to receive a fractional key from a sending device. The code 2102 may assemble a full fractional key from a number of fractional keys received from different sending devices. Code 2104 may be included to direct the processor 1102 to receive an offset value for the generation of a key from the full fractional key and a key stored in the device. Code 2106 may be included to perform a logical operation with the full fractional key and the device key to generate a new key, for example, using the offset value. Code 2108 may be included to direct the processor 1102 to generate a new key using other techniques, for example, accessing a blockchain to obtain a new key, randomly generating a new key, or using an entropy multiplexing technique, as described with respect to FIGS. 22 to 26. Code 2110 may be included to direct the processor 1102 to expire a key, for example, when a timer reaches a particular value. Code 2112 may be included to direct the processor to encrypt or decrypt data using the key.

In some situations, distributed collaboration may be complicated by failures in signaling and synchronization between nodes. For example, a peer IoT device may be sleeping or network connectivity may not be reliable. In this case, collaborating peers may use an entropy multiplexing concept to agree on a temporal symmetric key for encryption, message integrity codes, and like.

Figure 22:
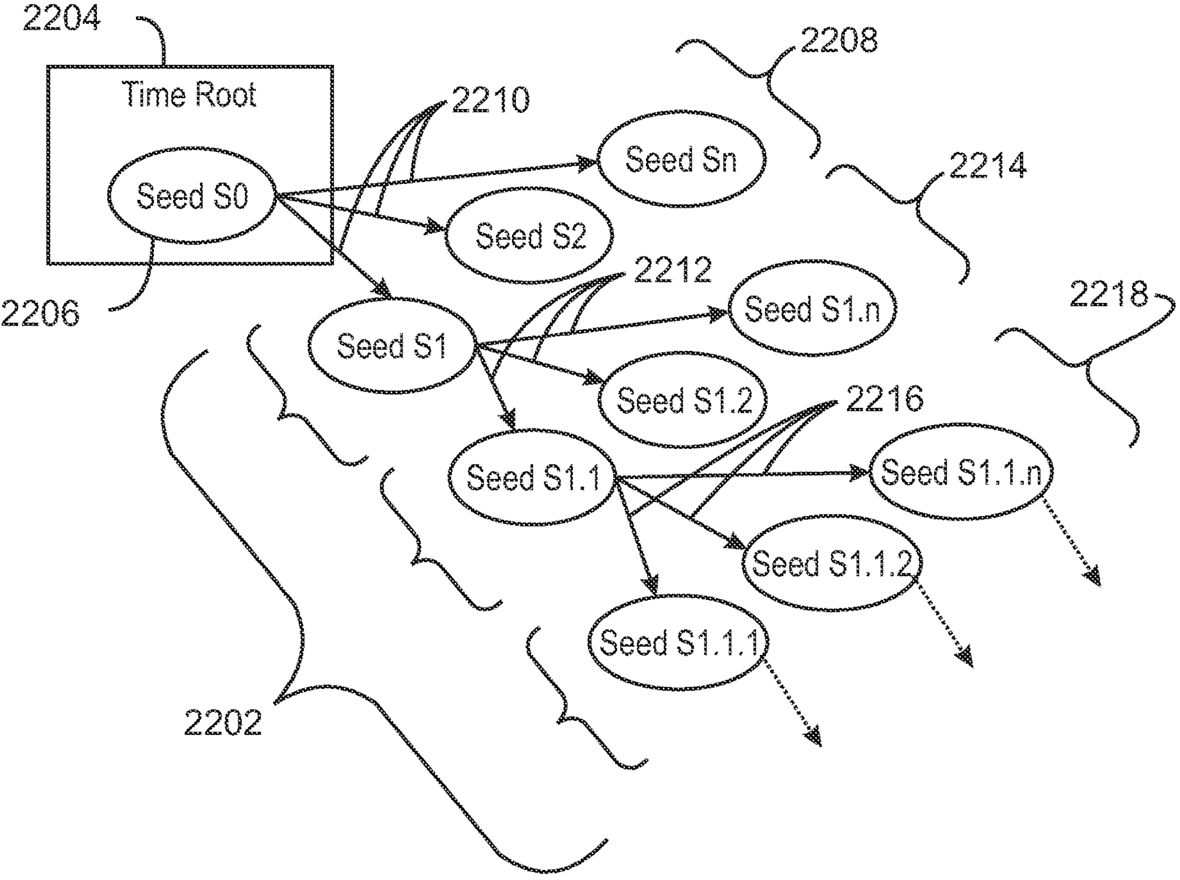
FIG. 22 is a schematic diagram of an entropy multiplexing process for generating a number of seeds that may be used to generate new keys in accordance with some embodiments.

FIG. 22 is a schematic diagram of an entropy multiplexing process 2200 for generating a number of seeds that may be used to generate new keys in accordance with some embodiments. The entropy multiplexing process 2200 builds a seed tree 2202 of seed values used to seed a random number generator. The structure of the seed tree 2202 may be correlated with a contextual attribute, such as time, location, proximity or any other attribute class that can be described using a taxonometric or ontological decomposition method. In this example, the entropy multiplexing process 2200 is based, at least in part, on time.

The seed tree may also use a PRNG that can be viewed as a circular buffer of infinite size, as described with respect to FIG. 15. The tree context establishes the offsets into the buffer based on a repeatable convention for tree construction.

The collaborating nodes may select a time root 2204 and generate a first seed value 2206. The first seed value 2206 may be used as a starting point in an ontology to generate the seed tree 2202. A first lower level of seeds 2208 may be generated using, for example, a year value 2210 of the first seed value 2206. A month value 2212, for example, may then be used to generate a second lower level of seeds 2214. A day value 2216, for example, may then be used to generate a third level of seeds 2218. Further levels in the seed tree 2202 may be generated using successively finer increments, such as minutes, or even seconds.

The collaborating nodes may agree on the first seed value 2206 and the starting point in an ontology. The collaborating nodes may then separately generate and save an individual copy of the seed tree 2202. When a shared secret is needed, for example, relating to the ontological context, the collaborating nodes may independently use that context to search the local copy of the seed tree 2202 locating the common secret. This may then be used to generate a symmetric key for encryption of communications and data between the collaborating nodes.

Any number of other ontological parameters may be used to generate a seed tree. Including, for example, location information, such as address information, GPS coordinates, IP address, and the like.

Figure 23:
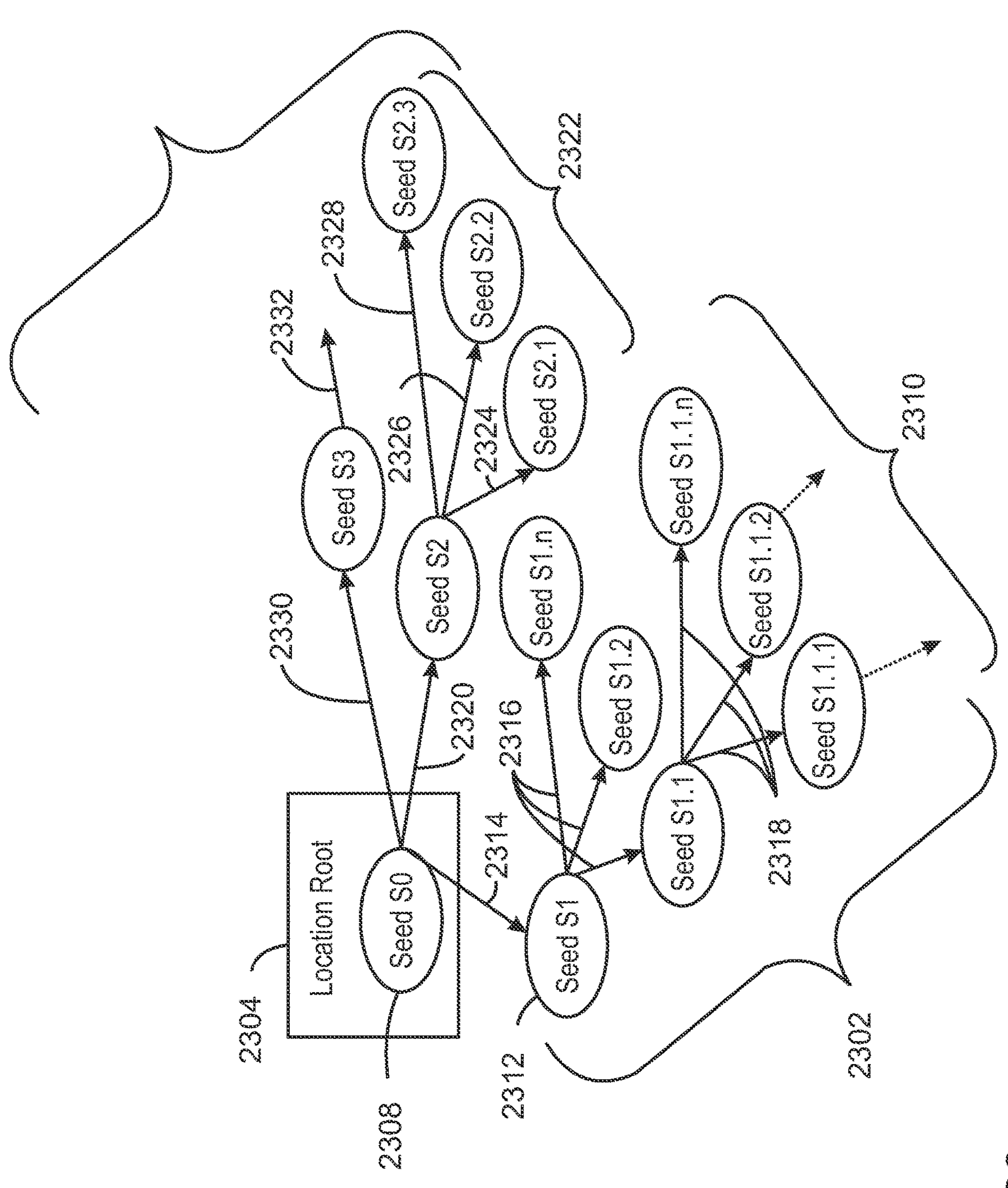
FIG. 23 is a schematic diagram illustrating a process for generating a location seed tree in accordance with some embodiments.

FIG. 23 is a schematic diagram illustrating a process 2300 for generating a location seed tree 2302 in accordance with some embodiments. As for the generation of the seed tree 2202 discussed with respect to FIG. 22, the location seed tree 2302 may be independently generated by a number of collaborating nodes, once a location root 2304, an initial seed 2308, and a tree ontology are agreed-upon. For example, an address seed tree 2310 may be generated from the initial seed 2308 by first generating a seed 2312 from a continent of location 2314. A lower level of seeds may then be generated from country designations 2316. A still lower level of seeds may then be generated from a city designation 2318. Further levels may be generated from street designations or address generations if needed.

Other types of location seed tree 2302 may be generated from other location parameters. For example, a GPS coordinate 2320 may be used to generate a cord and seed tree 2322 in the coordinate seed tree 2322, lower level seeds may be generated from a latitude designation 2324, a longitude designation 2326, or an altitude designation 2328, among others. Other types of location seed tree 2302 may be generated from an IP address designation 2330 sub-portions of the IP address 2332 may be used to generate lower level seeds.

Multiple contexts may be combined to produce a composite shared secret by combining multiple values using a pseudo-random function (PRF) such as HMAC. This may include combining seeds generated from time designations with seeds generated from location designations.

Figure 24:
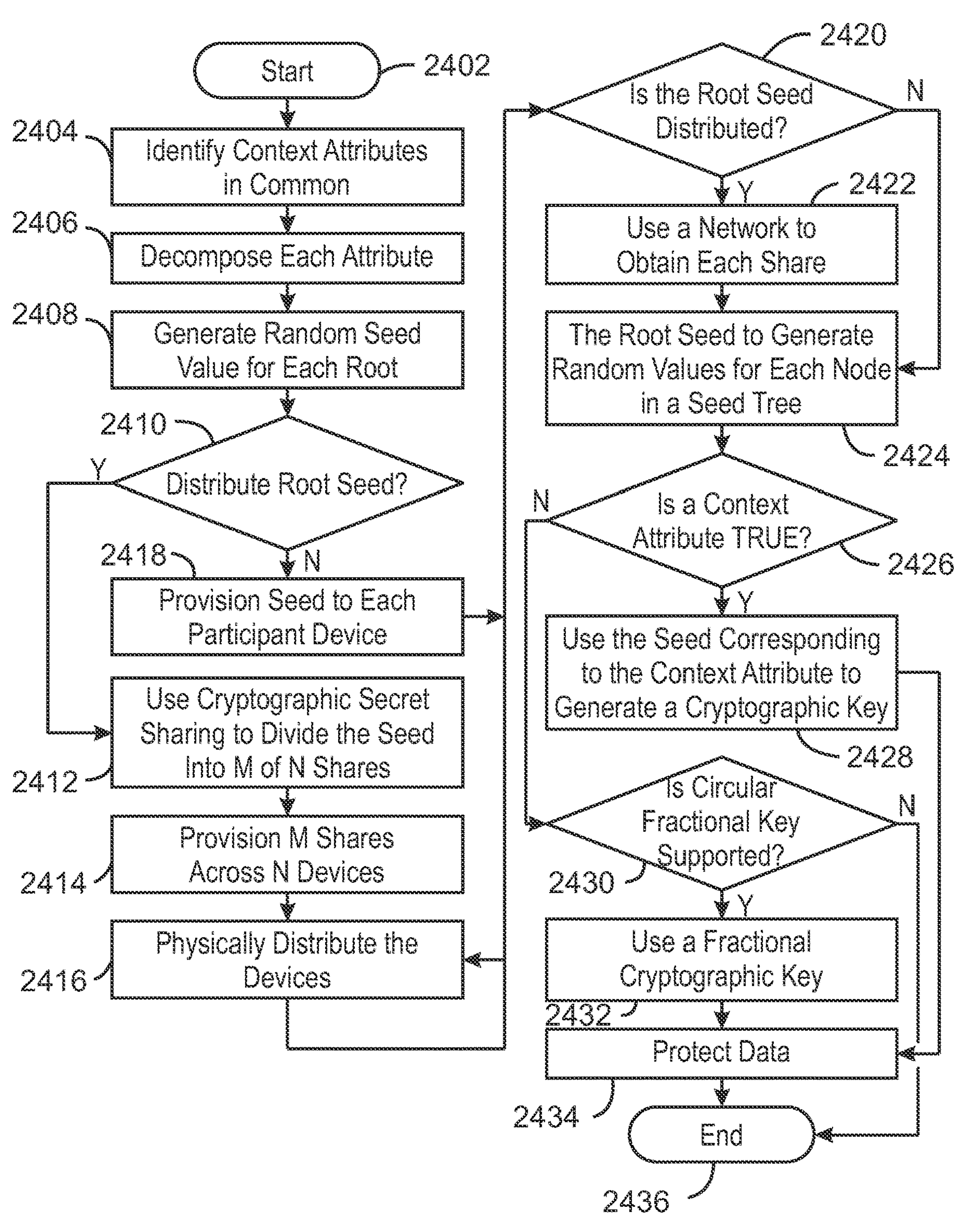
FIG. 24 is a process flow diagram of an example method for generating seeds using entropy multiplexing, and using those seeds to generate keys for encrypted communications in accordance with some embodiments.

FIG. 24 is a process flow diagram of an example method 2400 for generating seeds using entropy multiplexing, and using those seeds to generate keys for encrypted communications in accordance with some embodiments. The method 2400 of FIG. 24 may be implemented by the IoT device 2500 described with respect to FIG. 25. The block 2402 represents, for example, when an IoT device joins a network and needs a common key for encrypted communications.

At block 2404, context attributes in common across the IoT devices are identified. The context attributes may include, for example, time, location, activity, interest, and the like. At block 2406, each of the context attributes may be decomposed to form a set of sub-attributes. The sub-attributes may be used to generate a seed tree for the context attributes. At block 2408, a random seed value may be generated for the root of each seed tree.

At block 2410, a determination may be made as to whether the seed for each root is used to guard against physical threats, such as theft or loss. If so process flow proceeds to block 2412. At block 2412, cryptographic secret sharing may be used to divide the root seed into M of N shares. At block 2414, the M shares are provisioned across N devices. At block 2416, the devices are physically distributed, for example, during implementation of the network. If at block 2410, a distributed root seed is not needed to guard against physical threats, at block 2418 the seed may be provisioned to each participant device.

Once blocks 2402 through 2418 are completed, the IoT devices in a network may generate common secrets to generate symmetric keys for the encryption of data and communications. At block 2420 a determination may be made as to whether the root seed is distributed. If so, at block 2422, a network may be used to obtain each share of the root seed from the N devices. This may be performed using a personal area network including a QR code display and reader to obtain each share.

At block 2424, the root seed may be used to generate random values for each node in a seed tree. This may be performed for each context attribute and hierarchical decomposition.

At block 2426, a determination is made as to whether a context attribute is true. This identifies which seed tree should be used to generate a cryptographic key, if any. At block 2428, the seed corresponding to the context attribute is used to generate a cryptographic key.

If no context attribute is true at block 2426 at block 2430, a determination is made as to whether a circular fractional key is supported. If so, at block 2432, a fractional cryptographic key is generated or assembled from fractional keys submitted by other IoT devices in the network.

At block 2434, the cryptographic key is used to protect data. For example, data to be sent from a first IoT device to another IoT device may be encrypted prior to being sent. Similarly, the cryptographic key may be used to decrypt data sent from the other IoT device.

The process ends at block 2436, once the data has been decrypted or encrypted. If it is determined at block 2430 that no circular fractional key is supported, the process also ends at block 2436.

Figure 25:
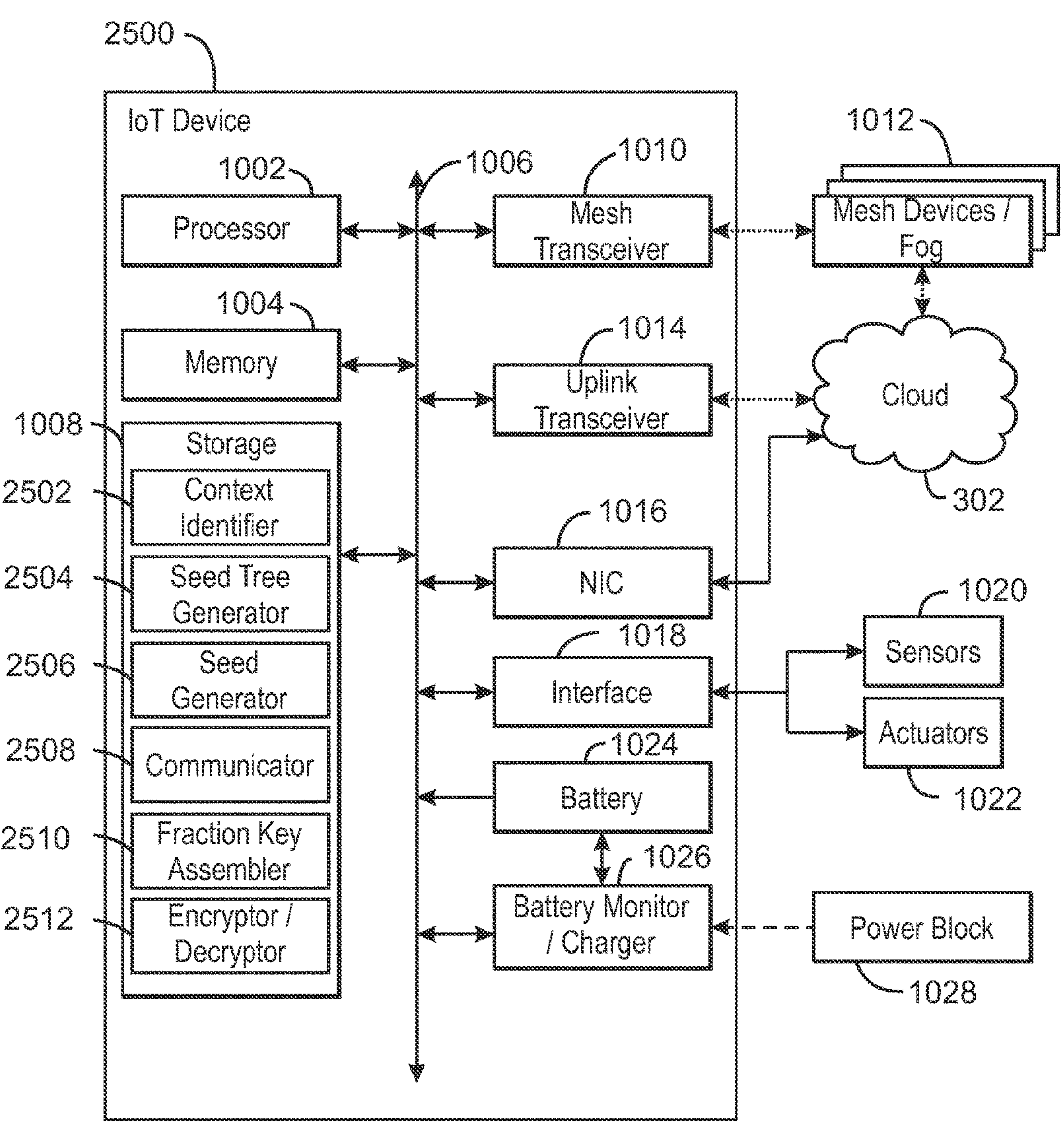
FIG. 25 is a block diagram of an example of components that may be present in an IoT device for assembling multiple fractional keys from different nodes in an IP mesh network into a single complete key in accordance with some embodiments.

FIG. 25 is a block diagram of an example of components that may be present in an IoT device 2500 for assembling multiple fractional keys from different nodes in an IP mesh network 1012 into a single complete key in accordance with some embodiments. Like numbered items are as described with respect to FIGS. 3 and 10. It can be noted that different components may be selected and used for the IoT device 2500 than for those selected for the IoT device 1000 discussed with respect to FIG. 10, and other IoT devices discussed herein.

The mass storage 1008 may include a number of modules to implement the coalition group formation described herein. Although shown as code the mass storage 1008, it may be understood that any of the modules may be fully or partially replaced with hardwired circuits, for example, built into an application specific integrated circuit (ASIC).

The mass storage 1008 may include a context identifier 2502 to determine a context for the generation of the seed tree. As described herein, the context may be based, for example, on time, location, IP address, or any number of other parameters.

A seed tree generator 2504 may generate the seed tree for the context. This may include decomposing the context into parts, for example, breaking down the time into a year, month, day, minute, and the like. The seed tree generator 2504 may create seeds at different hierarchical levels by selecting time increments of that type around the decomposed value, such as setting seeds for your values of minus one or minus two, and the like, from the year value in the time.

A seed generator 2506 may then be used to generate a root seed and a seed value for a node in the hierarchical seed tree. The seed value may be a random number generated using the decomposed levels of the context for that node.

A communicator 2508 may be included to send packets to and receive packets from mesh devices 1012 or devices in the cloud 302 over one more communications links, for example, through a mesh transceiver 1010, an uplink transceiver 1014, and a NIC 1016, among others. The packets may include information used by other nodes to generate a common secret. For example, the packets may include the context, the hierarchical level, the root seed, and the like.

The communicator 2508 may perform other functions, such as translation of packets between protocols, performing proof-of-provenance additions, and the like. Further, the communicator 2508 may be part of an easement system. A fractional key assembler 2510 may assemble fractional keys received from other mesh devices 1012 to form a key, or to recover a value for a root seed.

The fractional key assembler 2510 may assemble each of the fractional keys in a circular buffer to form the final key. An encryptor/decryptor 2512 may use the final key in an operation, such as encrypting data to send to another mesh or fog device 1012, or decrypting data received from another mesh or fog device 1012.

Figure 26:
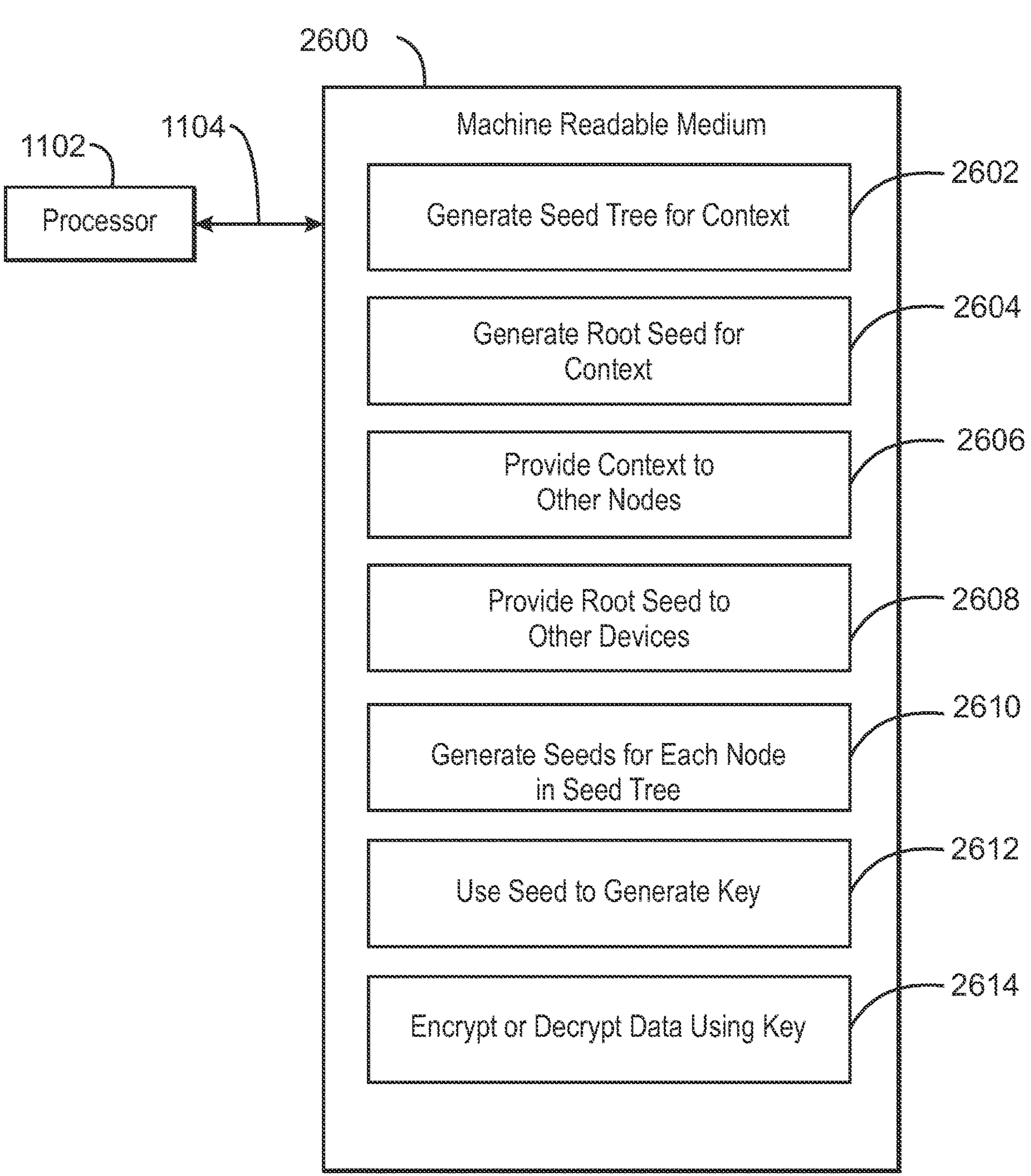
FIG. 26 is a block diagram of a non-transitory, machine readable medium including code to direct a processor to use entropy multiplexing to generate a common secret between devices in accordance with some embodiments.

FIG. 26 is a block diagram of a non-transitory, machine readable medium 2600 including code to direct a processor 1102 to use entropy multiplexing to generate a common secret between devices in accordance with some embodiments. The processor 1102 may access the non-transitory, machine readable medium 2600 over a bus 1104. The processor 1102 and bus 1104 may be as described with respect to FIG. 11. The non-transitory, machine readable medium 2600 may include devices described for the mass storage 1008 of FIG. 10 or may include optical disks, thumb drives, or any number of other hardware devices.

The non-transitory, machine readable medium 2600 may include code 2602 to direct the processor 1102 to generate a seed tree for a context. As noted above, the context may be based, for example, on time, location, IP address, or any number of other parameters. Code 2604 may be included to direct the processor 1102 to generate a root seed for the context. Code 2606 may be included to direct the processor 1102 to provide the context to other devices. Code 2608 may be included to direct the processor 1102 to provide the root seed to other devices. Code 2610 may be included to direct the processor 1102 to generate seeds for each node, or device, in a hierarchical seed tree. Code 2612 may be included to direct the processor 1102 to use the seed to generate a cryptographic key. Code 2614 may be included to direct the processor 1202 to use the cryptographic key to encrypt data sent to other IoT devices or decrypt data received from other IoT devices.

The key management and generation processes described herein provide a number of techniques for managing security in an environment that includes IoT devices. However, in some instances, managing the generation, lifespan, termination, and reissuing of keys may be complex in an IoT network environment.

The key management techniques described herein may be used in any number of contexts. For example, when an object activates and needs to connect, it may use information from a registrar about other services or agents running in the network about how to register itself and to find other services and agents. However, public registrars are prone to distributed denial-of-service (DDOS) attacks. If it is feasible, implementing a registrar based on a decentralized protocol may be useful. In a decentralized protocol, a blockchain or ledger may act as a replacement for a public key infrastructure (PKI) to assess device or agent identities by means of their blockchain addresses. The blockchain may be used as a name space that is secure, memorable, and decentralized. Names in a namespace are a limited resource that may be managed in some decentralized manner. Further, lower level addresses that are usually regulated by leases, such as Internet protocol (IP) in a dynamic host configuration protocol (DHCP), may be charged and regulated by micropayments or other credit or currency.

Figure 27:
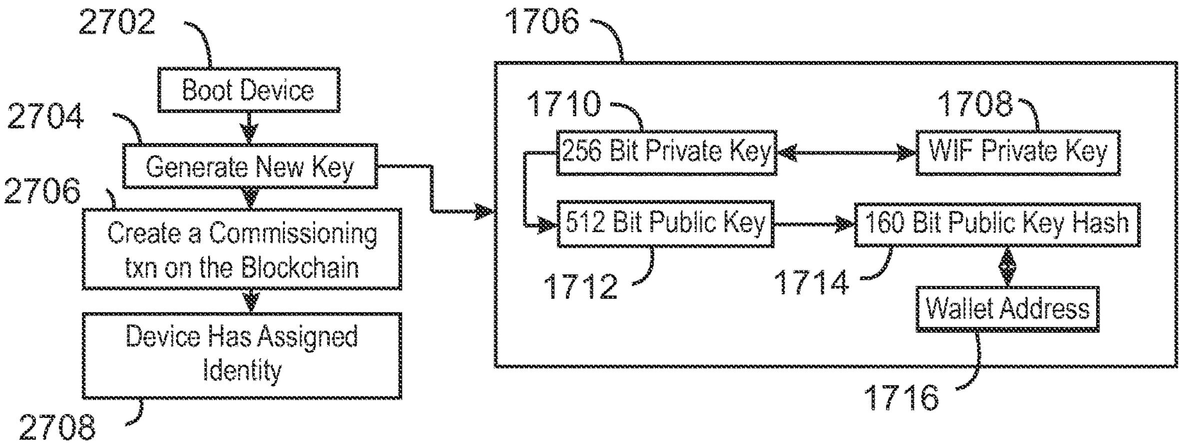
FIG. 27 is a schematic diagram of a process for bootstrap and discovery of a device in accordance with some embodiments.

FIG. 27 is a schematic diagram of a process 2700 for bootstrap and discovery of a device in accordance with some embodiments. As used herein, bootstrap is the initial startup of a device, during which the device may load an operating system and other code to perform functions, from a storage device. The process 2700 may take place in an IoT network environment. The block 2702 represents, for example, when a device would boot and would run code in, for example, a secure enclave or trusted execute environment (TEE), such as establish by a trusted platform module (TPM) or other technologies.

At block 2704, the keys for the device to operate as a blockchain client are generated. This may be performed, for example, by the process shown in block 1706 and described with respect to FIG. 17. However, any number of key generation processes may be used, such as the key generation processes descried with respect to FIGS. 12 to 16, FIGS. 17 to 21, or FIGS. 22 to 26, among others.

At block 2706, the device generates a special commissioning transaction on the blockchain. The commissioning transaction may include purchasing a domain name, or some other unique attribute, which may be part of an overall package of attributes making up the device's identity. At block 2708, the device is assigned an identity provided either through the purchased attribute, such as a domain name or universally unique identifier (UUID), or through an owner.

Figure 28:
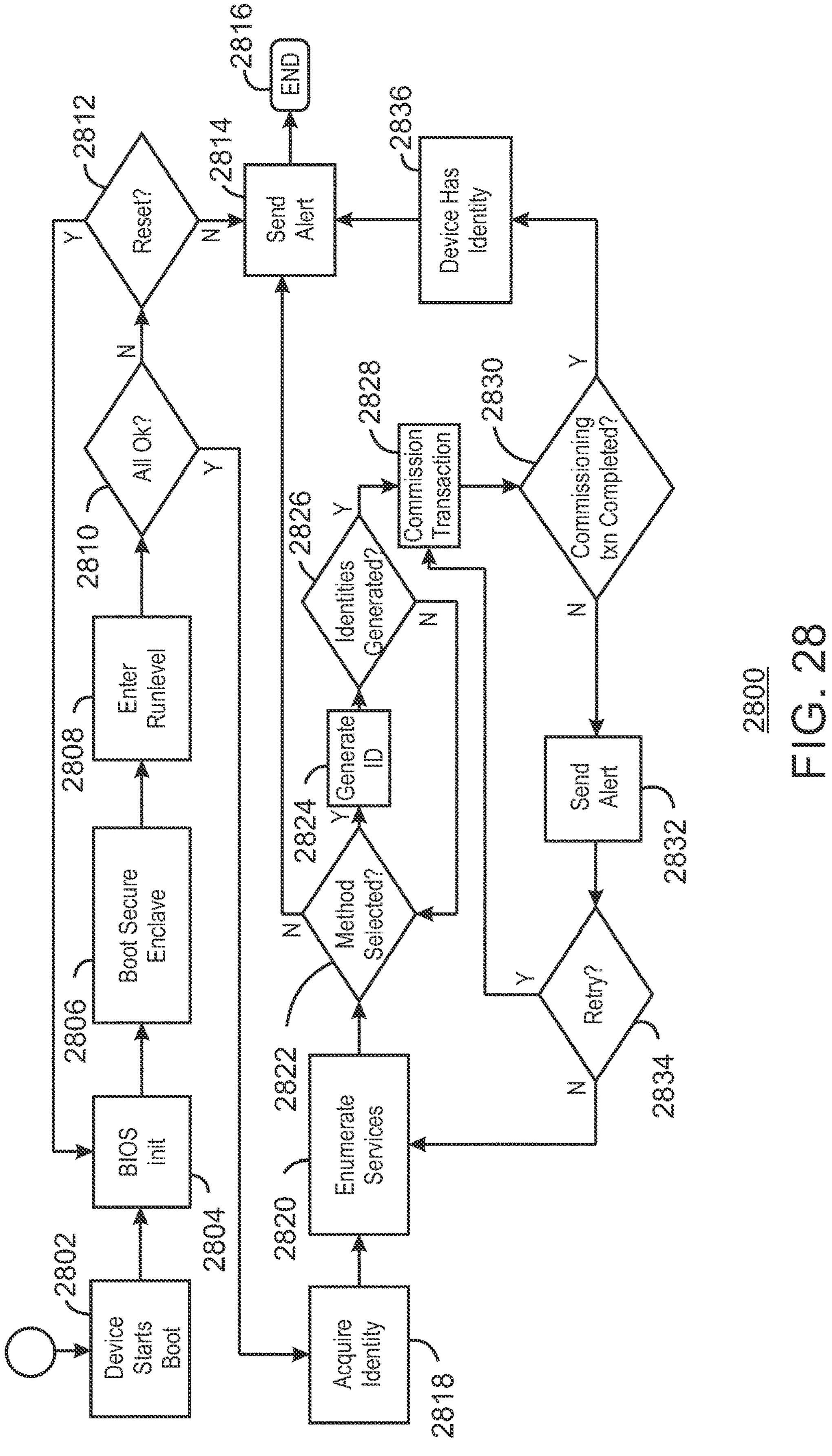
FIG. 28 is a process flow diagram of an example method for bootstrapping and discovery of devices in accordance with some embodiments.

FIG. 28 is a process flow diagram of an example method 2800 for bootstrapping and discovery of devices in accordance with some embodiments. The method 2800 of FIG. 28 may be implemented by the IoT device 3100 described with respect to FIG. 31. The method 2800 may describe a modified boot process that results in a device acquiring an identity. The identity may be used for discovery of services and payment for the services.

The block 2802 represents, for example, when the device starts a boot process. This may occur after the device is first powered or upon a reboot. At block 2804, the BIOS initializes, running normal POST checks. The boot process may be a secure boot process to ensure only trusted SW is run. This is usually performed by hardware enabled by a manufacturer using instructions from a firmware supplier to store keys in the device before deployment.

At block 2806, the secure boot process may boot to a secure enclave or trusted execute environment (TEE). The secure enclave may run an identity client, which could be for example, a Sawtooth Lake Client released by Intel as an open source modular platform for building, deploying, and running distributed ledgers. Once the identity client is initialized, the device may continue to boot as normal. At block 2808, the operating system (OS) boots to an appropriate run level. In some examples, no operating system is present, instead, the device is operated by an advanced BIOS.

At block 2810, a determination is made as to whether the boot process performed correctly. If not, at block 2812, a determination is made as to whether the device should be reset. The reset may be a factory reset of the device, which may wipe all the data from the device and reset it to boot from an on-board read-only ROM image, or the like. If performed, process flow returns to block 2804 to repeat the boot process. If a determination is made that the device should not be reset, at block 2814 and alert message is sent out. The process then ends at block 2816.

If, at block 2810, everything is determined to have functioned correctly during the boot process, process flow proceeds to block 2818 to acquire an identity. Multiple identities may be assigned to devices, for example, devices may have DNS names, IP addresses, MAC addresses, UUIDs, or other methods of establishing their identity. Further, device identifications may be assigned using blockchain techniques, as described with respect to FIGS. 5 through 9, among others. In the present example, a globally unique identity may be acquired in order to participate in a process governed by a smart contract or similar construct. As used herein, a smart contract may be an automatically negotiated contract between two devices, in which a first device performs a service, or provides data, to a second device in exchange for a payment from the second device.

At block 2820, potential services from which an identity can be acquired or discovered are enumerated. The device may perform this function using dynamic or static processes, including, but not limited to, methods such as new DHCP options which specify the location of smart contract or consensus based networks. Further, the potential services may be preloaded into the device, as is the case with some cryptocurrency network clients. The potential services may be advertised in internet based service registries, which the device discovers or is hard coded to use. The potential services may be advertised in a decentralized name service, such as namecoin, among others. Accordingly, the client may become aware of one or more such networks that may use a network identity and begin interacting with any service provided by a smart contract process. Different services or networks may have elected to share identity mechanisms, or they may have completely incompatible approaches to identity.

The device may select services to which it will attempt to subscribe, based on its ability to generate an identity of the type specified by the service or based on its pre-programmed purpose. The services may be statically assigned in the secure enclave during boot or may be set dynamically by a policy system. However, the services may first be verified by processes running within the secure enclave before being trusted.

At block 2822, the device determines if a method by which it will acquire IDs has been selected. As noted, multiple methods may be selected if multiple networks are available for which IDs may be used. If no method is selected at block 2822, an alert message may be sent at block 2814, and the method 2800 ends at block 2816. As the device may have a variety of identities, such as a DNS name, a NetBIOS name, an IP address, a UUID, and the like, the alert may take many forms. For example, the alert may be an email to an administrator, an SMTP trap, an entry in a local or remote log file, an SMS message, a blinking LED sequence on the exterior of the device, or other alerts.

If a method has been selected at block 2822, at block 2824, the device may generate an identity for the chosen service. The device owner may set an option, for example, through a configuration in the secure enclave, to require the device to use identity methods which are hardware backed. In other examples, the owner may make the selection of a hardware backed identity method optional or preferable, which may allow the device to use a less secure method to generate keys or other unique identifiers as required by the service. These settings, or other unanticipated errors or exceptions, may result in the device failing to generate an identity for a particular service.

At block 2826, a determination is made as to whether an identity for the device has been successfully generated. If the identity has not been successfully generated, or a number of identities are to be generated, the method 2800 may return to block 2822 to see if another method can be selected for generating the identification. The device may continue through a list of possible methods or services until it has satisfied its policy settings. For example, a policy may stipulate that the device should stop after it has one identity successfully generated. In other examples, the device may explore all available services, trying many mechanisms of identity generation until successful, or until all options have traversed. The identity generation process may also acquire resources the device may use to carry out transactions, for example, in the case of a crypto-currency network the device may be assigned an initial balance of funds when the identity is assigned.

At block 2828, a commissioning transaction may be generated. The commissioning transaction may be a hardware backed process, which results in the secure and trustworthy generation of a balance for the device. This may include the generation of new coins on the network.

The commissioning transaction may be specific to the particular consensus network. It may validate the identity of the device on the network, and may include the public identity information required by the consensus network. For example, a transaction signed by the private key of the device may include the public key and wallet ID in the transaction, so that the source of the transaction can be easily verified. The commissioning transaction may occur at any time after the identity generation. Further, it may be demand driven, for example, it may only happen the first time the device wants to participate in a transaction. After the first transaction, the identity of the device is publicly known in the network and messages from it can be verified using the mechanism provided by the consensus network.

At block 2830, a determination is made as to whether the commissioning transaction has been completed. If the commissioning transaction has failed, for example, the network has rejected the transaction as invalid, at block 2832 the device generates an alert. Depending on the failure, the device may change some parameters of the transaction and retry the transaction at block 2834. The device may attempt to generate a new identity for that service or select other services for which to generate identities.

An example of a failure that may be retried would be the purchase of a domain name. The domain name may be available when it is checked, and the transaction is generated. However, before it is processed, another entity acquires the domain name. In this example, the device may update the domain name parameter and retry the transaction. Some transactions may fail, but not be able to be retried. For example, a double payment may not be re-playable.

If the transaction has been determined to have been successfully completed at block 2830, at block 2836 the device may be confirmed to have an identity. At block 2814, an alert may be generated to indicate the process is fully complete. The process would then end at block 2816.

If the device is decommissioned at some future point, the blockchain protocol may determine the disposal of the balances, such as mined or assigned coins. The coins may be destroyed, or otherwise removed from circulation. The coins or balance may be redistributed to other devices specified by the device owner. In some examples, the balance or coins may be sold on an exchange and converted to a currency for reimbursement to a device owner.

The process is not limited to the block shown in FIGS. 27 and 28. A more feature rich mechanism using the concept of a blockchain smart contract may be implemented.

Figure 29:
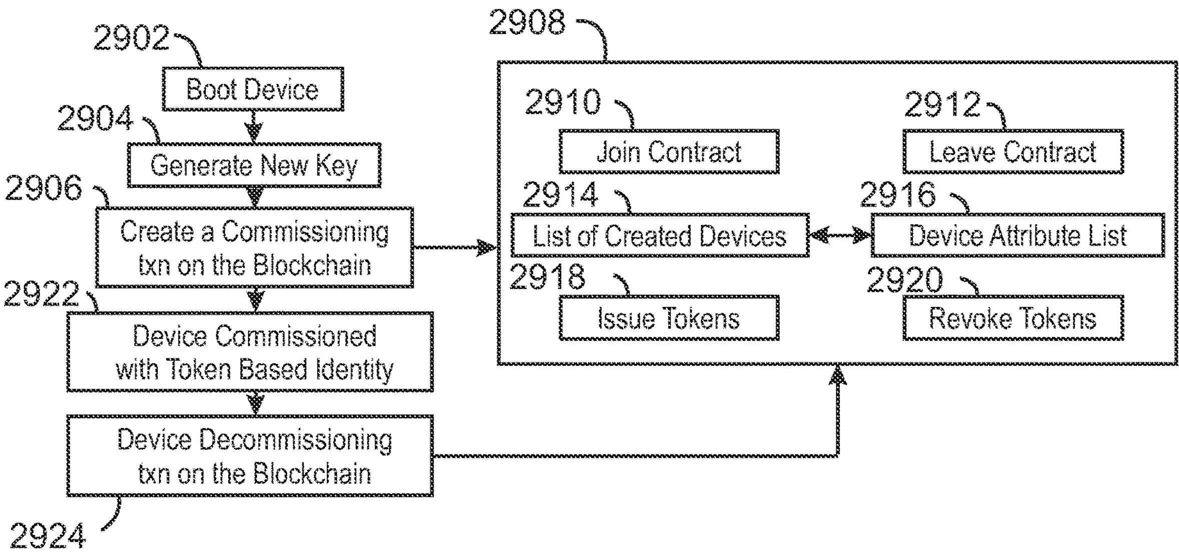
FIG. 29 is a schematic diagram of a process for bootstrap, discovery, and lifecycle of devices using smart contract functions in accordance with some embodiments.

FIG. 29 is a schematic diagram of a process 2900 for bootstrap, discovery, and lifecycle of devices using smart contract functions in accordance with some embodiments. The block 2902 represents, for example, when a device boots. This may occur after the device is powered or may occur after the device has been rebooted. As described with respect to block 2702 of FIG. 27, the device would boot and run code in a secure enclave, such as a TEE.

At block 2904, the device may generate a key to be used as a blockchain client. This may be performed, for example, as described with respect to block 1706 of FIG. 17.

At block 2906, the device may interact with a smart contract 2908 on the blockchain, for example, by creating a commissioning transaction. A join contract function 2910 may be performed when a new device first interacts with the smart contract 2908. The smart contract 2908 may support device attestation features and decide whether or not to accept a particular device in the smart contract 2908. The contents of the commissioning transaction may be used to determine acceptance. The join contract function 2910 may enforce policies on a device before it is allowed to join the smart contract 2908. For example, the join contract function 2910 may require that the device encrypts its hard disk, or storage, using a specified minimum standard before joining. The join contract function 2910 may require other features or extra interactions with the device to prepare it before accepting it into the smart contract 2908.

Similarly, conditions or functions may be imposed upon the device upon leaving the smart contract 2908. These may be part of a leave contract function 2912. For example, the leave contract function 2912 may require that the device wipes its memory, such as performing a factory reset. Other requirements of the leave contract function 2912 may include sending an end-of-life message to a maintenance service provider, such as a service organization, sending a drone, or a robot, with the current device location, so the device may be collected, and then shut itself down. The leave contract function 2912 can contain any number of conditions specified by the contract owner.

If the device is allowed to join the smart contract 2908, it is added to a list of created devices 2914, for example, in the blockchain. Generally, only the control function may be stored in the blockchain. Variables may be stored off-chain in any of a number of different secure storage mechanisms. These mechanisms may have a reference in the blockchain. This may be useful for variables that may have significant storage requirements.

A device attribute list 2916 may be associated with the list of created devices at block 2914. Further, devices may self-describe attributes, and store the attributes either in the blockchain or off-chain in a secure storage mechanism. The attributes may include context properties for a simple device such as a type of device, location, device capabilities and features. The attributes may also include a list of advertised services which the device is offering. This may perform as a service discovery mechanism.

The smart contract 2908 can issue tokens 2918 to devices during the commissioning process, or at any time thereafter. The tokens may have a number of abstract meanings and may be issued for different purposes. For example, if a device meets criteria set within the smart contract 2908, for example, having a certain level of encryption capabilities, then it may be issued a special type of trust token. When accessing a service, the token can be presented to the service to require that a data sink for the data coming from the device has those encryption features. Further, tokens can be used to enable a device to access other services or to verify identity.

The smart contract 2908 can revoke tokens 2920 when a device is ready to exit the contract. Once the token is revoked, the access under that token is no longer valid. The revoked token function 2920 may be triggered by the leave contract function 2912 as part of the conditions of leaving the contract.

Once the device is commissioned on the network, at block 2922, it may begin operations under the smart contract 2908. The device may interact with the smart contract 2908 at any time during its operation to request new tokens if new features become available on the device or if its attributes change.

The relationship of devices to the smart contract 2908 may be many:1, many:many, or 1:many. Tokens and attributes may be changed at any time during the device lifetime by engaging with the contract. The smart contract 2908 may be a part of the device, for example, including a shared blockchain that is mirrored on other devices. In this example, the functions of the smart contract 2908 may be part of the blockchain logic used to maintain the blockchain. In other examples, the smart contract 2908 may be located on another device, in an IoT network, or in the cloud.

At block 2924, the device may be decommissioned, for example, by posting a decommissioning transaction to the blockchain of the smart contract 2908. Any issued tokens are revoked 2920, the device is removed from the list of created devices 2914. Further, the leave contract function 2912 may be implemented.

Figure 30:
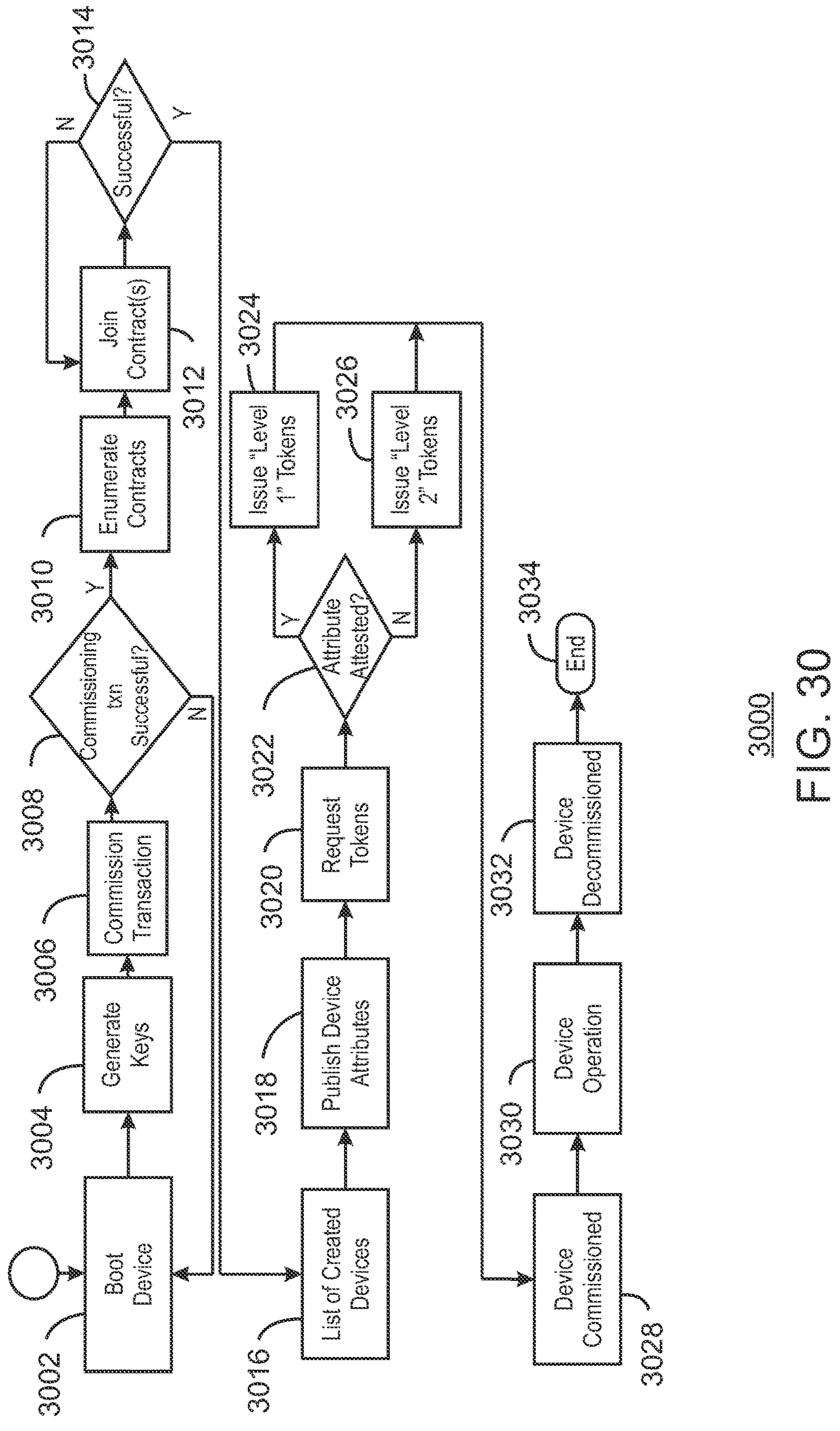
FIG. 30 is a process flow diagram of an example method for bootstrapping, discovery, and lifecycle of devices using a smart contract in accordance with some embodiments.

FIG. 30 is a process flow diagram of an example method 3000 for bootstrapping, discovery, and lifecycle of devices using a smart contract in accordance with some embodiments. The method 3000 of FIG. 30 may be implemented by the IoT device 3100 described with respect to FIG. 31. The block 3002 represents, for example, the device booting. This may be performed as described with respect to blocks 2802 to 2808 of FIG. 28.

At block 3004 keys may be generated for the device to participate in a blockchain or smart contract. The key generation step may be performed as described herein, for example, as described with respect to block 1706 of FIG. 17.

At block 3006, a commissioning transaction may be created and implemented. The commissioning transaction may be as described with respect to block 2828 of FIG. 28. At block 3008 a determination is made as to whether the commissioning transaction was successful. If not, the device may be rebooted as described at block 3002.

If the commissioning transaction was successful, as determined at block 3008, at block 3010 the contracts may be enumerated. As the device may be able to interact in different ways, enumerating the contracts may list the different options. The enumeration may be done in any static or dynamic way, for example, it may be performed on an internet hosted registry of contracts. Further, it may be performed using a lookup method described in section 3.4.3.

At block 3012, the device joins a smart contract by interacting with it, which may involve sending a fee to the wallet address of the smart contract owner. Negotiation may be involved around the fee, for example, the contract may offer options where the device may pay less if it agrees to some terms and conditions such as providing trusted data, or attested attributes. Other negotiation mechanisms can be employed, including those detailed herein.

At block 3014, a determination is made as to whether the negotiation was successful, and if not, the negotiation continues at block 3012. If the negotiation was successful at block 3014, at block 3016 the device is added to a list of created devices, for example, by committing a blockchain transaction. This may be as described with respect to the list of created devices 2914, described with respect to block 2908 of FIG. 29.

At block 3018, the attributes of the device are published. For each attribute, it may be possible to identify if there is a hardware environment, such as a trust execute environment (TEE) supported by a trusted platform module (TPM), or other trusted mechanism, that may be used to attest or verify that the device actually possesses that attribute.

At block 3020, the device may request tokens for functioning under the smart contract. The tokens may be presented by the device to owners of services when trying to access, or offer, services, or resources, once the device is fully operational. The criteria for the issuing of tokens may take features such as attribute attestation into account. At block 3022, if a particular attribute is attested, a higher value token may be assigned to the device at block 3024. If not, a lower value token may be assigned, for example at block 3026. Multiple token types and token volumes may be assigned to the device. However, this is at the discretion of the smart contract owner, when they are designing the smart contract. Some tokens may be consumable, for example, when they are presented to a process, service, or system owner during device operation, they are consumed in a pay-per-use model in which the tokens are transferred from the device's wallet to the owner's wallet. Other tokens may be perpetual, for example, they may be presented merely to verify that the device is a member of a particular smart contract, a group of devices, or to attest to the device possessing specific attributes, capabilities, or features.

At block 3028, the device is commissioned and assumes operation at block 3030. This may be as described with respect to block 2922 of FIG. 29.

At block 3032, the device is decommissioned. If the device included unused tokens, this may or may not result in a refund of currency between parties to the smart contract. The process then ends at block 3034.

Figure 31:
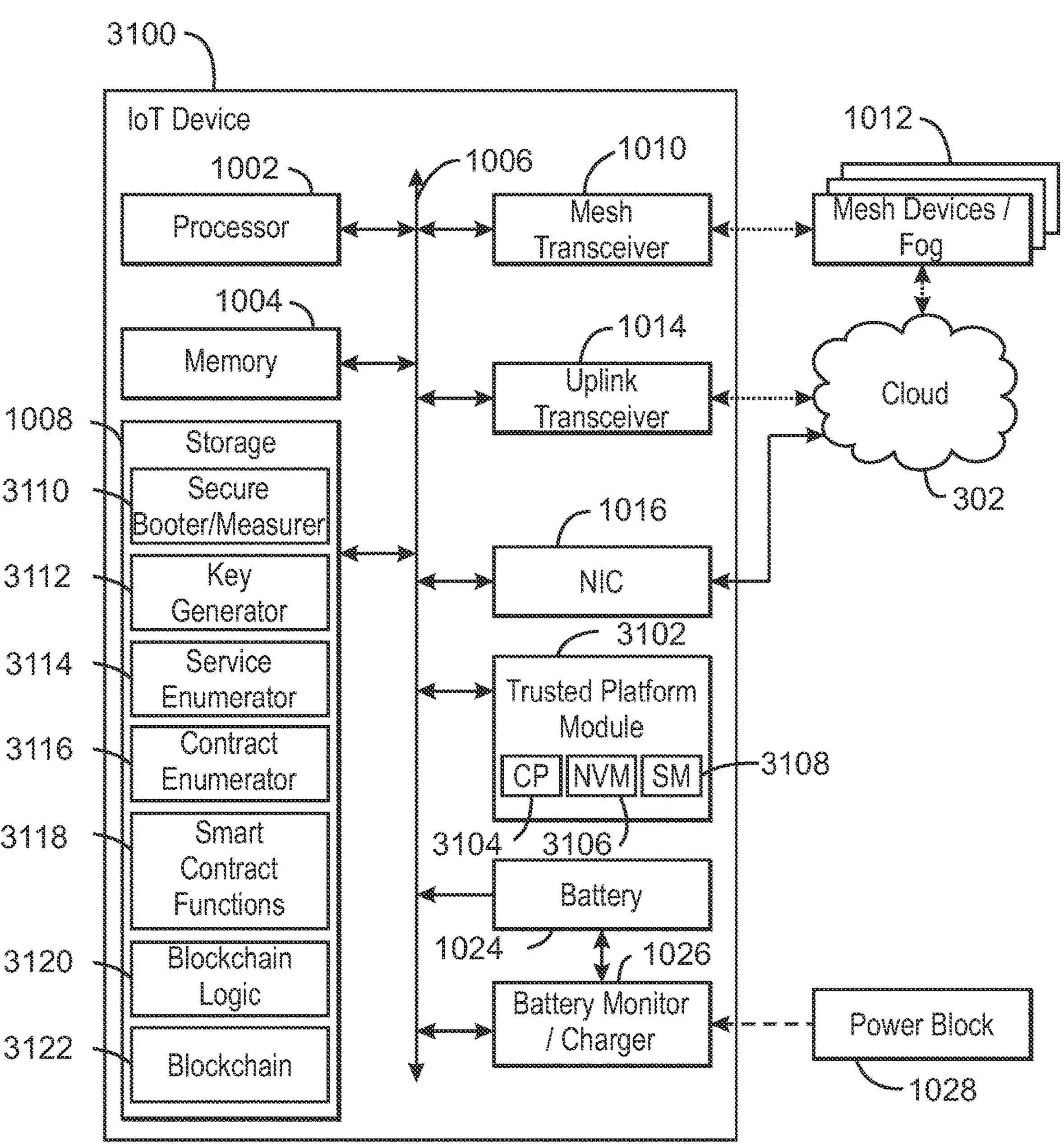
FIG. 31 is a block diagram of an example of components that may be present in an IoT device for bootstrap, discovery, and lifecycle management in accordance with some embodiments.

FIG. 31 is a block diagram of an example of components that may be present in an IoT device 3100 for bootstrap, discovery, and lifecycle management in accordance with some embodiments. Like numbered items are as described with respect to FIGS. 3 and 10. It can be noted that different components may be selected and used for the IoT device 3100 than for those selected for the IoT device 1000 discussed with respect to FIG. 10, and other IoT devices discussed herein.

The IoT device 3100 may include a trusted platform module (TPM) 3102, for example, compliant with the specification promulgated by the Trusted Computing Group as ISO/IEC 11889 in 2009. The TMP 3102 may include a cryptographic processor (CP) 3104, non-volatile memory (NVM) 3106, and secure memory (SM) 3108. The CP 3104 may provide a random number generator, an RSA hash generator, a SHA-1 hash generator, and an encryption-decryption engine, among others. The NVM 3106 may include keys programmed at the time of manufacture that include, for example, an RSA key, among others. The SM 3108 may hold measurements taken on software in platform configuration registers. As used herein, a measurement may be a hash code calculated on a code or data segment stored in the storage 1008 or memory 1004. Starting from a measurement of a boot code segment, the measurements may be used to establish a trusted execution environment (TEE), by creating a chain-of-trust from the initial booting. The SM 3108 may provide secure storage. The TPM 3102 may be used to establish a TEE, or secure enclave, for running programs.

The mass storage 1008 may include a number of modules to implement the key management functions described herein. Although shown as code blocks in the mass storage 1008, it may be understood that any of the modules may be fully or partially replaced with hardwired circuits, for example, built into an application specific integrated circuit (ASIC).

The mass storage 1008 may include a secure booter/measurer 3110 that performs measurements on code or data. An initial boot measurement may be performed by the processor 1002, or the CP 3104, to set up the secure booter/measurer 3110 to perform additional measurements.

A key generator 3112 may be used to generate keys for communications with other devices. This may be performed, for example, by the process shown in block 1706 and described with respect to FIG. 17. However, any number of key generation processes may be used, such as the key generation processes descried with respect to FIGS. 12 to 16, FIGS. 17 to 21, or FIGS. 22 to 26, among others.

A service enumerator 3114 may be included to enumerate services available to the IoT device 3100 or services that can be provided by the IoT device 3100. For operation in smart contract environments, a contract enumerator 3116 may discover contracts that the IoT device 3100 may join. The contract enumerator 3116 may use any number of discovery technologies to discover contracts, such as the functions provided as part of the specifications provided by the Open Connectivity Foundation, the Allseen Alliance, or the Open Fog Consortium, among others.

Smart contract functions 3118, for example, as described with respect to block 2908 of FIG. 29, may be included to support the use of the IoT device 3100 as a host for a smart contract.

Blockchain logic 3120 may be included to maintain a blockchain 3122 that holds services, attributes, identities of devices, contracts, coin balances, and the like. The blockchain logic 3120 may be used to propagate the block chain transactions to other IoT devices.

Figure 32:
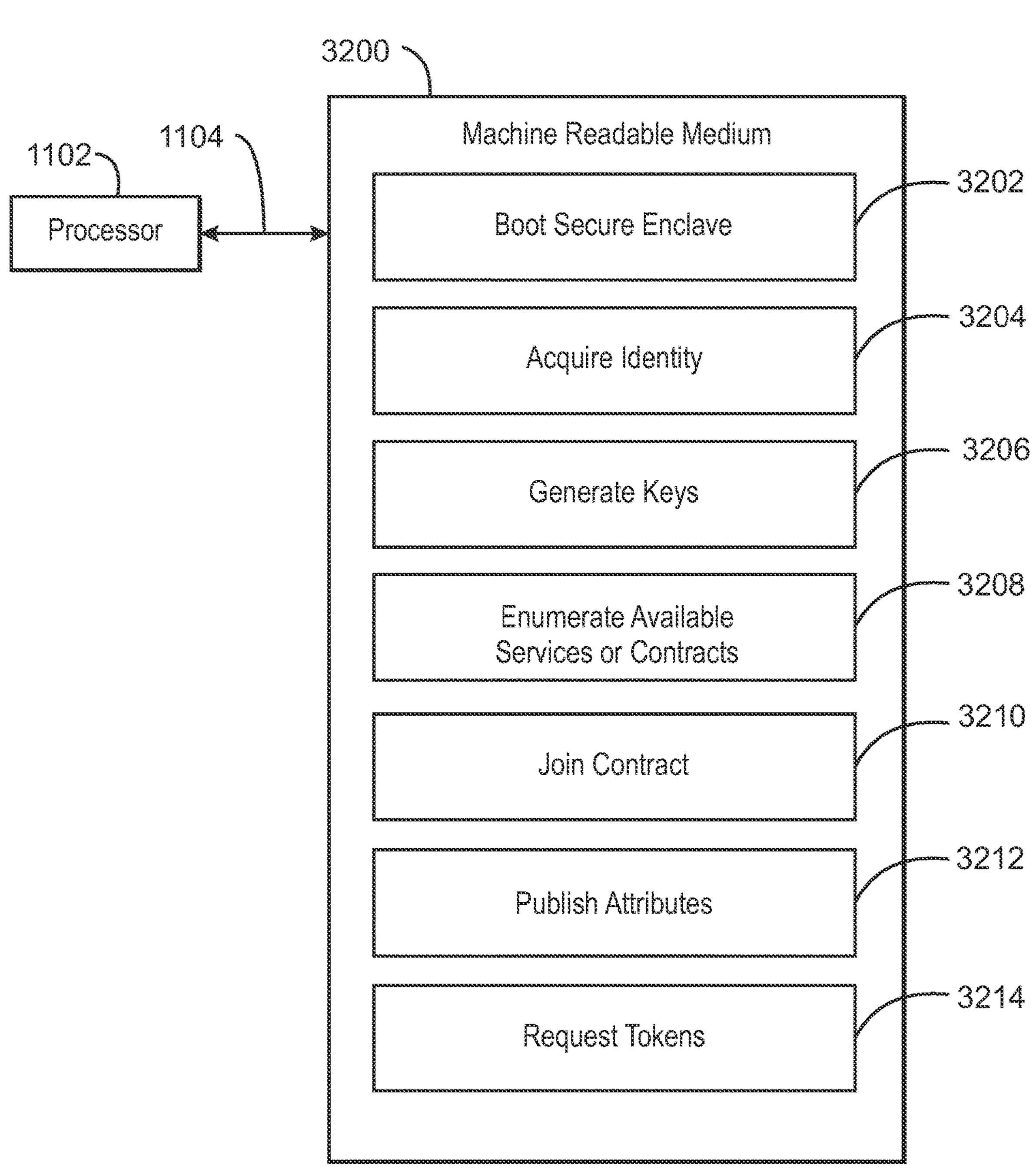
FIG. 32 is a block diagram of a non-transitory, machine readable medium including code to direct a processor to manage keys for secure communications in accordance with some embodiments.

FIG. 32 is a block diagram of a non-transitory, machine readable medium 3200 including code to direct a processor 1102 to manage keys for secure communications in accordance with some embodiments. The processor 1102 may access the non-transitory, machine readable medium 3200 over a bus 1104. The processor 1102 and bus 1104 may be as described with respect to FIG. 11. The non-transitory, machine readable medium 3200 may include devices described for the mass storage 1008 of FIG. 10 or may include optical disks, thumb drives, or any number of other hardware devices.

The non-transitory, machine readable medium 3200 may include code 3202 to direct the processor 1102 to boot into a secure enclave. Code 3204 may be included to direct the processor 1102 to acquire an identity. Code 3206 may be included to direct the processor 1102 to generate a key for communications.

Code 3208 may be included to direct the processor 1102 to enumerate available services or smart contracts. Code 3210 may be included to direct the processor 1102 to join a smart contract. Code 3212 may be included to direct the processor 1102 to publish attributes or services available from the IoT device. Code 3214 may be included to direct the processor 1102 to request tokens to operate under a smart contract.

To participate in a network, a device or agent requiring data or resources may search the network and other interconnected networks to acquire the data or resources. As used herein, the data may be any data needed to complete a function in the present device, such as distance traffic flow for an intersection controller. Resources include any function that may be used to complete a task, such as a predictive model run on an upstream system, or code used to perform a local function, among others. However, flooding the network with queries may overload the network communications, and may cause problems for energy constrained devices. Further, centralize networks may be vulnerable to distributed denial-of-service (DDOS) attacks. The use of a ledger or blockchain certified credit may help decrease network loading and allow objects to better manage their resources, as well as lowering the vulnerability of the network to DDOS attacks.

To better organize resources for tracking, the resources may be distributed in a distributed hash table (DHT) based network such as Kademlia. In a Kademlia network consisting of n nodes, finding any node in the network will take a maximum of O(log(n)) hops. Additionally, such networks use the concept of k-buckets, which effectively means that nodes in a network know their own neighborhood well and thus, their local k-bucket will have a large number of nodes. However, in some cases, the further away nodes are from a node, the less nodes will be present, indicating that k-buckets with lower k values will have fewer nodes.

As noted, current blockchain techniques may build a Merckle hash tree as a way to index to a particular block in the block chain. If a block hash is known, the block may be efficiently located in a repository of blocks. This may be considered a form of DHT. DHT may also be used to identify specific data that are included in a blockchain. In this approach, a data value may be hashed to a DHT where the location in the DHT database reveals the blockchain block hash where the data can be found.

A system that wants to verify the trust of the data may follow a two-step lookup process, where the interesting data are hashed to a DHT location. That location reveals the block hash values. The block hash values are hashed into the Merckle Tree revealing the actual block in the block chain. A calculation of the block hash and check of the next previous block verifies the block integrity within the chain. In this way, any data that is recognizable in a DHT may have its integrity validated according to an infrastructural trust mechanism.

A bloom filter mechanism, as described herein, may be implemented using DHT. When a DHT value is used to form a bloom filter, it may indicate that there is a topic for that data item available for subscription by a community of subscribers. The community may be interested in the bloom filter value and may be notified whenever a transaction involving the data value is found on a blockchain.

Data analytics is intended to find correlations between seemingly uncorrelated data. Hence, an analytics engine might hypothesize a previously unanticipated correlation, and may subscribe to these topics. If the DHTs for the hypothetically correlated values fire within a frame of time that is statistically interesting, then a data analyst can test his hypothesis. Given a significant body of transactions mapped to the blockchain, this may enable efficient notification of data analysts' hypothesis testing.

This approach to a network structure means queries to far away nodes may return detailed information about the remote neighborhood without having to replicate a complete network map to every participating node. This may keep the network much more dynamic. Broadcasts to discover resources in the local network are relatively inexpensive and the federated nature of an overall network means that the level of resource discovery broadcast traffic across the entire network may be reduced.

However, prior consensus networks do not incorporate this concept because the methods of how to use a blockchain as a control plane with a complementary off-chain data/storage plane were not developed. Therefore, aspects disclosed herein provide a method, which may be used to enable this, and thus, address issues of scalability that arise as more data is stored on-chain over time.

As described herein, a blockchain designed so that the consensus nodes are distributed in a k-bucket fashion may improve the efficiency of the blockchain to locate resources. The k-buckets may introduce local, segmented networks are semiautonomous and where locally available services and contracts can be stored without distributing them to the entire network. This storage may be done off-chain or on-chain.

As described herein, devices may wish to locate service, smart contract and other information within the network. Storing such information in the chain may create scalability and performance issues as the blockchain can be considered a control plane, rather than a data plane. Using this concept of ledger certified credit, a dynamic cost can be associated with each hop that it takes to acquire a service or smart contract. While a global search may result in the best available matches, it may cost more in terms of time and credit to perform. A searching entity must therefore make a tradeoff decision between paying the cost for a hop or being satisfied with the current search result, which could be an empty set. The resources being searched for must be in a discoverable format and the idea of a bloom filter could be applied as a technique to further increase the efficiency of searches across the network.

Devices can use peer devices to collaboratively compose a complex task, including for example an exchange of data, access to instrumentation across multiple architectures, and parallel processing. In an example, to compose a complex device across multiple devices, a device may identify possible peers. Once the potential peers have been identified, a device may encode a digital permissions guide for use among the peers. The permissions guide may be a set of policies or rules that determine what services or functions a peer device is permitted to use, access, or provide to other peers. As part of the permissions guide, the device may request the peers to automatically commission themselves to perform subtasks from the complex task and obtain a signature from one or more peers and any users associated with peer devices, as may be outlined in the permissions guide or task. In an example, in response to the device detecting all parties have signed the permissions guide, the device may then provide a signal for the subject matter of the permissions guide to be activated. The actions outlined in the permissions guide may be enacted through a blockchain. In an example, a value or credit can be transferred to designated parties as outlined and agreed to in the permissions guide of the device.

The use of the permissions guide and the use of collaborative devices can also be used in the formation and control of ad-hoc networks. The control of an ad-hoc network by these permissions guides can be limited in time or based on time designations outlined in the permissions guide. In this concept, permissions guides can be created either by humans or by machines acting autonomously.

Figure 33:
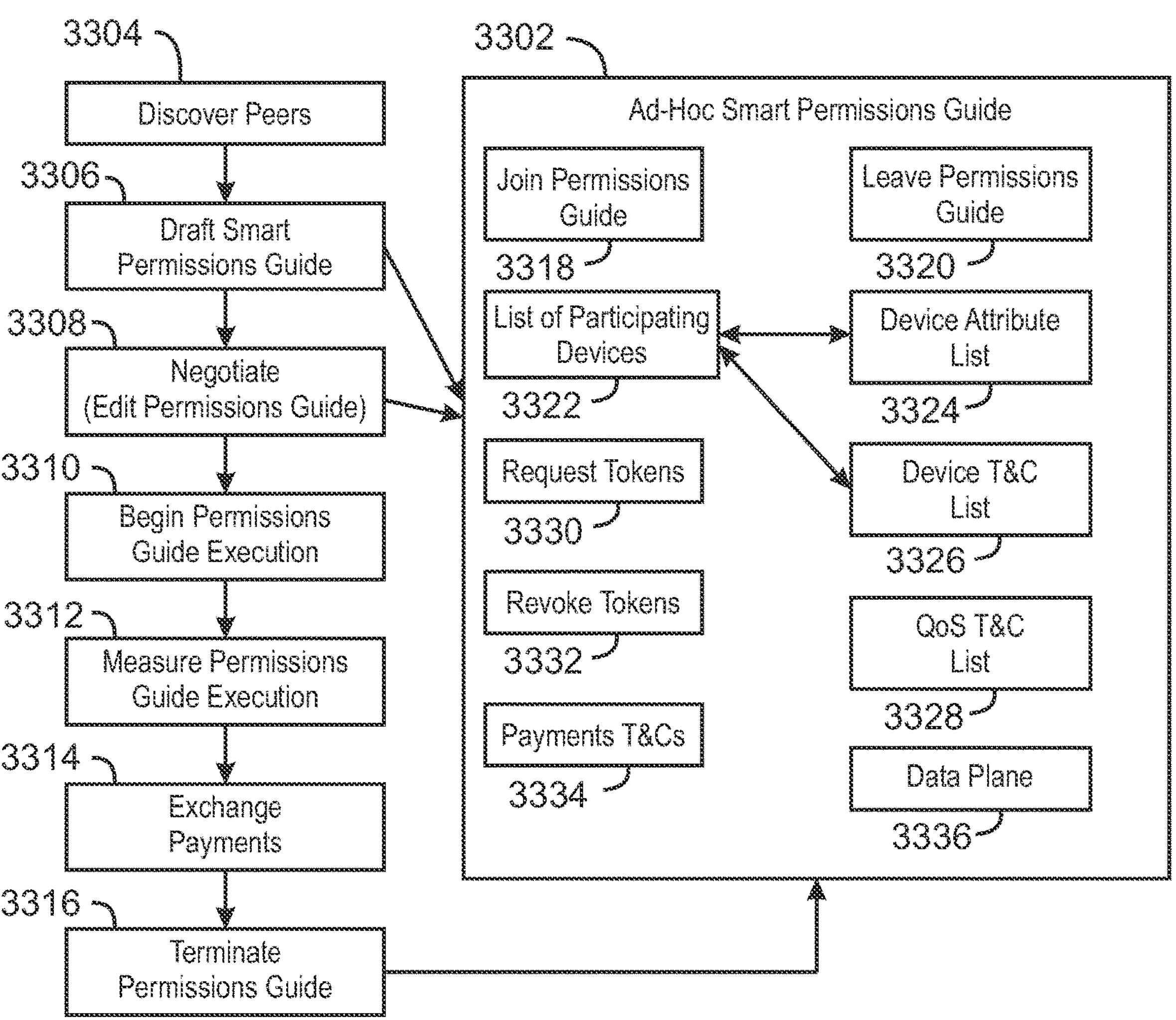
FIG. 33 is a schematic diagram of an example method for a task definition and commissioning in accordance with some embodiments.

FIG. 33 is a schematic diagram of an example method 3300 for task definition and commissioning in accordance with some embodiments. The method 3300 of FIG. 33 may be implemented by the IoT device 3500 described with respect to FIG. 35. The schematic shown can represent task definition and commissioning for ad-hoc permissions guide and permissions guide functions 3302. A process of interaction however can begin at 3304.

At block 3304, a device can identify the peers it uses to carry out a task. While devices can perform this discovery, the term device in this context can also refer to agents or services acting through a single device or a number of devices. The discovery of peers and their capabilities at block 3304 can be through a discovery procedure of the device, the system of request, a defined protocol or through a bloom filter hop method of resource discovery as described above.

At block 3306, a device may generate a permissions guide and permissions guide functions 3302. The permissions guide and functions may be machine readable. The permissions guide can be stored on a block-chain, off a block-chain. In an example, the permissions guide can be discoverable and can advertised to the peers discovered by the device. At block 3306, the device can compose a function to be performed into discrete functions to be written into a permissions guide. In an example, the function can be fixed function, general purpose, or specialized code segments. The functions can be authored by human developers, Artificial Intelligence (AI) methods for generating code, or any combination. In an example, the functions may be generated through genetic algorithms.

At block 3308, a permissions guide may be negotiated or edited by the device, peers, or any other party in an ad-hoc network of the devices and peers. Many different aspects of the permissions guide can be edited. For example, the permissions guide may have a format described above that contains methods for joining and leaving the permissions guide. As part of negotiating the permissions guide, edits may be made after the permissions guide advertises attributes and functions of the permissions guide. In response to the advertisement of attributes or functions, the peers of the device may agree to supply these attributes or functions by agreeing to the permissions guide or inserting or editing it. In an example, the device can, through the permissions guide, request the generation of tokens if an authorization by the device or a peer is provided in an attempt to access any services among the peers resources and other functions. In an example, the permissions guide can include functions with limits that have additional information including time constraints, quality of service, or a quality of data. In an example, the permissions guide can include other conditions that a permissions guide owner may request from participating peers. The permissions guide may outline a limited use of source peers. In an example, the permissions guide may move to permit multi tenancy.

As discussed above, terms can be negotiated by peers. For example, a data consumer and a data providers can have a mechanism to negotiate on terms before entering into the permissions guide. In an example, the parties may advertise terms and rates. In an example, the terms and rate can be negotiable. In this way, the entities partaking in the permissions guide can retain a position to ensure that they do not get bound into an unprofitable permissions guide. Examples of these conditions may include minimum subscription rates and periods which data suppliers may want to impose.

At block 3310, the permissions guide can execute. The execution of a permissions guide can be run indefinitely. In an example, the execution of the permissions guide can be for a fixed and specified time. In response to the failure of communications with service providers or data providing peers with permissions guide, the permissions guide may terminate. Similarly, new peers can take over functions of the permissions guide if they improve on function performance from the device or service. Improvement of permissions guide function can include the performance of services used in the permissions guide at lower rates, higher data quality, or other measurable metrics. In an example, a listing of mechanisms for execution during permissions guide execution can be recorded to a permissions guide before the permissions guide commences.

At block 3312, the execution of the permissions guide can be monitored. Monitoring execution of the permissions guide can include searching for new peers and new nodes. At block 3314, a payment can occur between participating parties in response to an agreed upon condition of the permissions guide being met. In an example, the payment can be specified in the permissions guide. At block 3316, the permissions guide can be terminated once the period of the permissions guide expires. In an example, the permissions guide can be terminated in response to a determination that any of the participating parties leave the permissions guide and no replacement parties can be located. In an example, the permissions guide can be terminated in response to a detection that the purpose for which the permissions guide was created has been fulfilled.

Within the ad-hoc permissions guide 3302, the permissions guide functions may be described. For example, a function within the ad-hoc permissions guide 3302 can include join permissions guide function 3318. The join permissions guide function can implement as it has been described above. The ad-hoc permissions guide 3302 can also include a leave permissions guide function 3320 as described above. The ad-hoc permissions guide 3302 may include a function to list of participating devices 3322 which may be similar to other listing device functions described above. The ad-hoc permissions guide 3302 may include a device attribution list function 3324 as described above.

In an example, the ad-hoc permissions guide 3302 may include a function to account for terms and conditions of devices added to the ad-hoc permissions guide 3302. The device terms and conditions listing function 3326 may allow devices joining the permissions guide to have conditions on their terms of service included as parameters or functions within the ad-hoc permissions guide 3302. In an example, the device terms and conditions listing function can also include a function for enforcing penalties that can be agreed upon as part of the permissions guide to be imposed on or agreed to by participating parties of the permissions guide.

In an example, the ad-hoc permissions guide 3302 may include a function to account for the quality of service (QOS) terms and conditions (T&C) list 3328. In the QoS T&C list 3328 may include allowing a consumer of service data from a permissions guide to stipulate QoS rules about the supply of the service and data. These rules can include, for example, specification of data availability, service availability, frequency of supplied data, accuracy of supplied data, and the granularity of the data. The QoS T&C list 3328 may also include a rule if the data is from a trusted sensor, where the data may be from a trusted sensor when the providence of the data can be shown to have come from, for example, a measurement by a sensor as opposed to being a value generated by a piece of code in a processor. The ad-hoc permissions guide 3302 may include a request token function 3330 and the revoke token function 3332 as described above.

In an example, the ad-hoc permissions guide 3302 may include a function to account for the payment terms and conditions. Accordingly, the ad-hoc permissions guide 3302 may include a payment T&C function 3334 to show events that trigger payments between the parties. In an example, these events that trigger payment between parties may include the fulfilment of supply of service of a subscription, the fulfillment of supply of data on a subscription. The T&C functions 3334 can be written to function within the framework of a pay-per-use model, or other model where there can also be a function for the imposition of a penalty on a party to the permissions guide for failure to comply with a previously agreed condition.

In an example, the ad-hoc permissions guide 3302 may include a data plane function 3336. The data plane function 3336 may allow parties to the permissions guide to agree how the data or service will be supplied and consumed. The data plane function 3336 may specify that data may be shared in an off-chain mechanism, and the data plane function 3336 may specify specific endpoints and endpoint technologies to which data can be made available. In one example, the data can be made available through a function subscribing the endpoint to a source or through a function that publishes data for consumption. In an example, the means of data consumption and service consumption by parties participating in the permissions guide 3302 may include authentication and authorization information. Parties to the ad-hoc permissions guide 3302 may supply a service or data and may specify how the parties may make consumption preferences available. Parties consuming data and services may also specify preferences on how the consuming parties may consume authentication and authorization.

The overlap shown for supply and consumption technologies may allow the parties to agree on methods of sharing for services and data without a human getting involved. In an example, a protocol conversion broker may be introduced as a party who may join the permissions guide 3302 to offer automated conversion or automated proxying of the service and of the data to the endpoint type or data format desired by the consumers and consuming parties.

Figure 34:
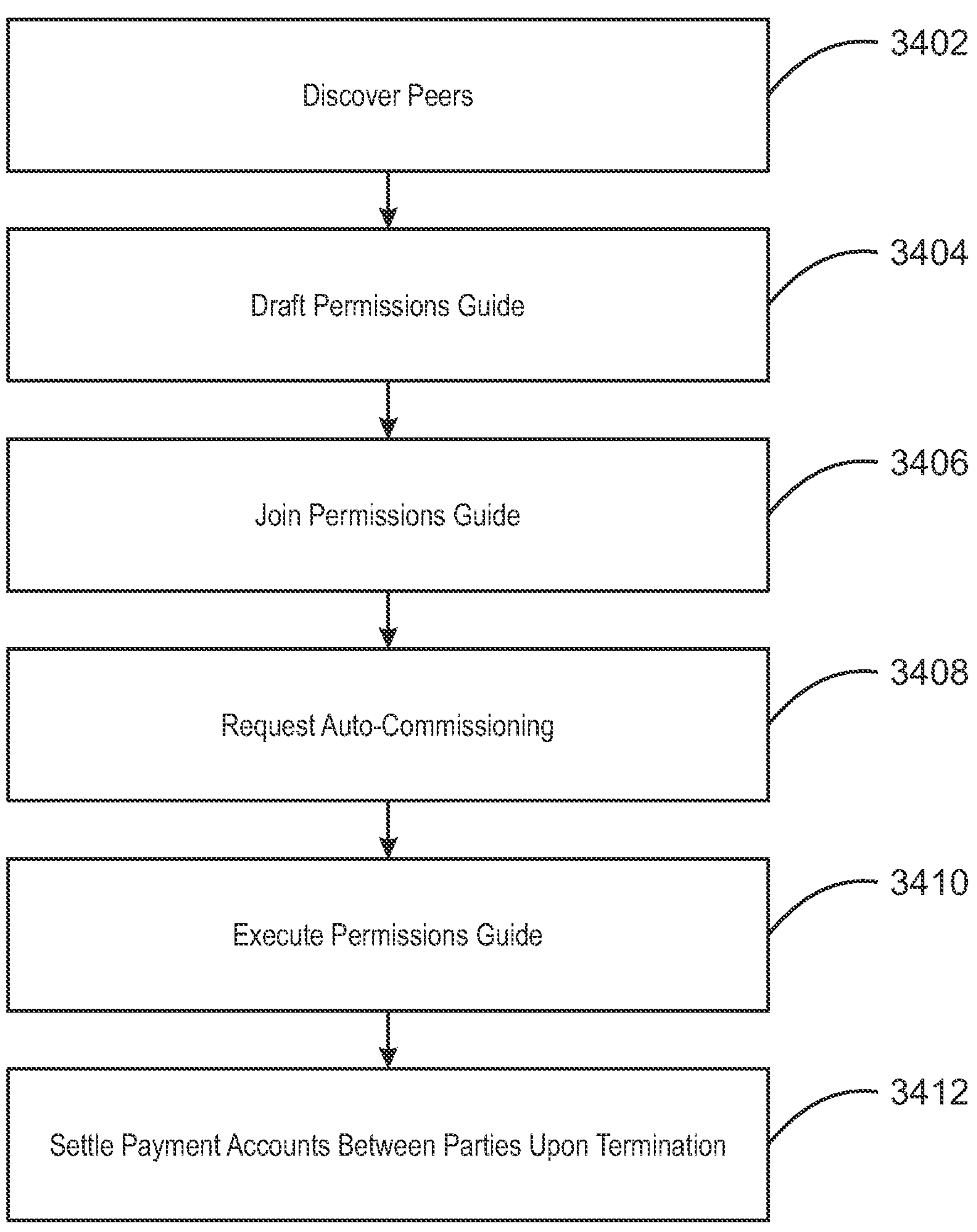
FIG. 34 is a process flow diagram of an example method for protocol conversion brokering by a protocol conversion broker in accordance with some embodiments.

FIG. 34 is a process flow diagram of an example method 3400 for protocol conversion brokering by a protocol conversion broker in accordance with some embodiments. The method 3400 of FIG. 34 may be implemented by the IoT device 3500 described with respect to FIG. 35. The concept of a protocol conversion broker may be, for example, a party who can join the permissions guide to offer automated conversion or automated proxying of the service/data to the endpoint type or data format desired by the consumers. Process flow may begin at block 3402.

At block 3402, peers can be discovered. This can be done by the protocol conversion broker, by party, or by a permissions guide 3302 computation. In an example, the discovery of peers may be an initial phase or may be repeated throughout the process to ensure peers are known.

At block 3404, a permissions guide 3302 may be drafted between potential participants. The drafting of an ad-hoc permissions guide 3302 can include the definition of a task or tasks to be undertaken during drafting of the ad-hoc permissions guide 3302 phase. In an example, a task may refer to the supply of a service. In an example, supplying a service can make use of information provided by suppliers regarding the service. Suppliers of services may advertise their services through a lookup service. A lookup service may be centralized or decentralized. One method of looking up services is described herein. In an example, this drafting of the ad-hoc permissions guide 3302 can include a phase of exchanges where peers in the permissions guide 3302 may have specified ranges for particular parameters. Parameters may be marked by a party as preferred. Parameters may provide an ordered weighting of the preference compared to other party preferences.

At block 3406, the permissions guide 3302 can be joined. The protocol conversion broker may join the permissions guide 3302. The protocol conversion broker may oversee the joining of the permissions guide 3302 by a party or several parties. In an example, the permissions guide 3302 may include a time-to-live (TTL) parameter which may be used later to determine if the permissions guide 3302 ends or if the consumers of the service wish to continue and try to find alternative suppliers. Devices exposed to the permissions guide 3302 may also have a minimum number of parties to meet parameters of the permissions guide 3302. In an example, these listed parameters can be outlined in terms of services, attributes of the participating devices, T&C's, and QoS parameters. During a joining permissions guide phase, parties may join, leave, or be ejected from the process in response to the identification of a lower cost entity for execution of a task of protocol. Similarly, parties may join, leave, or be ejected in response to identification of an entity for execution of a task or protocol with a higher net value entity.

In an example, if there are three particular features and attributes that are favored to be present by the task consumers, these features and attributes might be initially supplied by three different parities at varying costs. During this phase, in this example, in response to identification of a single party that may supply the service at a better price point, then use of this found single party may be a more optimal solution.

At block 3408, a protocol conversion broker can request an auto-commissioning of the service providing nodes. The service providing nodes may refer to nodes that provide services outlined in the ad-hoc permissions guide 3302. Auto-commissioning may include deployment of micro-services out to IoT devices in the field which contain functionality to process data and services in a way specified by task consumers. In an example, auto-commissioning may involve tasks that are possible to do automatically, or remotely in a reasonable period of time without manual intervention. Auto-commissioning may also, if specified, use manual deployment of devices in the field. The manual deployment may include deployment by humans, trained animals, drones, or robots. In an example, manual deployment may be used in a version of this process if the QoS settings including the time of deployment by suppliers meet the requests of the permissions guide 3302 by the parties.

In an example, tokens or objects to describe functions including constants, identifiers, operators, reserved words, and separators, and preambles can be provided to the parties within the permissions guide 3302. A preamble, as previously described, may involve a configuration, initialization, and exchange of any information between peers which may be used to proceed further. A preamble may include the location of services, machine readable application protocol interface (API) descriptors, access credentials, access to keys. In an example, an unsuccessful preamble can include loss of a critical mass of suppliers, loss of the consumer, a drop out of the process. If a party drops out, the process can return to a drafting of the ad-hoc permissions guide 3302.

At block 3410, execution of the permissions guide 3302 begins, if a preamble and proceeding steps are present and successful. Based on the conditions and parameters of the preamble and the permissions guide 3302 and agreed to terms of the parties, payments can be unlocked if terms are met. In an example, the terms have been exchanged and agreed to in the drafting of the permissions guide 3302.

At block, 3412, final payments can be made through the protocol conversion broker in response to a detection that a peer is terminating their participation in the permissions guide 3302. If the permissions guide 3302 can continue to function with the existing members, the permissions guide 3302 may continue to function if there is a determination that the TTL has not expired. However, if the TTL expires prior to the process completing, then the permissions guide 3302 may end. In an example, if the permissions guide 3302 may not be able to continue without finding alternative suppliers or consumers, then the process may return to the discover peers phase 3402.

Figure 35:
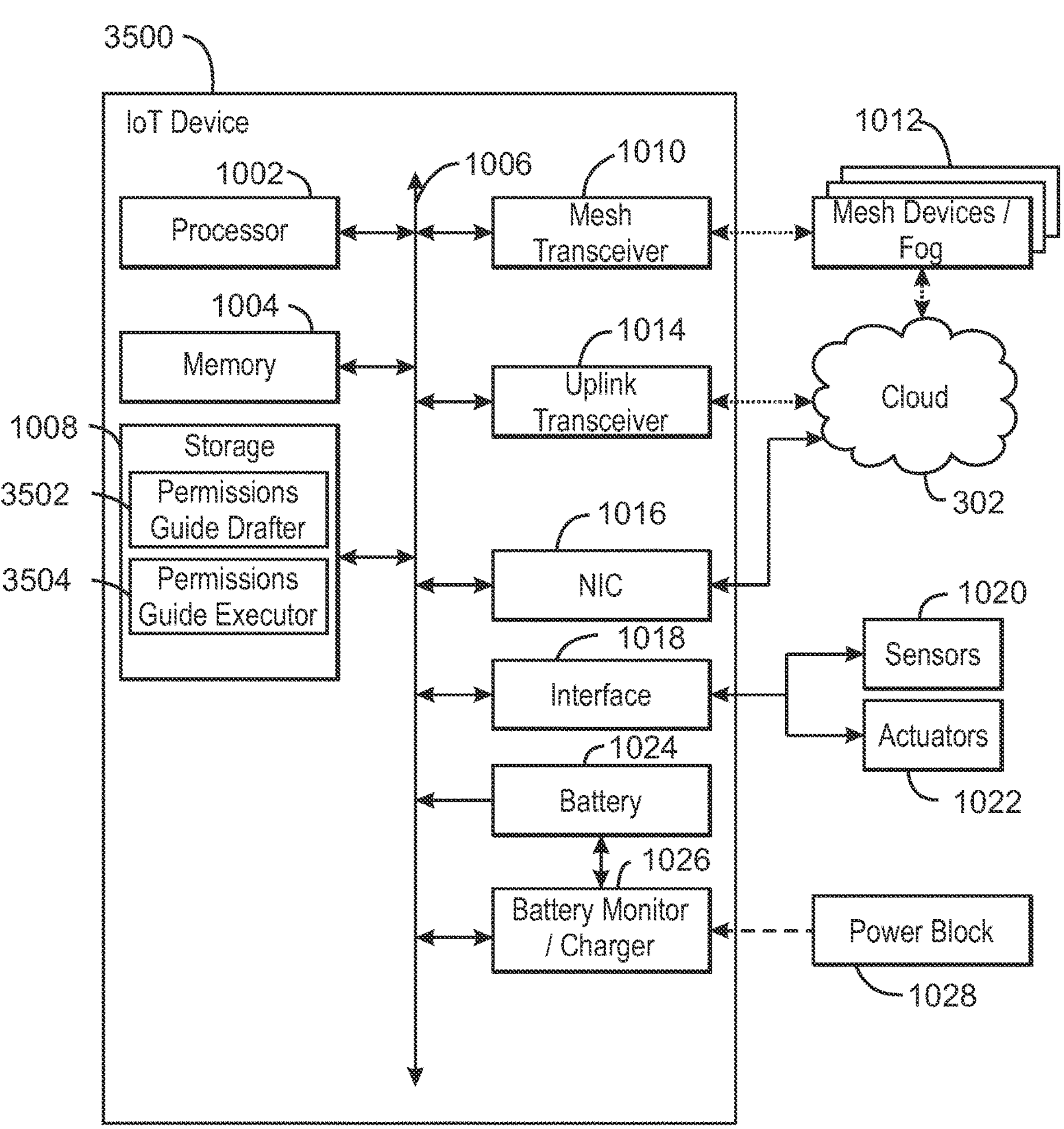
FIG. 35 is a block diagram of an example of components that may be present in an IoT device to define tasks and commission nodes in accordance with some embodiments.

FIG. 35 is a block diagram of an example of components that may be present in an IoT device 3500 to define tasks and commission nodes in accordance with some embodiments. Like numbered items are as described in FIG. and FIG. 10.

As also shown above, with reference to FIG. 10, the mass storage 1008 may include a number of modules to implement the group creation functions described herein. Although shown as code blocks in the mass storage 1008, it may be understood that any of the modules may be fully or partially replaced with hardwired circuits, for example, built into an application specific integrated circuit (ASIC). The mass storage 1008 may include a permissions guide drafter 3502 to draft a permissions guide 3302 for a number of discovered peers, where the number of discovered peers each have a parameter, and where a term of the permissions guide 3302 may be generated in response to the term being allowable by at least two of the number of discovered peers. The parameter of each discoverable peer of the number of discovered peers may include a range of an allowable term range for an associated peer. The permissions guide drafter 3502 may include a function for listing of the terms and conditions of the number of discovered peers. The permissions guide drafter 3502 may include a listing of the quality of service terms and conditions for the number of discovered peers, for example. The permissions guide drafter 3502 includes a listing of data plane terms and conditions for the number of the discovered peers. In an example, the data plane may indicate a process for how the data is to be supplied and consumed by the peers. The permissions guide 3302 may also include a time-to-live as described above. In an example, the permissions guide 3302 may include a protocol conversion broker to manage the joining and leaving of the permissions guide 3302 by a peer. The permissions guide 3302 may include a preamble to manage the exchange of a configuration between the number of discovered peers.

The mass storage 1008 may include an action executor 3504 to execute an action of the permissions guide 3302 in response to detecting that a condition of the term is satisfied. The action executor 3504 may include a function for auto-commissioning of a service to a peer instructing the peer to process data. In an example, the term refers to a rate of payment to be paid between the number of discovered peers, and a final payment may be made between peers upon a detection that a peer of the number of discovered peers is terminating participation in the permissions guide 3302.

Figure 36:
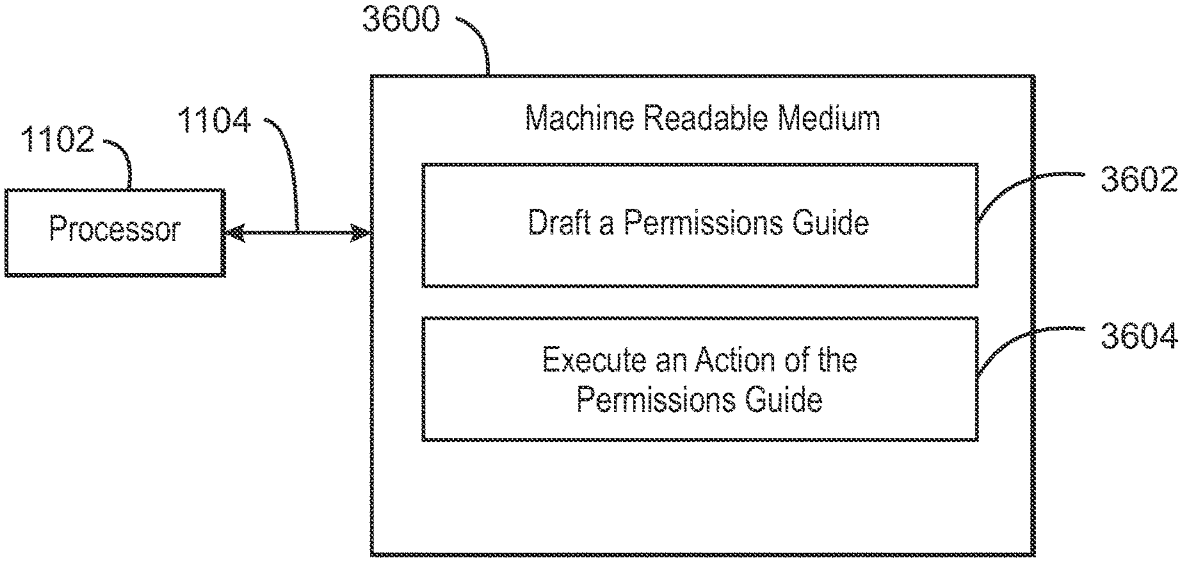
FIG. 36 is a block diagram of a non-transitory, machine readable medium including code to define tasks and commission nodes in accordance with some embodiments.

FIG. 36 is a block diagram of a non-transitory, machine readable medium 3600 including code to define tasks and commission nodes in accordance with some embodiments. Like numbered items are as they are described with regards to FIG. 11.

The non-transitory, machine readable medium 3600 may include code 3602 to direct the processor 1102 to draft a permissions guide 3302 for a number of discovered peers, where the number of discovered peers may each have a parameter, and where a term of the permissions guide 3302 is generated in response to the term being allowable by at least two of the number of discovered peers. The drafting of the permissions guide 3302 may include a function for listing of the terms and conditions of the number of discovered peers. The drafting of the permissions guide 3302 may include a listing of the quality of service terms and conditions for the number of discovered peers. The drafting of the permissions guide 3302 may include a listing of data plane terms and conditions for the number of the discovered peers. The data plane may indicate a process for how the data is to be supplied and consumed by the peers. The permissions guide 3302 may include a time-to-live. The permissions guide 3302 may include a protocol conversion broker to manage the joining and leaving of the permissions guide 3302 by a peer. The permissions guide 3302 may include a preamble to manage the exchange of a configuration between the number of discovered peers.

The non-transitory, machine readable medium 3600 may include code 3604 to direct the processor 1102 to execute an action of the permissions guide 3302 in response to detecting that a condition of the term is satisfied. Executing an action of the permissions guide 3302 may include, for example, auto-commissioning of a service to a peer instructing the peer to process data. As used herein, term refers to a rate of payment to be paid between the number of discovered peers. In an example, a final payment may be made between peers upon a detection that a peer of the number of discovered peers is terminating participation in the permissions guide 3302.

A floating service may be a website or virtual service that floats around the internet managing a digital wallet associated with the floating service, and negotiating for hosting as well as jobs that could use the software of the floating service. The floating service can include software for execution on a range of hardware, where the execution of the software can be done at varying efficiencies based, in part, on the software of the service and the hardware being used. The execution of jobs using the service selected software and the service selected hardware, can result in a payment for the job completed.

As used herein, the payment may be performed through a commission on sales that a floating service is processing. The payment may be in compensation for advertising provided on the floating service or by the service. In an example, several services can be compared for use in processing a job. A number of services may each be associated with their own digital wallet. While a floating service may be paid for the work completed by the floating service, the floating service may additionally pay for access to resources, software, or sub services, in order to complete an agreed to job, for example. A floating service may also cease to function when a value in the digital wallet is zero. Through the ceasing of functions without value, a manager or owner of floating services may allocate value between digital wallets for a number of services. A manager of floating services can set the digital wallets to automatically replenish or withdraw a value in response to a detection that the digital wallet reaches a set value in an associated wallet. In an example, a floating service can include a service for mining bitcoins, litecoin, dogecoin, other cryptocurrencies, protein folding projections and other processor and software based jobs or service centric jobs that a floating service can complete to return value to a digital wallet. In an example, a dedicated computer could serve as a host or a hired host for a floating service.

Figure 37:
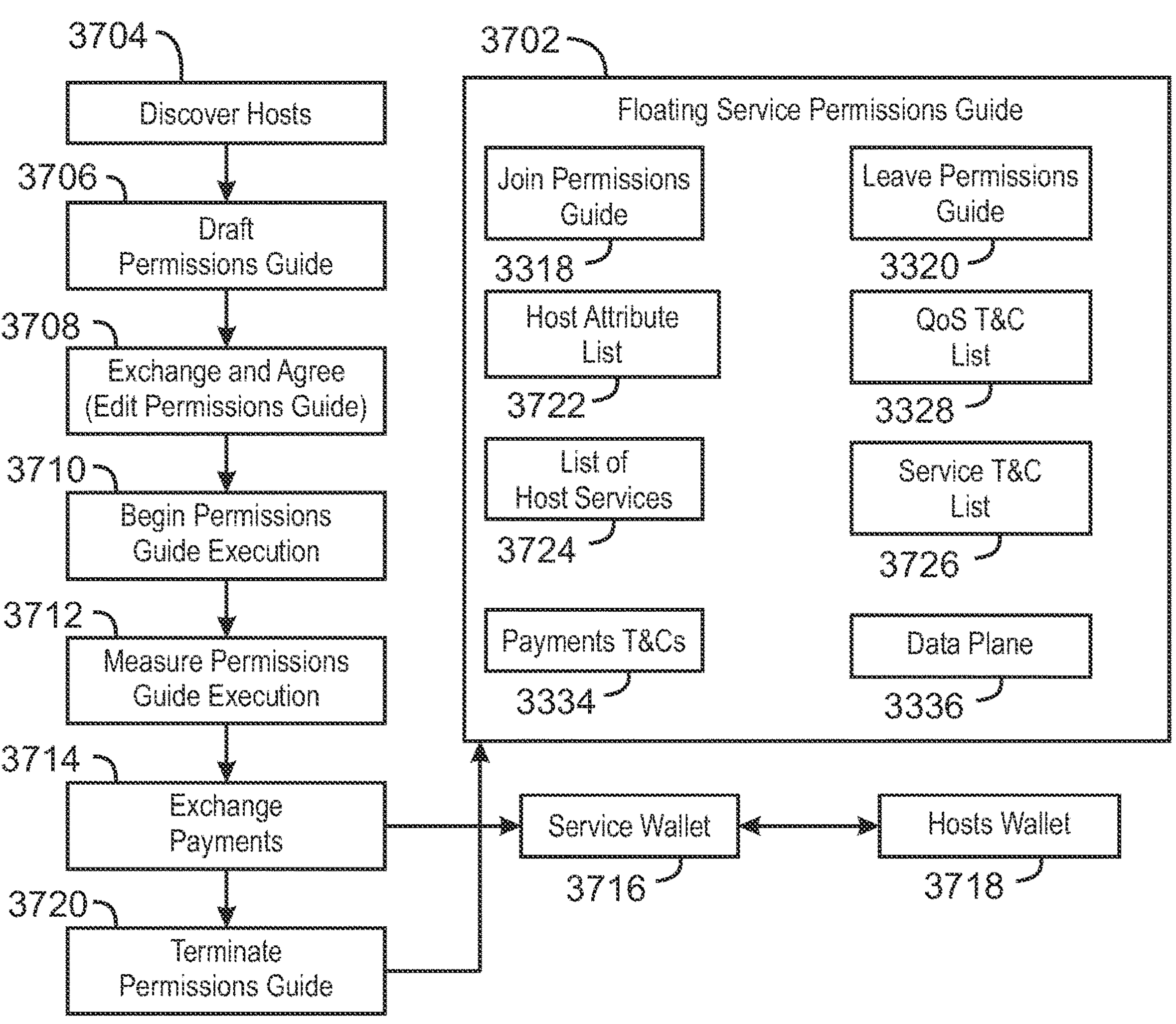
FIG. 37 is a process flow diagram of an example method to manage a floating service and value in a digital wallet in accordance with some embodiments.

FIG. 37 is a process flow diagram of an example method 3700 to manage a floating service and value in a digital wallet in accordance with some embodiments. The method 3700 of FIG. 37 may be implemented by the IoT device 4000 described with respect to FIG. 40. The schematic shown can represent the process of a floating service lifecycle and the drafted floating service permissions guide 3702. A process of floating service lifecycle may begin at block 3704. Like numbered items are as described in FIG. 33.

At block 3704, a floating service may identify hosts the service may use to carry out a task. This discovery of hosts and host capabilities may be performed using a bloom filter hop as disclosed above. At block 3706, the floating service may create a machine readable permissions guide which may be stored on a block-chain or off a block-chain. In an example, the permissions guide may be discoverable to identified peers and hosts. The permissions guide may be advertised to identified peers and hosts, or may be discoverable by devices that have not been identified on the network. At block 3706, the floating service may compose a task to be performed into functions. The functions can be written into a permissions guide. The task and the composed functions can be broken down into smaller fixed functions with general purpose. The task and composed functions may also be broken down into specialized code segments. The task and function codes may be generated, for example, by an artificial intelligence including genetic algorithms.

At block 3708, the permissions guide may be modified to fit a predefined format. An example of a format for a permissions guide may be a format that allows for peers and hosts to join and leave the guidance and enforcement of the permissions guide. The permissions guide may also include a listing of attributes and functions that the hosts agree to supply. The functions agreed to by the hosts may include, for example, network services, load balancing, use of fully qualified domain names (FQDNs), use of domain name system (DNS), and firewall services. The permissions guide may include a listing of time constraints and quality of service conditions to be followed by the owner of the permissions guide as well as any joining peers and hosts. In an example, the permissions guide may use exclusive hardware of a host through permitted multi-tenancy or through sharing of direct access to the host hardware. The above listed parameters, and other parameters that can be used by a floating service may feed into a determination of a higher or lower fee being paid from the requesting floating service to the host provider or host providers.

At block 3710, the permissions guide may begin execution. The execution may be based on the conditions, functions, and input received at devices that are governed by the permissions guide. As noted above, the permissions guide may have a set fixed time, no fixed time, or conditions based execution. In an example of execution of the permissions guide, the permissions guide may terminate in response to a detection that a service providing peer disappears or a data providing peer disappears. In an example, peer device or host devices can be replaced, substituted, or decommissioned if there is a detection that peers and hosts are providing services at lower rates then agreed to in the permissions guide. A peer device or a host device may also be replaced, substituted, or decommissioned in response to a detection that a data quality may not be in line with metrics agreed to in the permissions guide.

At block 3712, the service entity and the hosting entity may include a function to exchange terms between hosts and peers to identify mutually agreed upon terms for listing in the permissions guide. Terms in the permission guide may include execution priority, communications bandwidth, access permissions, and the like. At block 3714, payment may be exchanged between peers and hosts that have joined the guidance of the permissions guide of the floating service 3702. The payment may be exchanged upon the meeting of conditions outlined by the floating service permissions guide 3702. In an example, the exchanging of payment may include preparing a payment and providing the payment data to a service wallet 3716. The payment may be through existing value or through credit to a service wallet from a peer, host, or other party that has joined the floating service permissions guide 3702. In an example, the exchange of credit between two wallets can be from a service wallet 3716 to a host wallet 3718. The wallets of any entity may be a logical storage of a numeral representation of value, credit, or debit. In an example, a peer or host can be limited by the value in their wallet. If a peer, host, or other provider fails to meet obligations of the floating service permissions guide 3702 then an exchange of value between the service wallet 3716 and an injured parties wallet or a general value holding place may allow for penalties and value withdrawn from the service wallet 3716. One example of a violation of an obligation may include a peer or host not meeting an agreed upon level of availability. In an example, the function of a host, peer, or floating service may be regulated, governed, or limited based on a value stored in the wallet associated with that service, peer, or host. In an example, once funds may be exhausted in a service wallet 3718, the access peer or host associated with that wallet may be removed from the permissions guide 3702. Warning thresholds may be provided to notify a floating service owner when the value in an associated wallet is lower or higher than a designated threshold. The warning threshold values may be associated with an automatic cutoff or throttle of service based on a value in a wallet reaching or passing a designated threshold.

At block 3720, the permissions guide 3702 may be terminated. The termination may apply in response to a condition being met by a peer or host. The termination of the permissions guide 3702 may be in response to a time period elapsing, a number of peers leaving, a number of hosts leaving, a percentage of peers leaving, a percentage of hosts leaving, a lack of incoming peers and hosts, or any other manually set guideline agreed to in the permissions guide 3702.

As one of the permissions guide 3702 functions, a host attribute function 3722 provides a listing of the capabilities that a host that has joined the permissions guide may be offering. In an example, the capabilities a host may be offering may include attested features, trust based features, and features that operate upon receipt by the permissions guide 3702 of proof of authorization for access to the host and to the function. The availability of the host attributable function 3722 may be limited to reduce the supply or access to such features in order to maintain a value of the services of the host attributable function. The host attribute function 3722 may be associated with a listing of host function conditions for the service around the host function activities and host function behavior. The host attribute function 3722 may deny access to a host function or impose a penalty upon a detection that the floating service breaches conditions of the host attribute function 3722.

A list of hosted services 3724 and corresponding service terms and conditions (T&C) list 3726 combine to allow services joining the permissions guide to indicate conditions on their levels of service included as parameters or functions within the permissions guide 3702. In an example, parameters listed in the permissions guide 3702 may be rated on a scale indicating their degree of priority or lack of priority relative to the floating service and the floating service operation. The service T&C list 3726 may outline penalties that may be agreed upon by peers and hosts. These penalties may be applied to a peer or host that reaches agreed upon conditions of the floating service permissions guide 3702.

FIG. 38 is a schematic diagram of an example floating service data structure 3800 to manage a floating service 3802 and the options, conditions and terms in accordance with some embodiments. In an example the floating service data structure 3800 may show floating service conditions, terms, and features based on the priority of condition, term, and feature. The listed options, conditions, terms, features, values, and their related priorities shown in the example floating service data structure 3800 are exemplary and may be included in a listing of terms and conditions of a floating service permissions guide 3702.

The floating service data structure 3800 may assess the calculated costs, known costs, and unknown costs when choosing a host. In an example, a floating service 3802 may use the data structure 3800 to compare a combined identified cost to a listing of features and the identified feature requests of the floating service and job. In an example, a list of features for a floating service may be inserted into a decision matrix of the data structure 3800.

A decision matrix of a data structure 3800 may include a comparison of identified hosts, peers, and other devices or resources available to a floating service 3802. In the example provided, the data structure 3800 shows example data collected from three hosts, host 1, host 2, and host 3. In the example data structure 3800, based on the priority of features and the data gathered from the hosts, a floating service 3802 may determine that host 2 and 3 are possible hosts for execution of the floating service, while host 3 may rank higher due, at least in part, to an increased presence of features with priority in data received regarding host 3. In this example, host 3 displays a higher nominal cost, and is shown to receive a higher decision score or value shown in the example floating service data structure 3800. The higher value may be the result of host 3 fulfilling features with increased importance priority relative to other features, options, conditions, and terms considered. The formula calculating this decision score and value may be calculated in a number of ways including a method of calculation dividing the sum cost per hour of a host by the sum of the rating for each feature, option, condition, or term that is listed for comparison in the floating service data structure 3800 of the floating service 3802.

Figure 39:
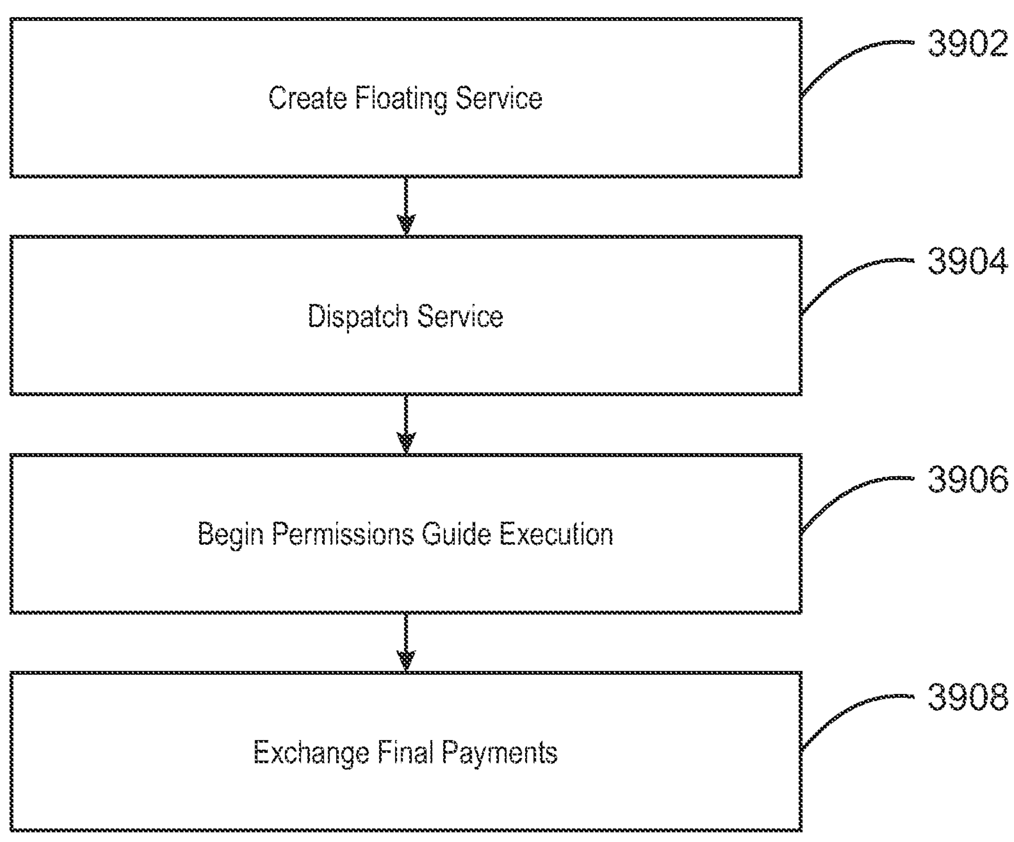
FIG. 39 is a process flow diagram of an example method for floating service management in accordance with some embodiments.

FIG. 39 is a process flow diagram of an example method 3900 for floating service management in accordance with some embodiments. The method 3900 of FIG. 39 may be implemented by the IoT device 4000 described with respect to FIG. 40. Process flow may begin at block 3902.

At block 3902, a floating service may be created. The floating service may be created in an encapsulation module capable of being executed on a wide range of hardware systems. In an example, the encapsulation modules may be containers such as docker containers and virtualization constructs including virtual machines. In an example, an encapsulation module may be a framework capable of being used to package and distribute software binaries. The floating service may then assign requests to allow the floating service owner to specify priorities for the floating service. In an example, a priority can include features or specific capabilities including options of hardware. Hardware features may include CPU capacities and capabilities, storage capacities and capabilities, and memory capacities and capabilities. In an example, these capacities and capabilities may include an assessment of whether or not hardware accelerators are present. In an example, if hardware accelerators are present, then hardware enable features may be assessed including Advanced Encryption Standard (AES), SGX, virtualization (VTx), or high availability services. A floating service owner may also specify software dependencies as features to be assessed. Software features to be assessed may include, for example, an operating system type, an operating system version, a software version, patching levels, and the presence of layered applications for messaging and communication. While creating the floating service at block 3902, the quality of service and the terms and conditions of the floating service may be attached. In an example, the service owner or a connected data source may indicate a geographical location of the floating service or an exclusivity status of the hardware. The creation of the floating service at block 3902 may include attaching a service wallet. In an example, the floating service owner may create a new wallet to be associated with the floating service. In an example, the floating service may associate or share an existing wallet. As used herein wallets may refer to any store of value and may include bitcoin wallets, ethereum wallets, and google wallets. A floating service may also include specific forms of funding other than a wallet such as payment services similar to and including PayPal and Visa online services. The creation of the floating service at block 3902 may include the assigning of funding rules for the floating service. In an example, rules for the floating service may include funding triggers that would cause a wallet to be refilled or not refilled. In an example, one setting could include an automatic refill or top-up of the wallet by a preselected amount by a user in response to a detection that a balance of the wallet has passed below a threshold. The floating service owner may choose to indicate a rule for the floating service that indicates that the floating service may cease to execute if the floating service reaches a zero value point in an associated wallet or if a negative value generation rate is detected. Additional rules initiated during the creation of a floating service at block 3902 can include a combination of date triggers, event triggers, and balance triggers. The floating service may use theses triggers as indications that a certain wallet filling action may occur. In an example, a wallet may transfer funds to a separate wallet, account, or financial service in response to detecting a balance exceeding a certain threshold or passes an identified date trigger or event trigger. A transfer of funds can include a specified amount of funds to be transferred, the identified surplus funds, or the sum of the funds in the wallet. In an example, the wallet may include a TTL criteria. In an example, the floating service owner may specify a value for a TTL. A TTL may include a limit on the number of operations to execute, a number of fund transfers, or a number of transactions to a wallet. In an example, a TTL for a floating service may also be automatically extended if certain criteria for dates, activity levels on the service, and criteria for movement of the floating service.

At block 3904, the floating service may be dispatched. The dispatch of the floating service may begin in response to an indication that the full configuration of the floating service is completed. The configuration of the floating service is disclosed, in part, above with regard to block 3902. In an example, a dispatch mechanism may be dictated by the encapsulation module used, as described above. In an example, if the service is a container, then existing methods for deploying the container may be employed once a suitable target home is found for it. In response to the floating service dispatch, hosts may be discovered. In an example, finding a target host may include first searching for systems offering hosting services. In response to the dispatch of the floating service from block 3904, the contracts may be enumerated. In an example, systems offering services may offer multiple permissions guides, where a permissions guide may include different criteria. The permissions guides may be enumerated. In response to the dispatch of the floating service from block 3904, a host and a permissions guide may be selected. In an example, the method for selecting a particular host and selecting a particular permissions guide may take place as discussed above.

In response to the dispatch of the floating service from block 3904, terms and conditions may be negotiated or exchanged as described below. In an example, if a peer, host, or other party has marked a part of the permissions guide as negotiable, then ranges can be specified around those parameters. Other policies may be implemented to allow portions of the permissions guide to be negotiable, such as paying a fee for the right, among others. In an example, hosting may be shared at a particular cost and this offer can contrast with another offer where limited access to hardware may be available at a higher cost. In an example, a particular floating service may have ranges which the floating service may be authorized to pay for different qualities of service. In response to a detection that a limited use of hardware fits within an acceptable range of payment, then the floating service may choose to accept the offer for limited access to the hardware. A floating service may instead not tag the limited hardware configuration as preferable, and in response to this tag, the floating service may default to an option in the market which meets the floating service minimum threshold.

In response to the dispatch of the floating service from block 3904, a preamble may be provided. As described above, the preamble may include an exchange of information which may be used for the permissions guide to begin execution. The preamble may include wallet identifiers, identity information, access information, key exchanges for the service and the hardware, hosts location, host IP address, or the location where the floating service is available. In response to a detection that the preamble fails, another host may be selected with the process resuming from the reviewing and selection of the host as part of block 3902. In response to a detection of a preamble fail, a notification may be sent to a floating service owner. The notification may include a request for input regarding if the floating service owner may reduce a level of hardware, software, terms and conditions, or quality of service being sought to open up more options for the floating service based on the supply of capable hosts in the market.

At block 3906, the permissions guide may begin executing. In an example, the permissions guide execution may begin in response to the preamble phase completing. In response to the start of execution of the permissions guide, the execution conditions may be measured. During permissions guide execution, payments may be unlocked as events or conditions of the permissions guide are met. While a party that joined and agreed to the permissions guide may leave the permissions guide, the party leaving the permissions guide may incur a penalty to be charged to a wallet associated with the party. In an example, the permissions guide may be based, at least in part, on the nature of the floating service and being based around the concept of a permissions guide.

In an example, the billing period of the permissions guide could be as small as desired, perhaps seconds or microseconds. In an example, if during a permissions guide executing, a host or a peer meets a QoS condition, the process may proceed and other conditions accessed. In response to a detection that a QoS condition ranks as unsatisfactory, the permissions guide may be terminated or penalties may be applied to a violating host. In an example, termination of a permissions guide may be a decision taken by the permissions guide automatically based on implementation managed by an AI. Termination of a permissions guide may be a decision taken manually, in an example, at the discretion of both the service provider and the service consumer.

In response to the permissions guide executing at block 3906, payment can be reached when terms and conditions of the permissions guide reach triggering thresholds. The payments and penalties assessed may be multidirectional such that payments can be transferred or offset between multiple parties, peers, and hosts. As noted above, if a party is terminated or leaves, the permissions guide may be terminated.

At block 3908, final payments may be exchanged. In an example, in response to a permissions guide reaching a natural end then the process may be ended or reset. In an example, a natural end may refer to the expiration of a TTL. In response to a detection that the TTL of a floating service is not expired, then the floating service may begin a new cycle of discovering another host.

Figure 40:
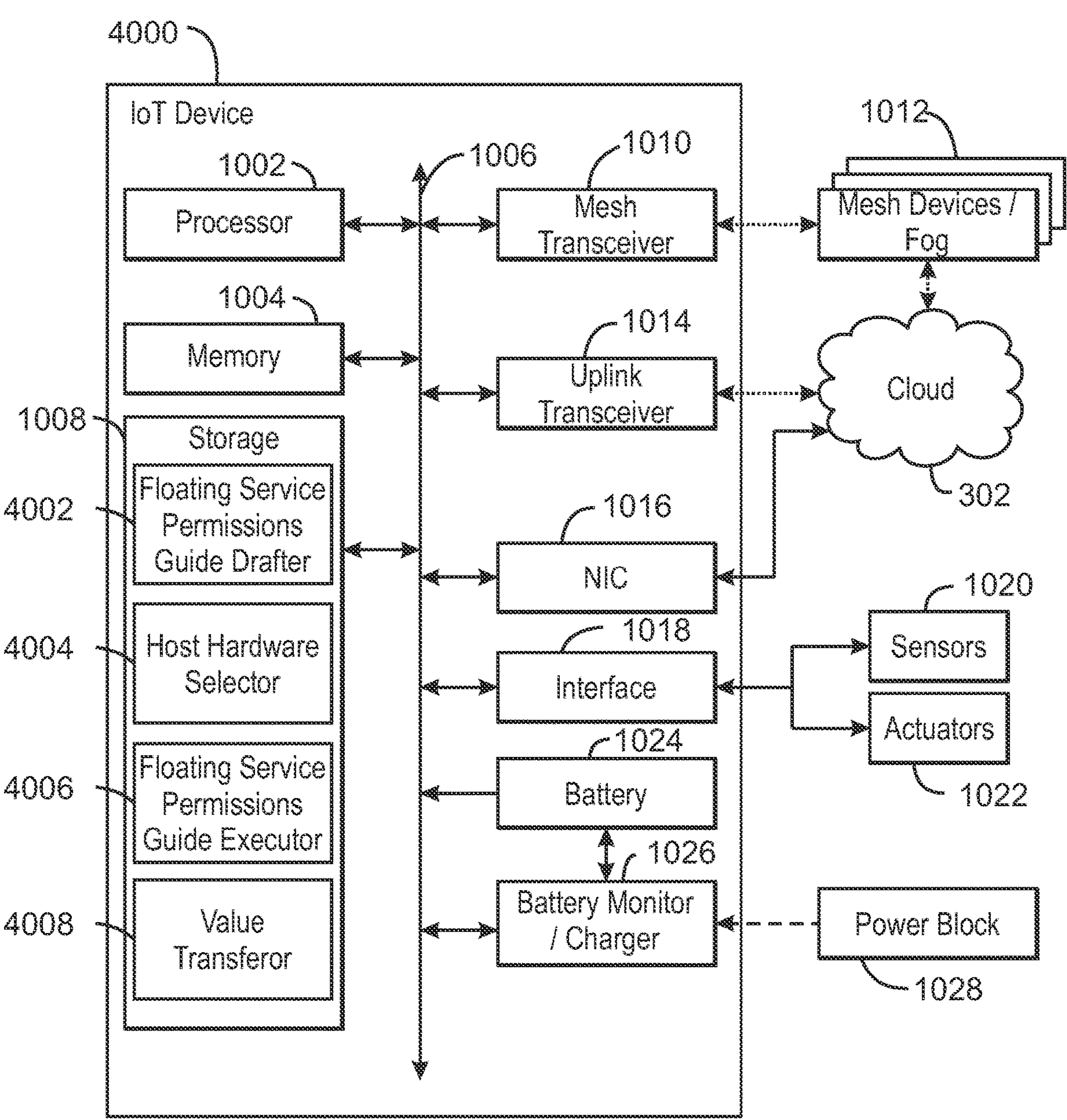
FIG. 40 is a block diagram of an example of components that may be present in an IoT device to manage floating services in accordance with some embodiments.

FIG. 40 is a block diagram of an example of components that may be present in an IoT device 4000 to manage floating services in accordance with some embodiments. Like numbered items are as described in FIG. 10.

As also shown above, with reference to FIG. 10, the mass storage 1008 may include a number of modules to implement the group creation functions described herein. Although shown as code blocks in the mass storage 1008, it may be understood that any of the modules may be fully or partially replaced with hardwired circuits, for example, built into an application specific integrated circuit (ASIC). The mass storage 1008 may include a floating service permissions guide drafter 4002. In an example, the floating service permissions guide drafter 4002 may draft a floating service permissions guide for a number of discovered hosts for executing the tasks of a floating service, where the number of discovered hosts may be assessed for host fulfilment of a parameter specified in the floating service permissions guide.

In an example, the floating service permissions guide may indicate penalties to be assessed against a host in response to a detected violation of the service permissions guide, the penalties are to be collected from a host wallet.

The mass storage 1008 may include a host hardware selector 4004. In an example, the host hardware selector 4004 may select a host hardware for the floating service based on a data structure of the floating service.

In an example, the data structure is a decision matrix. The decision matrix may list a feature sought by the floating service, a number of available hosts, and an assessment score of the hosts relative to the feature listed in the decision matrix. The floating service may select a host based on a best value calculated from a cost per hour divided by a number of features with quality metrics indicating satisfactory use for the floating service, where the cost per hour is a projected cost per hour of operating the floating service using a host being assessed. The features of the floating service may variously weigh the features in a value calculation using the decision matrix.

The mass storage 1008 may include a floating service permissions guide executor 4006 to implement the floating permissions guide for the IoT device 4000. In an example, the floating service permissions guide may use the host hardware.

The mass storage 1008 may include a value transferor 4008. In an example, the value transferor 4008 may transfer value to a service wallet associated with the floating service in response to a detection that a condition of the floating permissions guide is reached. In an example, the service wallet may hold a block-chain encoded value. The floating service may cease functioning when the service wallet has a value of zero. In an example, the permissions guide may indicate that a service wallet may transfer value in response to a detection that the service wallet has reached a triggering threshold value. The floating service may initiate a value transaction between the service wallet and a host wallet.

Figure 41:
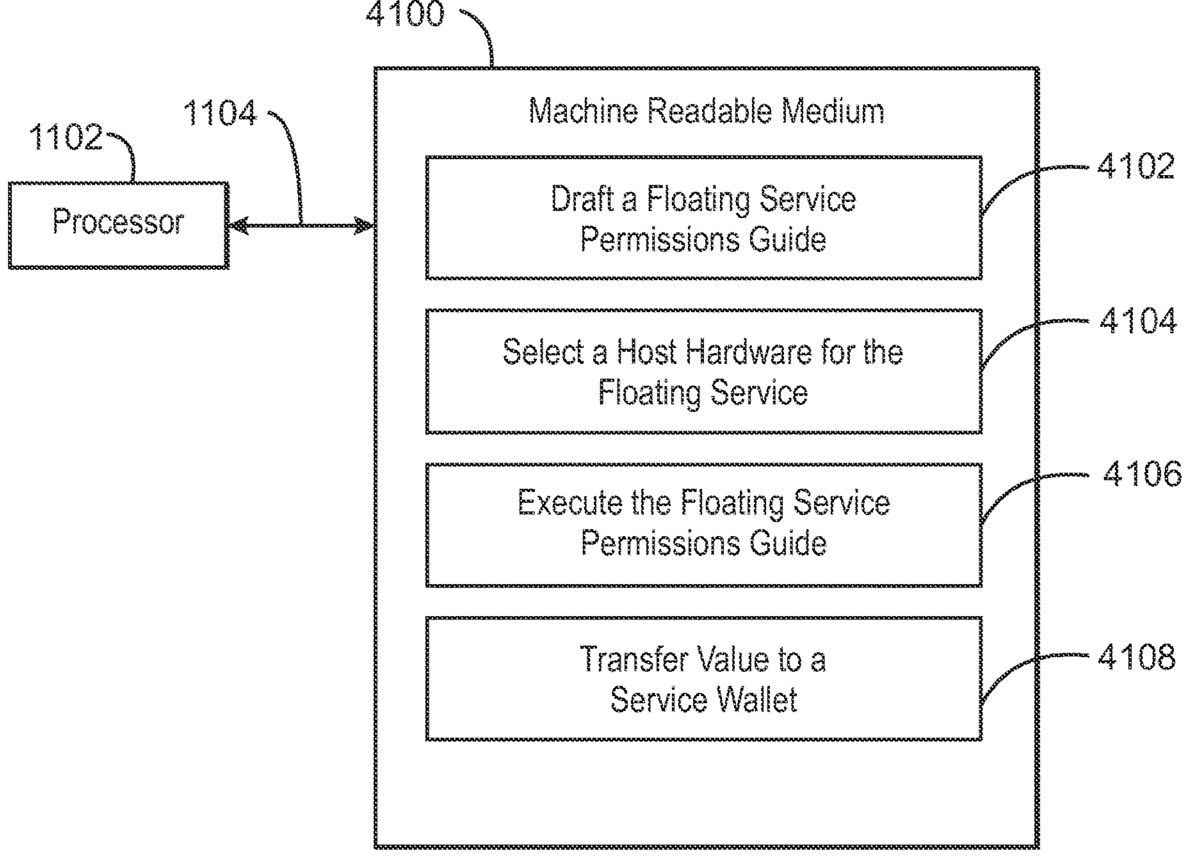
FIG. 41 is a block diagram of a non-transitory, machine readable medium including code to manage floating services in accordance with some embodiments.

FIG. 41 is a block diagram of a non-transitory, machine readable medium 4100 including code to manage floating services in accordance with some embodiments. Like numbered items are as they are described with regards to FIG. 11.

The non-transitory, machine readable medium 4100 may include code 4102 to draft a floating service permissions guide for a number of discovered hosts, where the number of discovered hosts are assessed for host fulfilment of a parameter. In an example, the floating service permissions guide may indicate penalties to be assessed against a host in response to a detected violation of the service permissions guide, the penalties are to be collected from a host wallet.

The non-transitory, machine readable medium 4100 may include code 4104 to select a host hardware for the floating service based on a data structure of the floating service. In an example, the data structure is a decision matrix. The decision matrix may list, for example, a feature sought by the floating service, a number of available hosts, and an assessment score of the hosts relative to the feature listed in the decision matrix. The floating service may select a host based on a best value calculated from a cost per hour divided by a number of features with quality metrics indicating satisfactory use for the floating service, where the cost per hour is a projected cost per hour of operating the floating service using a host being assessed. The features of the floating service may variously weigh the features in a value calculation using the decision matrix.

The non-transitory, machine readable medium 4100 may include code 4106 to execute the floating service permissions guide using the host hardware. The non-transitory, machine readable medium 4100 may include code 4108 to transfer value to a service wallet associated with the floating service in response to detecting that a condition of the floating permissions guide is reached. In an example, the service wallet may hold a block-chain encoded value. The floating service may cease functioning when the service wallet has a value of zero. In an example, the permissions guide may indicate that a service wallet may transfer value in response to a detection that the service wallet has reached a triggering threshold value. The floating service may initiate a value transaction between the service wallet and a host wallet.

Permissions guides may incorporate a run-time calculation for a cost of service provision as well as historical reputation of a host or service. Costs may refer to energy costs, equipment capital costs, depreciation costs, point-in time capacity costs, data privacy costs, data entropy costs. As disclosed herein, a permissions guide negotiation process may be time based. The permissions guide may be capable of switching between providers even if tasks have been assigned and in the middle of execution. In an example, switching between providers may occur in response to changing conditions that may affect the consumer or provider of the service.

Figure 42:
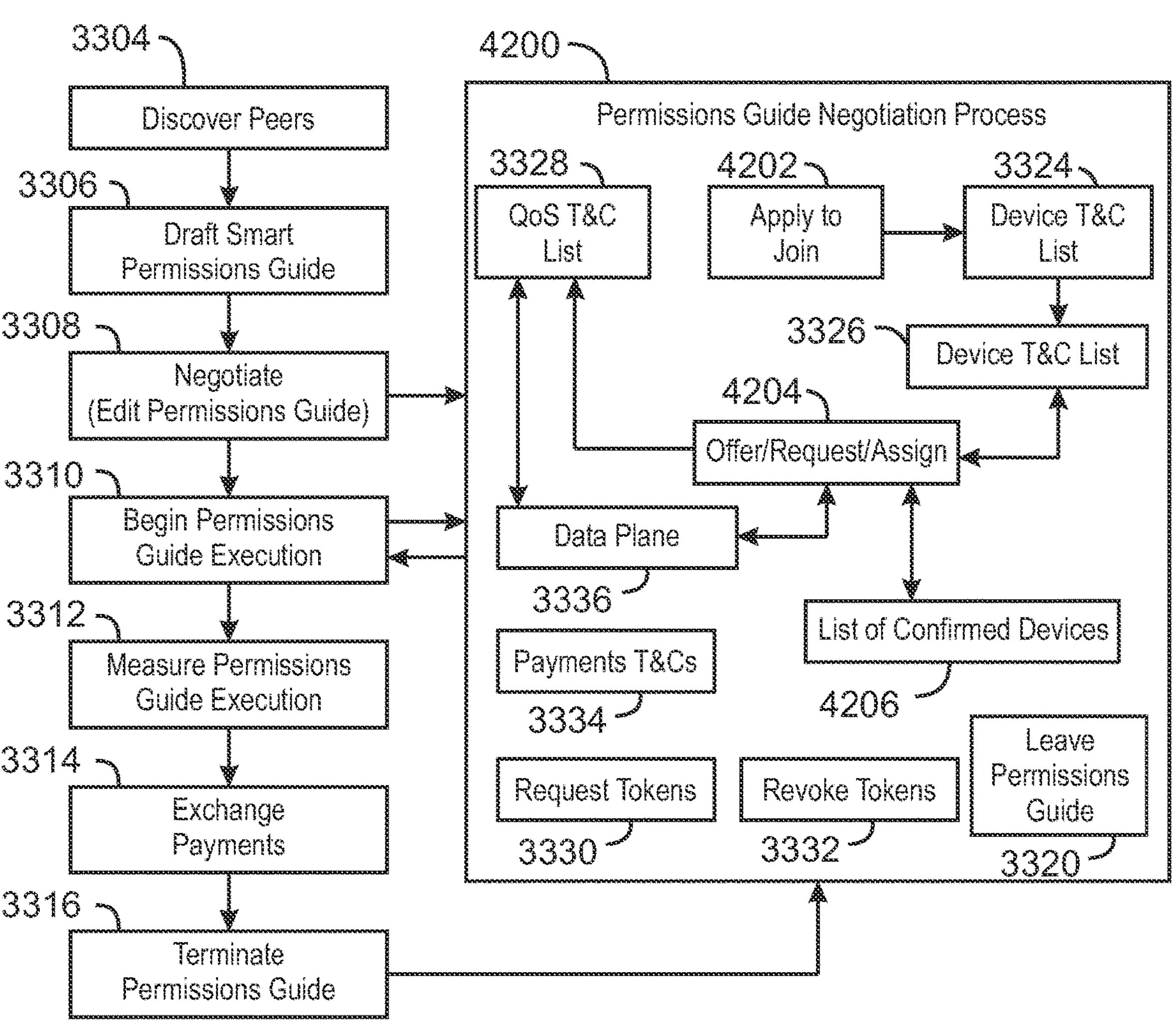
FIG. 42 is a schematic diagram showing an example permissions guide negotiation process in accordance with some embodiments.

FIG. 42 is a schematic diagram showing an example permissions guide negotiation process 4200 in accordance with some embodiments. Like numbered items are as described in FIG. 33.

In an example, a negotiation for a permissions guide may not exist or may be a template permissions guide. A template permissions guide may be an incomplete version of an enforceable agreement stored as a series of permissions scattered across a storage medium or as a single document indicating permissions, rights, and obligations of the parties that agree to adopt the permissions guide. A template permissions guide may allow an interested party access to read and commit changes.

The permissions guide negotiation process 4200 may begin in response to the discovery of peers and the initial drafting of a permissions guide. In an example, an initial permissions guide may be populated with QoS T&C's as requested by the service or requested by the data consumer or data consumers.

The permissions guide negotiation process 4200 may receive indications of interest to join from peers, hosts, and other services. Accordingly, a candidate service provider or consumer wishing to join and abide by the permissions set by the permissions guide may begin the process of joining by applying to join 4202. A candidate service provider or consumer applying to join may provide information on provider attributes or consumer attributes respectively. The provider attribute and consumer attributes can refer to capabilities or features of the devices as asserted or may validate the capabilities and features prior to proceeding to include these capabilities and features on a device attribute list 3324.

An offer function, a request function, or an assignment function 4204 may be used to identify a usable set of service providers, data providers, and consumers. The set of service providers, data providers, and consumers may be useable if attributes and capabilities are overlapping such that the attributes and capabilities are capable of meeting the terms of the permissions guide. Meeting the terms of the permissions guide may refer to, for example, satisfying a complete set of the parties' requests. Meeting the terms of the permissions guide may refer to, for example, satisfying as many parties' requests as practicable.

In an example, offers may be made by a candidate service consumer to a highest ranked service provider or data provider. Providers receiving an offer may send a request to confirm their acceptance of the offer. In response to receiving an offer, the accepted provider may be held to the permissions of the permissions guide and become part of the list of confirmed devices 4206. During the joining process, negotiation may be occurring. During negotiation, candidates may agree how the service or data can be accessed. If no overlapping set of technologies can be agreed to, then a protocol and data schema broker, such as a third party permissions broker, may be invited to join the permissions guide as an intermediary.

Confirmed providers and consumers may optionally opt out of the permissions guide. Opting out may not carry any cost, or there may be conditions where a penalty is applied. In an example, if a device fails to fulfil its obligations and no replacement device can be identified, then a penalty may be accessed.

During execution of the permissions guide 3310, other providers and consumers may apply to join and may join. As the permissions guide executes 3310, providers and consumers may be replaced.

Figure 43:
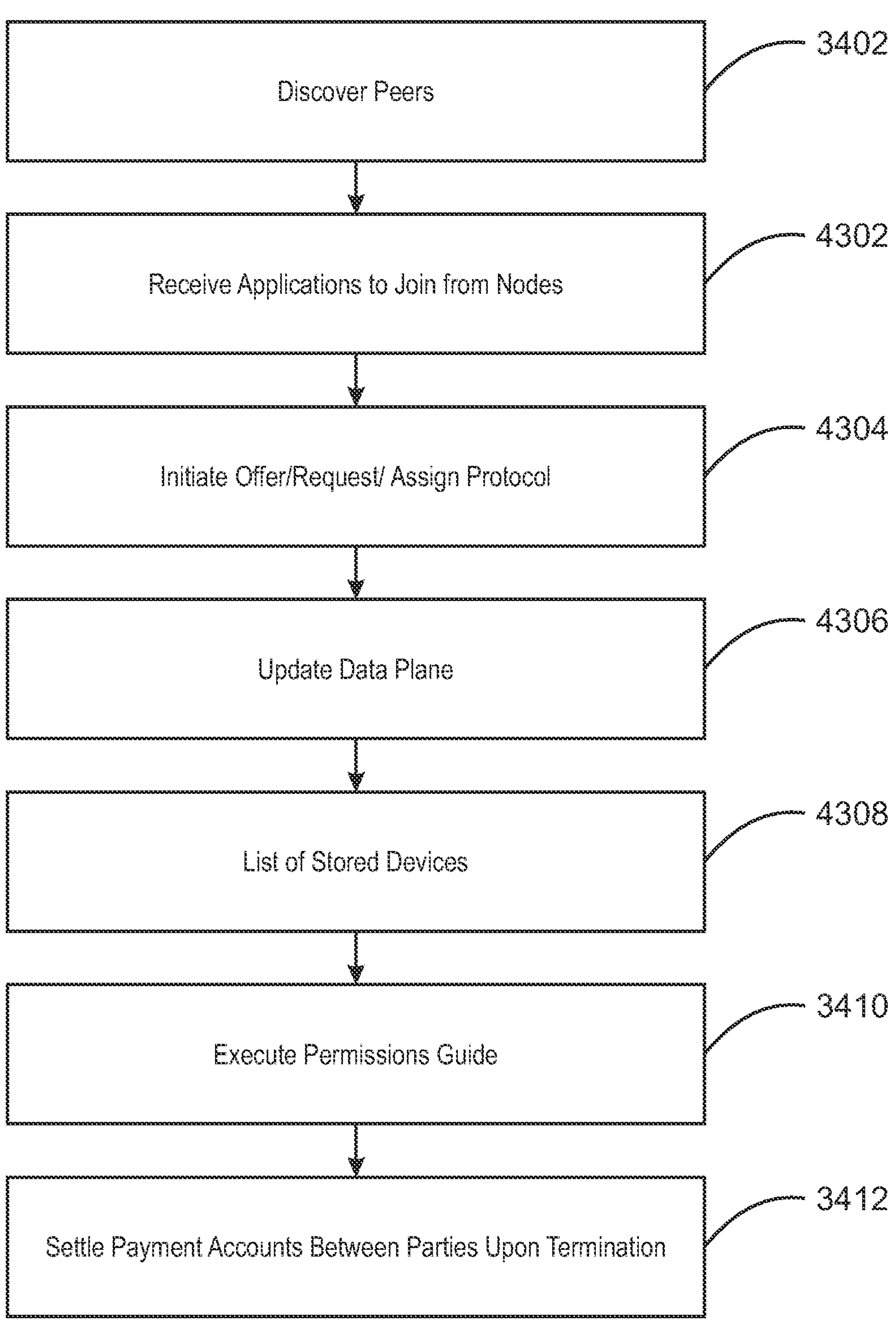
FIG. 43 is a process flow diagram of an example method for permissions guide negotiation in accordance with some embodiments.

FIG. 43 is a process flow diagram of an example method 4300 for permissions guide negotiation in accordance with some embodiments. The method 4300 of FIG. 43 may be implemented by the IoT device 4500 described with respect to FIG. 45. Like numbered items are as described with regard to FIG. 34. Process flow may begin at block 3402. At block 4302, nodes may apply to join. The nodes can include providers, contributors, and other devices and services that may wish to be governed by the permissions guide.

At block 4304, the nodes may list their offerings, attributes, and any terms or conditions a node may have. During the node application process a cost function may be applied to the inputs received from the nodes. In an example, the cost function can be an infocoin algorithm as disclosed below. The cost function may apply to nodes in an IoT marketplace because, in an example, a cost assessment may include the cost of deploying and provisioning IoT devices in the field. Cost assessments may include, for example, the energy, running, and maintenance costs of operating the device, data transport, and storage devices. Costs assessments may include the cost of these devices deployed across a widespread infrastructure plus the cost of an operating margin. In an example, the margin may refer to an area where negotiation can take place through the use of lower and upper ranges by various parties.

At block 4306, a data plane may update. The data plane may represent an on-block-chain or off-block-chain mechanism. As discussed above, the data used and referenced in a block-chain may be executed through integration with a distributed hash table (DHT).

At block 4308, devices that meet approval may be added. In an example, confirmed devices may be identified through a device criterion, through parameter selection, or based on a cost function. For example, a device meeting specified criteria may be accepted by default. A device with a certain suitability parameter may be accepted. A device meeting the output of a cost function may be accepted. A cost function may prioritize ordering nodes and accepting the top N most suitable nodes in terms of cost per unit of supply. As with other methods described herein, a preamble may be used in the protocol frame. The preamble may allow participants to negotiate data needed to enable the process to continue before tokens are negotiated between the permissions guide and its participating members. Parties possessing the correct tokens may be subsequently trusted to access or provide specific services.

As discussed above, node negotiation from a permissions guide may use a cost function such as an infocoin algorithm. An infocoin algorithm may assume that the sensor will send data continually at a predefined rate. An infocoin algorithm may assume that the lifetime and maintenance schedule of the sensor is predictable. An infocoin algorithm may assume that out of band requests for data is not permitted. An infocoin algorithm may assume that the sensor, gateway, and server has fewer resource constraints such as, for example, power constraints, processing constraints, communications constraints, or storage constraints.

As used in the equation below, D refers to a unit of data. This unit of data may be a primary piece of data. In an example, a primary piece of data may be a directly observed measurement by a sensor in an IoT network. A primary piece of data may refer to a derived piece of data calculated based on inputs from one or more primary data sources.

As used in the equation below, Ct refers to the cost of transporting the unit of data. In an example, a unit of data may be referred to as an infocoin. The cost of transporting the unit of data may depend on network transport costs or the size of the data to be transported. The cost of transporting the unit of data may depend on if the data is being copied to a new storage location over the network or if a URI to a data home is used. In an example, a data home may be an Inter Planetary File System (IPFS) or a lightweight Fog File System. As used in the equation below, $C_{store}$ refers to the cost of storing the unit of data, where the cost of storage may be a function of the size of the data. The cost of storing data may refer to if replication of data is used for redundancy and the cost of the specific storage medium.

As used in the equation below, the term Margin may reflect the value provided by data. In an example, the value of data increases as data may be combined with other sources of data. As used in the equation below, $C_{raw}$ may refer to the cost of acquiring or the cost of generating a unit of primary data plus an operating margin. The cost of acquiring a unit of data or the cost of generating a unit of data may both include a fixed cost of the sensor ($C_S$), may include a cost of maintenance over lifetime of sensor ($C_m$), and may include an energy running cost ($C_e$) for the sensor node. In an example, the cost of acquiring a unit of data or the cost of generating a unit of data may both account for the sampling rate per day (rate) and a number of days (t) that the sensor will be used. $C_{raw}$ may be used by a permissions guide as an indication of a negotiated value for parties subscribed to the permissions guide.

$$C_{raw} = [C_S + (C_e * t) + Cm]/[\text{rate} * t] * Margindata \cdot C_{derived}$$

In another example, a cost of acquiring derived data or virtual data can be created by processing or analyzing one or more sets of primary data to gain new insights and value. As used herein, there may be at least three types of derived data. A type of derived data may include data derived within a sensor node. Another type of derived data may include data derived within a network. A further type of derived data may include data derived from historical data.

In an example, a raw cost can vary based on the number of data sources. For example, if derived data may be calculated from multiple inputs on the same sensor node the cost of acquiring the data is the same or similar to acquiring raw data. The fixed cost for the sensor node and running cost may be the same, regardless of whether or not all of the sensors on the node are used. Accordingly, in an example, there may be no additional cost to calculate a derived value on the same node. For example, calculating a derived value for a comfort index from inputs of temperature and humidity may include data from the same node and as such, raw costs for transport of data may not be increased.

Derived data may provide more value than raw data, and there may be a calculated "Margin on derived value" as seen in the equation below.

$$C_{derived\_local} = C_{raw} * Margininformation$$

Data may be derived from a number of different sources. In an example, data may be derived at a gateway, server, instrument, central processor, or other devices. When raw data is to be transported to a location for creation of derived data, a cost may be added in a cost calculation for the cost of transporting data. In an example, the cost of transporting data may relate to the cost of data traveling from a node to a gateway or server as well as the cost of storing the data at that location. In an example, a unit of raw data may have multiple stages of transport to get to a final data destination. During transport, a unit of data may be stored locally at a midway or intermediate stage between the trips to a final data destination. A cost may be generated as a sum of the cost for piece of raw data to reach its final destination plus a "Margin on derived value". In the formula below, the variable $C_{raw}$ could be replaced with $C_{derived\_local}$ if the data is derived at a point on its way to the final destination to generate the data referred to by $C_{derived\_remote}$.

$$C_{derived\_remote} = \sum_{0}^{n}\left[C_{raw} + \sum_{0}^{n}(C_t + C_{store})\right] * Marginknowledge$$

If data is derived from historical data, then the cost of storing the data may be added to the cost of generating the data. The cost can be substantially proportional to the number of historical samples used to generate this data, due to the increased value of data as additional data sources are added.

In the below example equations, $C_{acq}$ represents a cost that may be calculated for acquiring data, D. Data may have a monetary value, for example United State Dollars. Data may also express value in terms of some other native or overlay asset. The cost of $C_{acq}$ may be equal to $C_{raw}$, $C_{derived\_local}$, or $C_{derived\_remote}$. In the below example equation, Div may represent information value of the data unit. Div may vary from data unit to data unit because not every data unit may have an equal value.

$$C_{derived\ historical} = \sum_{0}^{n}(C_{acq} + C_S) * Marginwisdom$$

To identify a value of a unit data, or data generally, a weight of evidence model may inform an information value score used to classify data value at the time the data is created. Information value (IV) may be used to select variables in a predictive model. In an example, a IV statistic as a predictor may not be useful for modeling if the IV statistic falls less than a threshold. Using and varying a threshold for a calculated IV may be used to assess value to a data unit, or an infocoin. Data units with an IV below a threshold would receive a lower value. Data units with an IV above a threshold but below a second threshold could have a medium value assigned. This assessment of a value score could increase as the number of IV thresholds are surpassed by the inputs for an IV data score. In an example, high value data could have a greater monetary value as the data is more highly sought after by consumers in an IoT ecosystem. In an example, the more sought a unit of data is, the more the value of the unit of data.

Additional methods of storing and assessing value of a unit of data may be substituted into a negotiation system. The use of an IV score on data units may be the placement of a score on data that enables information itself to be used as a tradable asset within a negotiation framework or otherwise.

FIG. 44 is a schematic diagram of an example data structure 4400 to assess and assign a value to a unit of data in accordance with some embodiments. The data shown is merely exemplary and shown as an example way of calculating value of units of data as well as selecting a most value piece of data. Further the data that can be assigned a value may be used as a negotiation point or payment method of a permissions guide. In the example data structure 4400, the column for the weight of evidence (WoE) calculation 4402 is shown as based on a percentage of events for which data is gathered in a particular node.

In the example data structure 4400 a column for Bin may be an identification of nodes that have at least 5% of the observations for a particular data type. In an example, there may be multiple such value calculation models for each node and each data type. In the example data structure 4400, bin 7 appears as data that may have a high predictive value. In the example data structure 4400, the overall Div for the dataset appears as a value of 0.3138. Relatively, data from bi n 7 may command a higher value in a data market. The $C_{acq}$ in the example shown may appear as a flat value across bins and nodes. However, market forces may alter the value of $C_{acq}$. Creating a market for information units may encourage data suppliers to supply the types of data that will command a profit for their investment.

Figure 45:
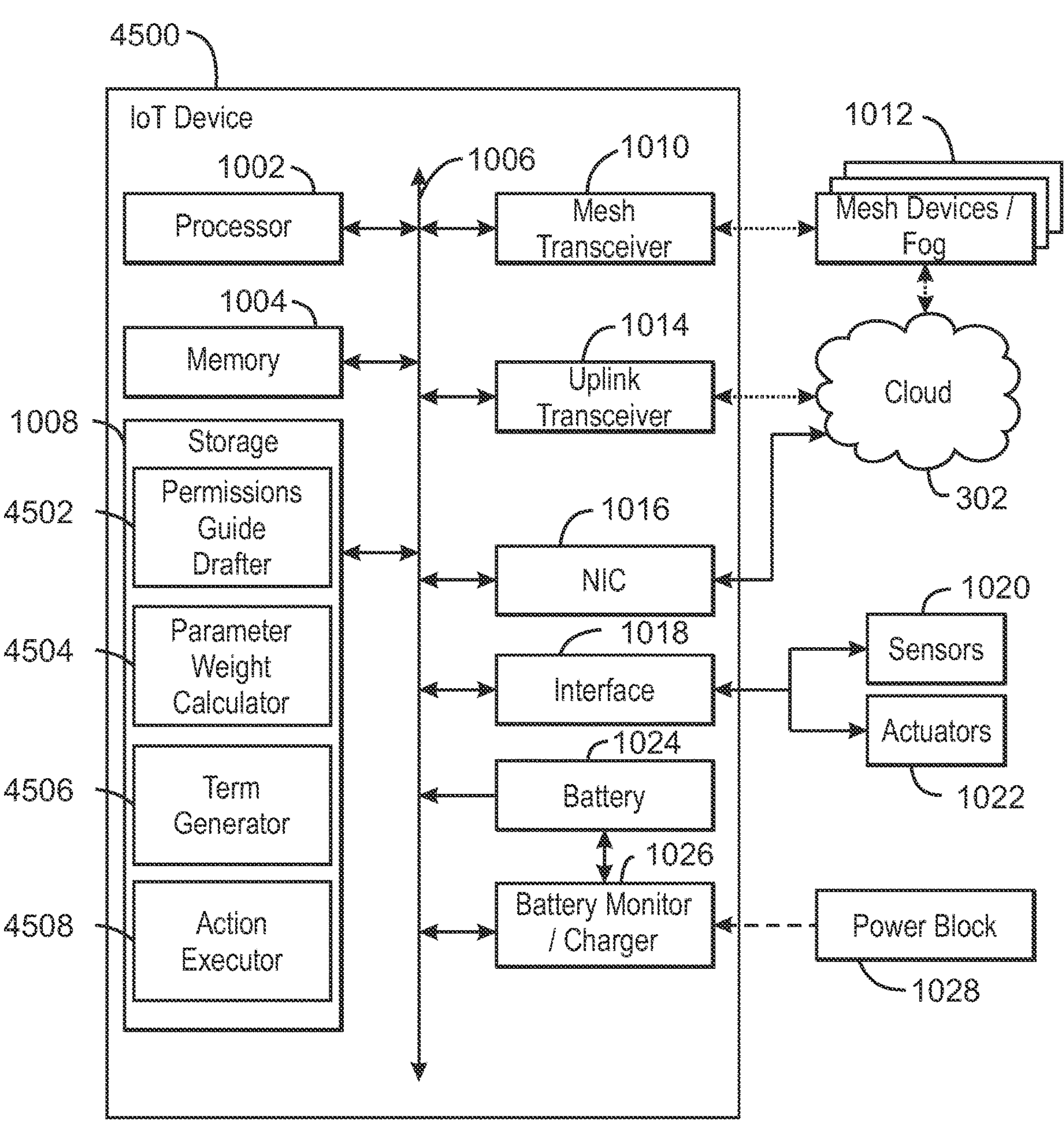
FIG. 45 is a block diagram of an example of components that may be present in an IoT device for negotiation with valued data units in accordance with some embodiments.

FIG. 45 is a block diagram of an example of components that may be present in an IoT device 4500 for negotiation with valued data units in accordance with some embodiments. Like numbered items are as described in FIG. 10.

The mass storage 1008 may include a number of modules to implement group creation functions. Although shown as code blocks in the mass storage 1008, it may be understood that any of the modules may be fully or partially replaced with hardwired circuits, for example, built into an application specific integrated circuit (ASIC). The mass storage 1008 may include a permissions guide drafter 4502 to draft a permissions guide for a first discovered peer including a first parameter and a first parameter value, and a second discovered peer including a second parameter and a second parameter value. In an example, the first parameter and second parameter may refer to acceptable data value ranges for a first and second node, respectively. The acceptable data value ranges may be calculated with a cost function. The cost function may calculate and combine operating costs of a node implementing the permissions guide. The operating costs include, for example, at least one of energy, running, and maintenance costs of operating a device, data transport, and storage devices. In an example, the data value ranges may refer to a calculation of the value of the data as a function of a number of sources of data. The data may be derived data synthesized from a number of sensors. The value of data may increase as a rate of data sought increases.

The mass storage 1008 may include a parameter weight calculator 4504 to calculate a first parameter weight and a second parameter weight by comparing the first parameter value and the second parameter value, for example, as described for the weight of event column with respect to FIG. 44. The mass storage 1008 may include a term generator 4506 to generate a term of the permissions guide in response to a proposed term being within ranges proposed by the first parameter and the second parameter, where the first parameter is adjusted by the first parameter weight and the second parameter is adjusted by the second parameter weight. The mass storage 1008 may include an action executor 4506 to execute an action of the permissions guide in response to detecting that a condition of the term is satisfied.

In an example, a processor 1002 may process a request from candidate peer to the permissions guide including a joining parameter and a joining parameter value. In an example, a processor 1002 may calculate a joining parameter weight by comparing to the first parameter value and the second parameter value to the joining parameter value.

Figure 46:
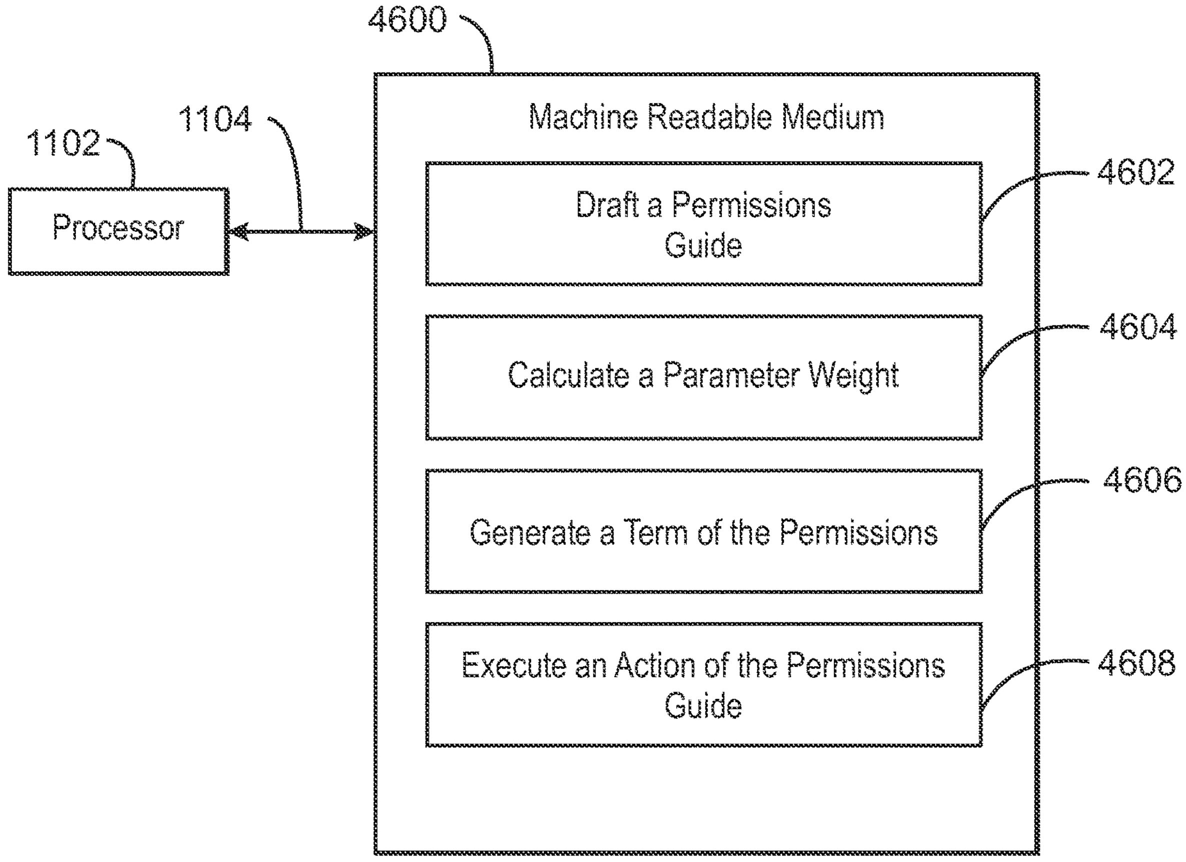
FIG. 46 is a block diagram of a non-transitory, machine readable medium including code to define tasks and commission nodes in accordance with some embodiments.

FIG. 46 is a block diagram of a non-transitory, machine readable medium 4600 including code to define tasks and commission nodes in accordance with some embodiments. Like numbered items are as they are described with regards to FIG. 11.

The non-transitory, machine readable medium 4600 may include code 4602 to direct the processor 1102 to draft a permissions guide for a first discovered peer including a first parameter and a first parameter value, and a second discovered peer including a second parameter and a second parameter value. In an example, the first parameter and second parameter may refer to acceptable data value ranges for a first and second node, respectively. The acceptable data value ranges may be calculated with a cost function. The cost function may calculate and combine operating costs of a node implementing the permissions guide. The operating costs include at least one of energy, running, and maintenance costs of operating a device, data transport, and storage devices. In an example, the data value ranges may refer to a calculation of the value of the data as a function of a number of sources of data. The data may be, for example, derived data synthesized from a number of sensors. The value of data may increase as a rate of data sought increases.

The non-transitory, machine readable medium 4600 may include code 4604 to direct the processor 1102 to calculate a first parameter weight and a second parameter weight by comparing the first parameter value and the second parameter value. The non-transitory, machine readable medium 4600 may include code 4606 to direct the processor 1102 to generate a term of the permissions guide in response to a proposed term being within ranges proposed by the first parameter and the second parameter, where the first parameter is adjusted by the first parameter weight and the second parameter is adjusted by the second parameter weight. The non-transitory, machine readable medium 4600 may include code 4608 to direct the processor 1102 to execute an action of the permissions guide in response to detecting that a condition of the term is satisfied.

In an example, the processor 1102 may process a request from candidate peer to the permissions guide including a joining parameter and a joining parameter value. In an example, the processor 1102 may calculate a joining parameter weight by comparing the first parameter value and the second parameter value to the joining parameter value.

Self-managing devices and systems in accordance with some embodiments are capable of describing themselves and their features to themselves and to other devices. For example, introspection, as described herein, may be used. Introspection is a form of self-awareness where a data description language (DDL), e.g., JSON Schema, or XML, among others, that is machine readable and encapsulates the semantic decomposition of the device under interrogation or advertisement. As used herein, self-managing devices and systems may be self-aware and able to optimize the performance of the device or recognize when it is damaged or running low on resources. Further, self-describing modules may decrease human input and effort by automating the task of reading a data sheet and developing specific code for the module. For example, a self-describing transducer may include integrated memory that describes the data that is found in the datasheet.

The datasheet information may include manufacturer details, calibration parameters, signal conditioning, and signal processing requirements. A datasheet may further describe a node meta-model (NMM) for interaction. In the meta-model, a node may include a NodeID, a set of properties, and a set of commands, such as the commands the node sends and the commands the node receives, and a set of command parameters. Parameters may be qualified by an identifier, an editor and an initializer. Editors may be applied to properties and/or command parameters. A node may have its own editor. Thus, in a node meta model, the datasheet information may include command interaction semantics in addition to property information.

The NMM may be expressible using a DDL facilitating automated introspection. Hence, IoT devices interacting with the node can dynamically react to changes in the datasheet as further detailed herein. When both sides of a datasheet interaction recognize the same vocabulary of the NMM, the system of IoT devices can dynamically take advantage of changes in device behavior and capability without installation or update of a device's drivers or system software. Accordingly, a self-describing transducer may be used in a plug and play configuration with a microcontroller or IoT device, without the need to manually develop specific code to access the information on the data sheet. Self-describing devices may also be plug and play into a network, in which they advertise their resources and requirements.

Further, self-describing external modules, including transducers, radios, energy storage, energy harvesting and microcontrollers, may be used to decrease waste by disposing of expired or damaged components and repurposing the longer lived components. For example, an external module may include external sensors or actuators, communications modules, energy harvesting components or an external battery, or external memory, among others. The external modules, such as a sensor or a radio, may have an expiration date, at which the accuracy or functionality may be projected to be degraded. When interchangeable external modules are used in an IoT device, the external modules may be replaced upon reaching the expiration date, allowing the remainder of the IoT device to be reconfigured and repurposed. The ability to replace or remove aging or nonfunctional external modules, and the reconfigure the remaining IoT device and functioning external modules may provide an extension in the overall lifetime of the entire IoT device.

In a single IoT device assembly, lifespan may be tied to the lifetime of the first component to fail. However, using the presently disclosed techniques, in accordance with some embodiments, the overall sensor node may be automatically repaired, or reconfigured for another purpose, beyond the lifetime of the shortest living component. For example, the IoT device may deactivate the external module close to an end of lifetime and be reconfigured to perform different task based on remaining modules.

Further, after component has been deactivated the function of the self-describing IoT modular device may be completely different. For example, a defective external module may be replaced with a working external module for another function, thus changing the function of the overall IoT device. A radio module on a sensor node may be replaced with a newer, lower power, or longer-range radio resource. This may extend the useful life of the sensor node, as the sensor node may be reconfigured if a system gateway is upgraded to a newer radio protocol. Further, a self-describing IoT device may cross-reference the values from these multiple modules, and output more calibrated data through use of additional external modules. This may be facilitated when a machine readable DDL includes a semantic markup that is transferrable to the cross-referenced and self-described device. Hence, a separate, manual, step of applying the semantic markup may be avoided. The IoT calibration parameters could allow a processor to read and apply these calibrated values directly rather than having to handle raw data with additional processing.

A common protocol may be used by devices and modules that are able to self-describe their resources and requirements. In these arrangements, the external modules may integrate into many devices. The devices may flag conflicts between the device capability and the requirements of an attached component.

Figure 47:
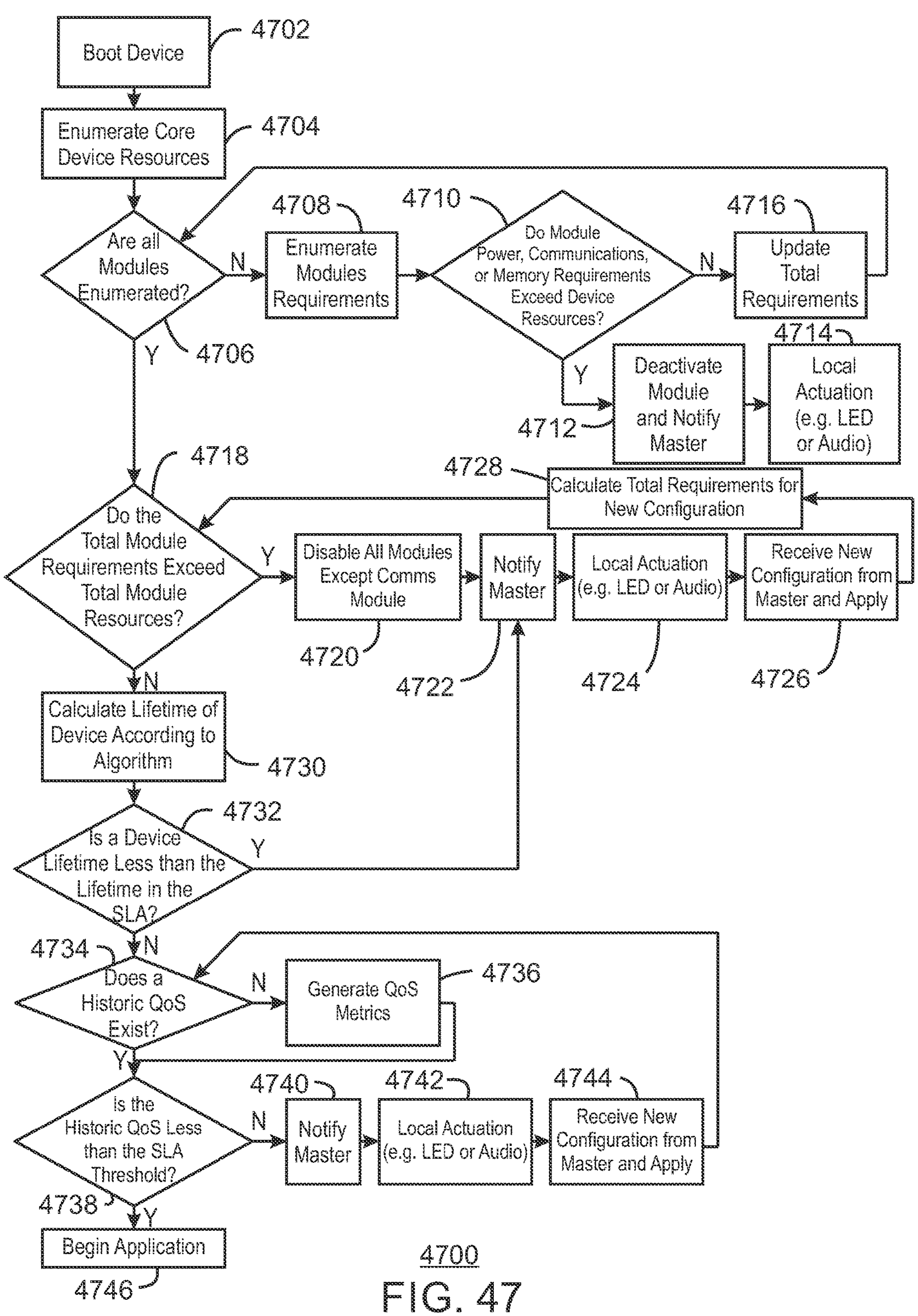
FIG. 47 is a process flow diagram of an example method for use by an IoT device to map resources and requirements of self-describing hardware.

FIG. 47 is a process flow diagram of an example method 4700 for use by an internet-of-things (IoT) device to map resources and requirements of self-describing hardware in accordance with some embodiments. The method 4700 of FIG. 47 may be implemented by the IoT device 4800 described with respect to FIG. 48. The method 4700 may be run using the system 802 described with respect to FIG. 8. The method 4700 may begin at block 4702 when an IoT device boots.

At block 4704, the IoT device may enumerate resources under the control of the IoT device. In an example, the resources may be hardware components and may include an energy source, such as a power supply, a battery, or an energy-harvesting system, including solar panels, wind turbines, or water turbines, among others. The hardware components of the IoT device may, for example, include a processor, context sensors, context actuators, signal conditioning circuitry, storage, and memory. Resource hardware components may, for example, include integrated communications including inter-integrated circuit (I2C), serial peripheral interface (SPI), universal asynchronous receiver/transmitter (UART), or integrated radio. The components of the IoT device in accordance with some embodiments are discussed further with respect to FIG. 48.

At block 4706, a determination is made as to whether some or all external modules have been enumeration and details about the requirements of an external module. If not all external modules have been identified, at block 4708, the requirements for the external module are identified and the external module is enumerated. Enumerating external modules allows an IoT device to reference the external modules and access the requirements of an external module. At block 4710, a determination is made as to whether the resources of the IoT device are exceeded by the requirements of the external module. The requirements may include, for example, module power, communication capabilities, communication speeds, memory requirements, and other IoT device and module capabilities.

If the requirements of the external modules exceed the resources of the IoT device by itself, at block 4712, the IoT device transmits a signal to the external module to deactivate. At block 4714, the IoT device may activate a visible or audible alert. The alert may be the actuation of a light-emitting diode (LED), an audio tone, or both. The alert, such as an LED, may signal to a user that the resources have been exceeded by the requirements of an indicated external module. For example, a high-throughput microphone, acting as an external module, may exceed the resources of a simple microcontroller as high-throughput processing may not be feasible in the microcontroller. In addition to a local alert, a message may be sent to master device from the IoT device.

If the resources of the IoT device are sufficient to meet the requirements of the external modules, at block 4716, the IoT device may update a listing of itself to include its remaining resources as well as a listing of the total requirements of some or all external modules operating from that IoT device.

Process flow resumes at block 4706, where a determination is made if some or all external modules connected to the IoT device are identified and enumerated. Once the external modules have been identified and enumerated, external modules may then be mapped to resources. For example, a gas sensor used as an external module may need temperature and humidity measurements to report data accurately. However, the IoT device may not have temperature and humidity sensors. In response to detecting that a gas sensor is attached and uses temperature and humidity measurements, the IoT device may send a request with these requirements to a master device. The master device may then determine if the requested external modules, such as the temperature sensor and the humidity sensor, are accessible by the master device either directly, or through another connected IoT device.

If a temperature or humidity sensor is found by the master device, for example, in an external module, the external module may be reconfigured to be under the control of the IoT device. The sensors may be local to the IoT device, or may be in a module external to the IoT device, so long as the measurement is sufficiently proximate to be useful. For example, if an IoT device wanted humidity and temperature information, a master device may access and reconfigure a temperature sensor or a humidity sensor in the same room or in a nearby hallway as the IoT device. These external modules to the IoT device may be configured to be under the control of the IoT device. The resources of these sensors may be used to enable a gas sensor on the IoT device to be calibrated for the variables of temperature and humidity, rather than returning raw data.

From another perspective, if an external module, such as a gas sensor, meets power, communications, and memory requirements, the external module may be added to the system even if the gas sensor does not have access to temperature or humidity data and cannot provide data calibrated by these factors. However, adding the gas sensor component to the IoT device may be used by other IoT devices in various configurations needing gas sensing.

Once the external modules have been identified and enumerated, at block 4718, a determination is made as to whether the total requirements of the sum of the combined modules and IoT device exceeds the total resources of the IoT device. The total resources of the IoT device, as used herein, generally refers to the resources of the IoT device, plus any external resources the IoT device may access without messaging a master device. Resources of an IoT device may be reflected in capabilities of the IoT. In an example, these resources may be allocated to the IoT device, or between several interconnected IoT devices based on the demands of the IoT device and the attached external modules.

If the total resources of the IoT device are exceeded by the total module requirements, at block 4720, the external modules may be disabled, except for a comm module. At block 4722, the IoT device may use the comm module to notify a master device of the shortfall in total resources. In response to receiving this notification, the master device may determine what resources it may reallocate by reconfiguring a pool of resources to a specific IoT device. Alternatively, in response to receiving a notification, the master device may reconfigure the external modules of the IoT device so that a second IoT device may use them while the first IoT device may be redeployed for another task or purpose.

At block 4724, an LED, audio signal, or both, may be actuated by the IoT device to provide a local indication that external modules are deactivated. At block 4726, the master device may identify a configuration to satisfy missing requirements by placing external modules under the control of the IoT device. The update in the configuration may be sent and applied to the IoT device. Applying a new configuration to an IoT device may include changing the resources available to the IoT device. Applying a new configuration to an IoT device may include changing if external modules remain under the control of the IoT device. If external modules are removed from an IoT device, the IoT device may make another check to determine if the remaining requirements of the remaining external modules may be satisfied. In response to a reconfiguration, the IoT device may be able to support its external modules if the IoT device resources have changed, if the sum of the external requirements has changed, or if the reconfiguration has changed a function the IoT device intends to execute. At block 4728, and after the reconfiguration by the master device, new total requirements may be calculated for the new configuration of external modules on the IoT device.

If, at block 4718, the total resources of the IoT device are not exceeded by the total module requirements, then at block 4730, the expected lifespan of the IoT device may be calculated using an algorithm comparing a component's lifespan. In an example algorithm, and expected lifespan for an IoT device may be set to match the shortest remaining lifetime of a component that, if lost or deactivated, could results in reconfiguration of the IoT device in order to function as expected.

An IoT modular device associated with a user or user account may include a service level specified in a service level agreement (SLA). An SLA may include agreed upon capabilities of the IoT device and configuration, an expected lifespan, and expected function, an expected performance, and an expected availability of the device. At block 4732, the IoT determines if a device lifetime is less than the lifetime specified in an SLA for a particular user or account. If yes, then process flow proceeds to block 4722, where a master device is notified. If the remaining lifetime of the device is less than provided in the SLA, the IoT device in its present configuration would not fulfil the requirements of the SLA. When the master device is notified at block 4732, a new configuration with external modules that fulfill the SLA may be added.

In an example, a configuration of an IoT device may include a module or modules that extends lifetimes of devices to meet a sensor lifetime specified in the SLA. For example, the lifetimes of the external modules available to an IoT device may be compared against the lifetime specified in the SLA. If a lifetime is less than specified in the SLA, the IoT may request a new configuration of external modules from the master device that meets the listed SLA lifetime value.

If however, the device lifetime exceeds the lifetime stated in the SLA, then at block 4734, a determination may be made about if a quality of service (QOS) measurement exits for the IoT device in its present configuration. If a QoS does not exist for the IoT device and its external modules, at block 4736, QOS metrics for the IoT device may be generated. Once these QoS metrics have been generated, or if QoS metrics were already present in the IoT device, then at block 4738 the IoT device may determine if the QoS is less than a specified QoS threshold in the SLA.

If the QoS is less than a requested threshold specified in the SLA, then at block 4740, the IoT may notify the master device that the QoS is lower than requested in the SLA and may identify the external module or modules that may be needed to change the QoS. At block 4742, a visible or audio signal such as LED or sound may be actuated to indicate locally to the IoT device that the IoT device does not meet a QoS. At block 4744, the IoT may receive an updated configuration with either additional, replacement, or fewer external modules, such that the QoS measurements match the requirements of the SLA. Process flow proceeds to block 4734, where a new QoS is found based on the updated configuration.

In an example, the QoS for an IoT device may be changed with the adding, subtracting, and substitution of external modules. These changes may result in a QoS less than the QoS specified in the SLA. For example, if there is no historic QoS on an IoT device for the IoT device communications module, the QoS may be tested on that device based. The QoS for the communication module on one IoT device may be different from the QoS for the communications module on another the same IoT device with a differing configuration to other external modules.

In this example, when a communications module QoS is below a threshold specified in the SLA, the master device may be notified by the IoT device and a request may be made for a new communications configuration. If an update to the configuration is granted by the master device, a new QoS test may be performed to evaluate and find a new QoS for the updated configuration. When the QoS is equal to or greater than the threshold listed in the SLA, at block 4734, the process ends by starting an application on the IoT device that makes use of the capabilities of the external modules in the present configuration of the IoT device.

In an example, after an application using an IoT and a certain set of external modules, the configuration of the IoT device may be disbanded and external modules removed from IoT device control for reconfiguration with other IoT devices.

Further, the self-describing hardware may incorporate the node meta-model described herein, and may capture a service-level agreement (SLA) as a parameter to commands it accepts. For example, the parameter may specify the expected power utilized to accomplish the command and an editor may adjust the power utilized to adapt to an expected SLA threshold for an expected lifespan of a device power source. Using NMM and these SLA conventions, IoT devices in accordance with some embodiments may support and perform the functions described herein without adding a separate driver or system software update.

Figure 48:
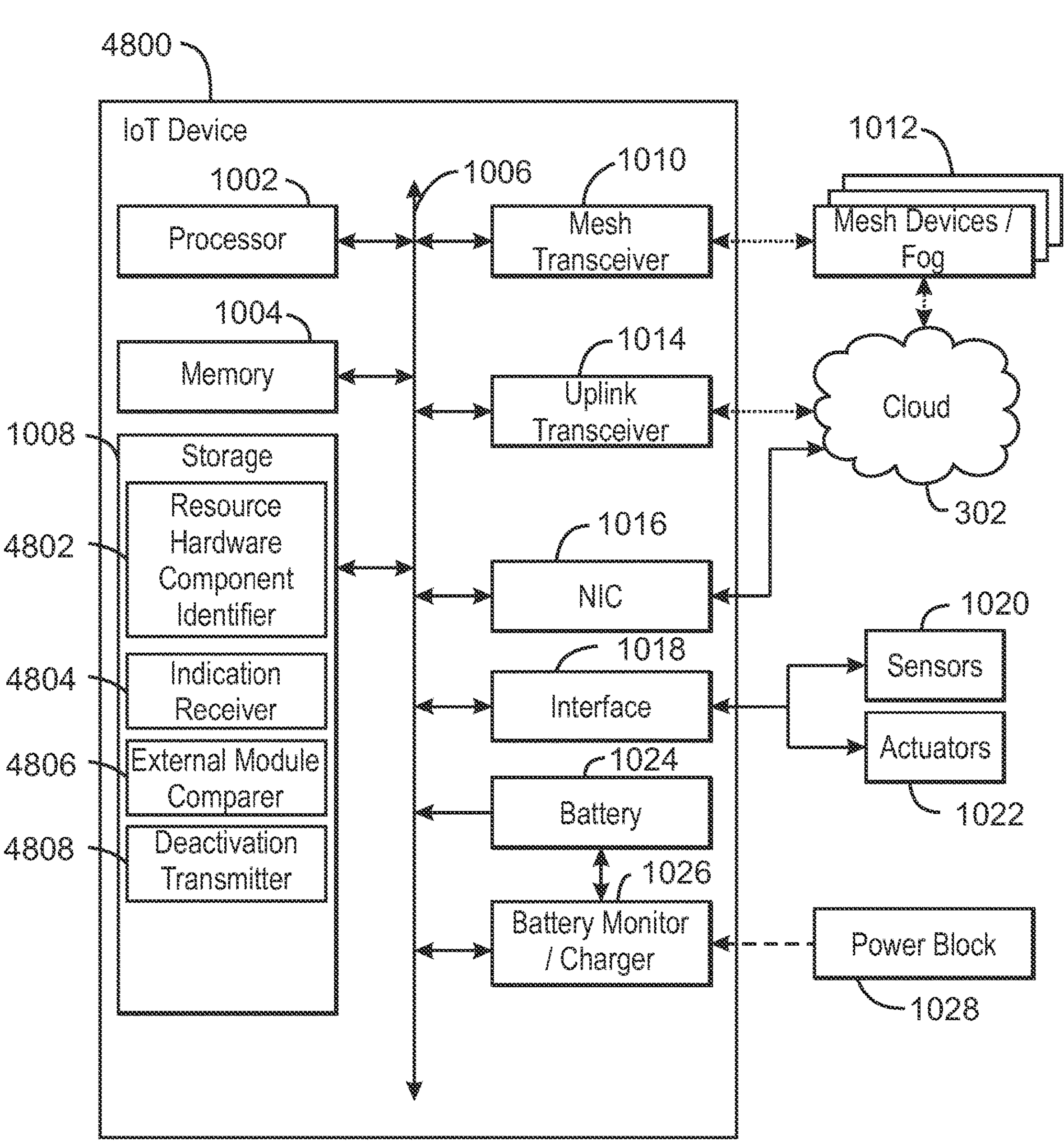
FIG. 48 is a block diagram of an example of components that may be present in an IoT device to map resources and requirements of self-describing hardware in accordance with some embodiments.

FIG. 48 is a block diagram of an example of components that may be present in an IoT device 4800 to map resources and requirements of self-describing hardware in accordance with some embodiments. Like numbered items are as described in FIG. 3 and FIG. 10.

As also shown above, with reference to FIG. 10, the mass storage 1008 may include a number of modules to implement the group creation functions described herein. Although shown as code blocks in the mass storage 1008, it may be understood that any of the modules may be fully or partially replaced with hardwired circuits, for example, built into an application specific integrated circuit (ASIC). The mass storage 1008 may include a resource hardware component identifier 4802 to identify a resource hardware component controlled by the IoT device, the resource hardware component having a capability threshold. In an example, the resource hardware component may include at least one of a power source, a processing resource, an integrated communication component, a context sensor, and a context actuator, a signal conditioning circuit, a memory resource, or a storage resource. The capability threshold, as used herein, generally refers to a minimum functional compatibility between the resource hardware component and the external module indicating a minimal ability to function together. The capability threshold as used herein may also include a full compatibility between the resource hardware component and the external module indicating an ability to function at the highest capabilities of the external module.

An indication receiver 4804 may process a received indication of an external module hardware requirement from an external module. In an example, the external module includes a module resource to be pooled with the first resource hardware component for use at the direction of the IoT device.

An external module comparer 4806 may compare the external module hardware requirement to the capability threshold of the resource hardware component of the IoT device. The deactivation transmitter 4808 transmits a deactivation signal to the external module in response to the external module hardware requirement not satisfying the capability threshold of the resource hardware component.

Figure 49:
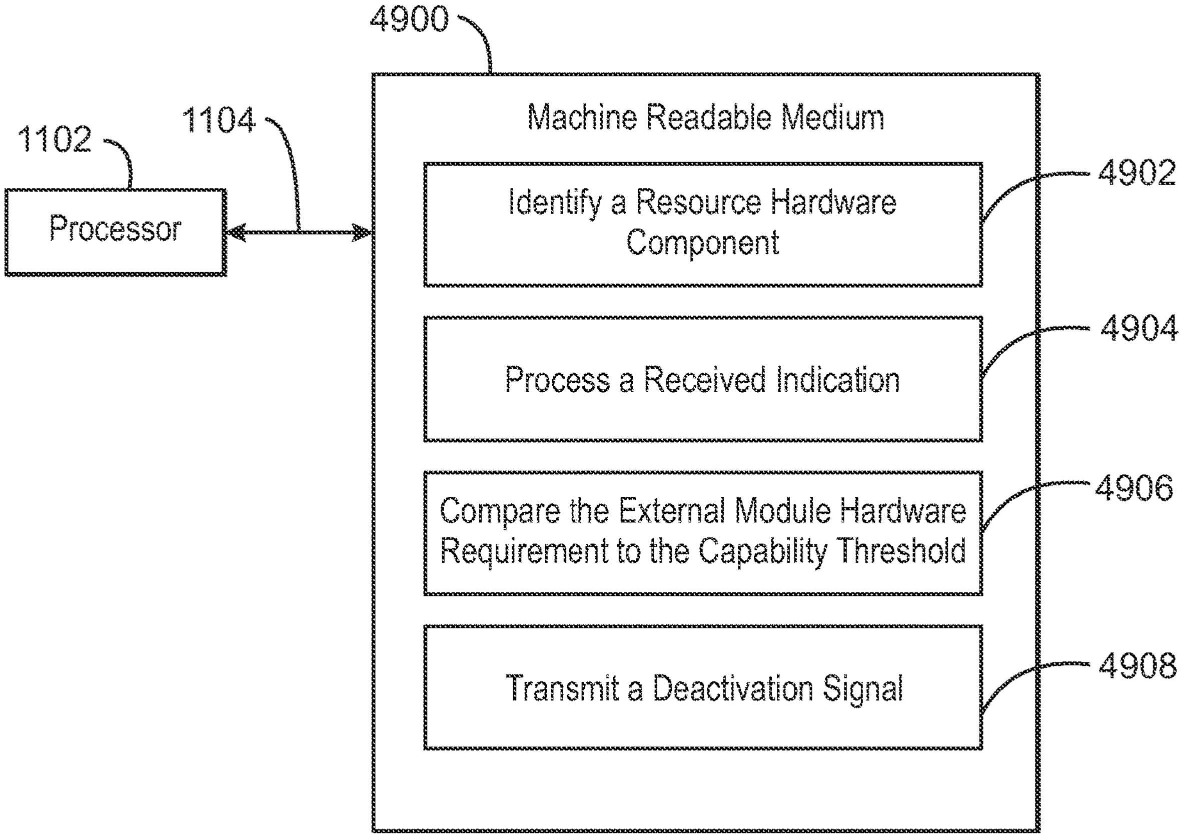
FIG. 49 is a block diagram of a non-transitory, machine readable medium including instructions that, when executed, direct a processor to map resources and requirements of self-describing hardware in accordance with some embodiments.

FIG. 49 is a block diagram of a non-transitory, machine readable medium 4900 including instructions that, when executed, direct a processor to map resources and requirements of self-describing hardware in accordance with some embodiments. Like numbered items are as they are described with regards to FIG. 11.

The non-transitory, machine readable medium 4900 may include code 4902 to direct the processor 1102 to identify a resource hardware component controlled by the IoT device, the resource hardware component having a capability threshold. The capability threshold, as used herein, generally refers to a minimum functional compatibility between the resource hardware component and the external module indicating a minimal ability to function together. The capability threshold may also include a compatibility between the resource hardware component and the external module. This may indicate the ability to function at the highest capabilities of the external module.

The non-transitory, machine readable medium 4900 may include code 4904 to direct the processor 1102 to process a received indication of an external module hardware requirement from an external module. The non-transitory, machine readable medium 4900 may include code 4906 to direct the processor 1102 to compare the external module hardware requirement to the capability threshold of the resource hardware component of the IoT device. The non-transitory, machine readable medium 4900 may include code 4908 to direct the processor 1102 to transmit a deactivation signal to the external module in response to the external module hardware requirement not satisfying the capability threshold of the resource hardware component.

The non-transitory, machine readable medium 4900 may include instructions that, when executed, direct the processor to transmit a request to a master device in response to the external module hardware requirement not satisfying the capability threshold of the resource hardware component, the request to the master device to request a second resource hardware component be assigned to be controlled by the IoT device. The non-transitory, machine readable medium 4900 may include a second resource hardware component under the control of the IoT device, wherein the first resource hardware component and the second resource hardware component may be pooled such that the capability threshold is the sum of the capability threshold of the first resource hardware and the second resource hardware.

An indication may be sent, based on executed instructions stored in the computer readable medium, to indicate an unsatisfied capability threshold and to activate a visible indicator. The non-transitory, machine readable medium 4900 may include instructions that, when executed, direct the processor to place the external module under control of the IoT device in response to satisfying the capability threshold.

The non-transitory, machine readable medium 4900 may additional code blocks for execution. This code can be used in response to an external module lifetime being less than an operational life of the IoT device, transmit a request for an updated external module. This code can be used in response to a resource hardware component lifetime being less than an operational life of the IoT device, the processor may be sent instructions to transmit a request for an updated resource hardware component.

Example 1 includes an apparatus. The apparatus includes an Internet-of-Things (IoT) network, wherein the IoT network includes devices including an orchestrator to issue service management requests to a service coordinator to form a service, the service coordinator to identify a plurality of components to participate in the service, and a component to perform a network service element for the service.

Example 2 includes the subject matter of example 1. In example 2, the orchestrator manages a plurality of network service overlays to perform tasks.

Example 3 includes the subject matter of any of examples 1 to 2. In example 3, the apparatus includes a shared repository including the plurality of network service overlays.

Example 4 includes the subject matter of any of examples 1 to 3. In example 4, a network service overlay includes a code segment to allow the component to perform the network service element.

Example 5 includes the subject matter of any of examples 1 to 4. In example 5, the service coordinator includes a database to store data or metadata or both from a component, a shared virtual repository to hold a network service element needing completion, and a machine learning engine to select the component to complete the network service element.

Example 6 includes the subject matter of any of examples 1 to 5. In example 6, the shared virtual repository stores an identity of the component assigned to the network service element.

Example 7 includes the subject matter of any of examples 1 to 6. In example 7, the service includes a plurality of network service elements, and wherein the network service elements are completed by the plurality of components.

Example 8 includes the subject matter of any of examples 1 to 7. In example 8, the service includes a fog device including a plurality of internet-of-things (IoT) devices.

Example 9 includes the subject matter of any of examples 1 to 8. In example 9, the service coordinator includes a network domain controller.

Example 10 includes the subject matter of any of examples 1 to 9. In example 10, the component is a device including a client, and wherein the client registers the device with the service coordinator.

Example 11 includes the subject matter of any of examples 1 to 10. In example 11, the client sends a message including attached sensors, actuators, or devices, or any combinations thereof, the service coordinator.

Example 12 includes the subject matter of any of examples 1 to 11. In example 12, the plurality of components is selected from multiple domains.

Example 13 includes a method for completing service requests. The method for completing service requests includes receiving an orchestration request at a network domain controller, determining if the orchestration request is for an existing service, and if the orchestration request is for an existing service, sending the orchestration request to a service coordinator.

Example 14 includes the subject matter of example 13. In example 14, the method includes, if the orchestration request is a new request preparing a service model including a network service element, preparing the network service element, identifying a service component to perform the network service element, and dispatching a subscription request to the service component to perform an action for the network service element.

Example 15 includes the subject matter of either of examples 13 or 14. In example 15, the method includes identifying a service coordinator.

Example 16 includes the subject matter of any of examples 13 to 15. In example 16, identifying a service component includes accessing data on historic performance of a plurality of service components, and using a machine learning technique to select the service component.

Example 17 includes the subject matter of any of examples 13 to 16. In example 17, the method includes validating the subscription request at the service component, and sending a confirmation to the service coordinator if the subscription request is valid.

Example 18 includes the subject matter of any of examples 13 to 17. In example 18, the method includes sending a denial to the service coordinator if the subscription request is not valid.

Example 19 includes the subject matter of any of examples 13 to 18. In example 19, a subscription request is valid if it is supported by the service component.

Example 20 includes the subject matter of any of examples 13 to 19. In example 20, the method includes performing the network service element in the service component, and returning data from the service component to the service coordinator.

Example 21 includes the subject matter of any of examples 13 to 20. In example 21, the service component downloads a network service overlay from a virtual shared repository to perform the network service element.

Example 22 includes the subject matter of any of examples 13 to 21. In example 22, the service component downloads a network service overlay from a shared repository in a cloud.

Example 23 includes the subject matter of any of examples 13 to 22. In example 23, the method includes sending a message including capabilities of a service component to a service coordinator to register the service component.

Example 24 includes a non-transitory, machine readable medium. The non-transitory, machine readable medium includes instructions that, when executed, direct one or more processors to identify a service coordinator, prepare network elements, identify service components, and send subscription requests to service components.

Example 25 includes the subject matter of example 24. In example 25, the non-transitory, machine readable medium includes instructions that, when executed, direct the one or more processors to validate a subscription request, perform and action for a network service element, and send data to the service coordinator.

Example 26 includes the subject matter of either of examples 24 or 25. In example 26, the non-transitory, machine readable medium includes instructions that, when executed, direct the one or more processors to send a connection request to the service coordinator, and send device peripheral data to the service coordinator.

Example 27 includes an apparatus. The apparatus includes an Internet-of-Things (IoT) network, wherein the IoT network includes an IoT device. The IoT device includes a service enumerator to enumerate services available to the IoT device, services that can be provided by the IoT device, or both, a contract enumerator to discover a contract for the IoT device, and a join contract function to join the IoT device to the contract.

Example 28 includes the subject matter of examples 27. In example 28, the IoT device includes blockchain logic to share and maintain a blockchain across a network of IoT devices, and the blockchain including services, contracts, identities, attributes, or any combinations thereof.

Example 29 includes the subject matter of either of examples 27 or 28. In example 29, the blockchain includes a list of created devices, wherein the list of created devices includes the devices joined to the contract.

Example 30 includes the subject matter of any of examples 27 to 29. In example 30, the blockchain includes a device attribute list for each device in the list of created devices, including context properties, advertised services, or both for the device.

Example 31 includes the subject matter of any of examples 27 to 30. In example 31, the IoT device includes a leave contract function to terminate participation of the IoT device in a contract.

Example 32 includes the subject matter of any of examples 27 to 31. In example 32, the IoT device includes an issue token function to issue tokens to devices.

Example 33 includes the subject matter of any of examples 27 to 32. In example 33, the IoT device includes a revoked token function to invalidate tokens issued to a device when the device leaves the contract.

Example 34 includes the subject matter of any of examples 27 to 33. In example 34, the IoT device includes a trusted platform module to perform measurements for a trusted execute environment during a booting process.

Example 35 includes a method for managing a lifecycle of devices. The method for managing a lifecycle of devices includes booting an IoT device into a secure enclave, running an identity client in the secure enclave, acquiring an identity for the IoT device, generating a commissioning transaction for the IoT device, enumerating contracts available to the IoT device, and joining the IoT device to a contract.

Example 36 includes the subject matter of example 35. In example 36, acquiring an identity for the IoT device includes enumerating services from which the identity can be acquired, selecting a service to obtain the identity, and requesting the identity from the service.

Example 37 includes the subject matter of either of examples 35 or 36. In example 37, the identity includes a DNS name, a NetBIOS name, an IP address, or a UUID, or any combinations thereof.

Example 38 includes the subject matter of any of examples 35 to 37. In example 38, the identity is selected based, at least in part, on the contract.

Example 39 includes the subject matter of any of examples 35 to 38. In example 39, the method includes sending an alert message if acquiring the identity fails.

Example 40 includes the subject matter of any of examples 35 to 39. In example 40, the method includes assigning an initial balance of funds when the identity is acquired.

Example 41 includes the subject matter of any of examples 35 to 40. In example 41, joining the IoT device to the contract includes sending a fee to a wallet address for an owner of the contract.

Example 42 includes the subject matter of any of examples 35 to 41. In example 42, the method includes completing requirements for joining the contract before joining the contract.

Example 43 includes the subject matter of any of examples 35 to 42. In example 43, requirements include encrypting a storage prior to joining the contract.

Example 44 includes the subject matter of any of examples 35 to 43. In example 44, the method includes adding the IoT device to a list of created devices associated with the contract.

Example 45 includes the subject matter of any of examples 35 to 44. In example 45, the method includes publishing device attributes for the IoT device.

Example 46 includes the subject matter of any of examples 35 to 45. In example 46, the method includes identifying a mechanism to attest to each of the device attributes.

Example 47 includes the subject matter of any of examples 35 to 46. In example 47, the method includes requesting tokens for functioning under the contract.

Example 48 includes the subject matter of any of examples 35 to 47. In example 48, the method includes presenting a token to an owner of a service to allow access to the service.

Example 49 includes the subject matter of any of examples 35 to 48. In example 49, the method includes commissioning the IoT device to operate under the contract, and performing operations under the contract.

Example 50 includes the subject matter of any of examples 35 to 49. In example 50, the method includes decommissioning the IoT device, and completing conditions required to leave the contract.

Example 51 includes the subject matter of any of examples 35 to 50. In example 51, the method includes performing a factory reset upon leaving the contract.

Example 52 includes the subject matter of any of examples 35 to 51. In example 52, the method includes sending an end-of-life message to a maintenance service provider upon leaving the contract.

Example 53 includes the subject matter of any of examples 35 to 52. In example 53, the method includes refunding any funds balance left for the IoT device when the IoT device leaves the contract.

Example 54 includes a non-transitory, machine readable medium. The non-transitory, machine readable medium includes instructions that, when executed, direct a processor to boot into a secure enclave, acquire an identity, enumerate available contracts, and join a contract.

Example 55 includes the subject matter of example 54. In example 55, the non-transitory, machine readable medium includes instructions that, when executed, direct the processor to generate a key to be used as a blockchain client.

Example 56 includes the subject matter of either of examples 54 or 55. In example 56, the non-transitory, machine readable medium includes instructions that, when executed, direct the processor to publish attributes for an IoT device.

Example 57 includes the subject matter of any of examples 54 to 56. In example 57, the non-transitory, machine readable medium includes instructions that, when executed, direct the processor to request tokens for operating under contract.

Example 58 includes an apparatus for use in an Internet-of-Things (IoT) network. The apparatus for use in an Internet-of-Things (IoT) network includes a permissions guide drafter to draft a permissions guide for a plurality of discovered peers, where the plurality of discovered peers each have a parameter, and where a term of the permissions guide is generated in response to the term being allowable by at least two of the plurality of discovered peers. The parameter of each discoverable peer of the plurality of discovered peers includes a range of an allowable term range for an associated peer, and an action executor to execute an action of the permissions guide in response to detecting that a condition of the term is satisfied.

Example 59 includes the subject matter of example 58. In example 59, the permissions guide drafter includes a function for listing of the terms and conditions of the plurality of discovered peers.

Example 60 includes the subject matter of either of examples 58 or 59. In example 60, the permissions guide drafter includes a listing of the quality of service terms and conditions for the plurality of discovered peers.

Example 61 includes the subject matter of any of examples 58 to 60. In example 61, the permissions guide drafter includes a listing of data plane terms and conditions for the plurality of the discovered peers.

Example 62 includes the subject matter of any of examples 61 to 61. In example 62, the data plane is to indicate a process for how the data is to be supplied and consumed by the peers.

Example 63 includes the subject matter of any of examples 58 to 62. In example 63, the permissions guide includes a time-to-live.

Example 64 includes the subject matter of any of examples 58 to 63. In example 64, the permissions guide includes a protocol conversion broker to manage the joining and leaving of the permissions guide by a peer.

Example 65 includes the subject matter of any of examples 58 to 64. In example 65, executing an action of the permissions guide includes auto-commissioning of a service to a peer instructing the peer to process data.

Example 66 includes the subject matter of any of examples 58 to 65. In example 66, the permissions guide includes a preamble to manage the exchange of a configuration between the plurality of discovered peers.

Example 67 includes the subject matter of any of examples 58 to 66. In example 67, the term refers to a rate of payment to be paid between the plurality of discovered peers, and a final payment is made between peers upon a detection that a peer of the plurality of discovered peers is terminating participation in the permissions guide.

Example 68 includes a method for task definition and commissioning in an internet-of-things (IoT) device. The method for task definition and commissioning in an internet-of-things (IoT) device includes drafting a permissions guide for a plurality of discovered peers, where the plurality of discovered peers each have a parameter, and where a term of the permissions guide is generated in response to the term being allowable by at least two of the plurality of discovered peers, and executing an action of the permissions guide in response to detecting that a condition of the term is satisfied.

Example 69 includes the subject matter of example 68. In example 69, the drafting of the permissions guide includes a function for listing of the terms and conditions of the plurality of discovered peers.

Example 70 includes the subject matter of any of examples 68 to 69. In example 70, the drafting of the permissions guide includes a listing of the quality of service terms and conditions for the plurality of discovered peers.

Example 71 includes the subject matter of any of examples 68 to 70. In example 71, the drafting of the permissions guide includes a listing of data plane terms and conditions for the plurality of the discovered peers.

Example 72 includes the subject matter of any of examples 68 to 76. In example 72, the data plane is to indicate a process for how the data is to be supplied and consumed by the peers.

Example 73 includes the subject matter of any of examples 68 to 72. In example 73, the permissions guide includes a time-to-live.

Example 74 includes the subject matter of any of examples 68 to 73. In example 74, the permissions guide includes a protocol conversion broker to manage the joining and leaving of the permissions guide by a peer.

Example 75 includes the subject matter of any of examples 68 to 74. In example 75, executing an action of the permissions guide includes auto-commissioning of a service to a peer instructing the peer to process data.

Example 76 includes the subject matter of any of examples 68 to 75. In example 76, the permissions guide includes a preamble to manage the exchange of a configuration between the plurality of discovered peers.

Example 77 includes the subject matter of any of examples 68 to 76. In example 77, the term refers to a rate of payment to be paid between the plurality of discovered peers, and a final payment is made between peers upon a detection that a peer of the plurality of discovered peers is terminating participation in the permissions guide.

Example 78 includes a non-transitory, machine readable medium. The non-transitory, machine readable medium includes instructions that, when executed, direct a processor to draft a permissions guide for a plurality of discovered peers, where the plurality of discovered peers each have a parameter, and where a term of the permissions guide is generated in response to the term being allowable by at least two of the plurality of discovered peers, and execute an action of the permissions guide in response to detecting that a condition of the term is satisfied.

Example 79 includes the subject matter of example 78. In example 79, the drafting of the permissions guide includes a function for listing of the terms and conditions of the plurality of discovered peers.

Example 80 includes the subject matter of either of examples 78 or 79. In example 80, the drafting of the permissions guide includes a listing of the quality of service terms and conditions for the plurality of discovered peers.

Example 81 includes the subject matter of any of examples 78 to 80. In example 81, the drafting of the permissions guide includes a listing of data plane terms and conditions for the plurality of the discovered peers.

Example 82 includes the subject matter of any of examples 78 to 81. In example 82, the data plane is to indicate a process for how the data is to be supplied and consumed by the peers.

Example 83 includes the subject matter of any of examples 78 to 82. In example 83, the permissions guide includes a time-to-live.

Example 84 includes the subject matter of any of examples 78 to 83. In example 84, the permissions guide includes a protocol conversion broker to manage the joining and leaving of the permissions guide by a peer.

Example 85 includes the subject matter of any of examples 78 to 84. In example 85, executing an action of the permissions guide includes auto-commissioning of a service to a peer instructing the peer to process data.

Example 86 includes the subject matter of any of examples 78 to 85. In example 86, the permissions guide includes a preamble to manage the exchange of a configuration between the plurality of discovered peers.

Example 87 includes the subject matter of any of examples 78 to 86. In example 87, the term refers to a rate of payment to be paid between the plurality of discovered peers, and a final payment is made between peers upon a detection that a peer of the plurality of discovered peers is terminating participation in the permissions guide.

Example 88 includes an apparatus for use in an Internet-of-Things (IoT) network. The apparatus for use in an Internet-of-Things (IoT) network includes a floating service permissions guide drafter to draft a floating service permissions guide for a plurality of discovered hosts, where the plurality of discovered hosts each are assessed for host fulfilment of a parameter. The apparatus also includes a host hardware selector to select a host hardware for the floating service based on a data structure of the floating service, a floating service permissions guide executor to execute the floating service permissions guide using the host hardware, and a value transferor to transfer value to a service wallet associated with the floating service in response to a detection a condition of the floating permissions guide is reached.

Example 89 includes the subject matter of example 88. In example 89, the floating service initiates a value transaction between the service wallet and a host wallet.

Example 90 includes the subject matter of either of examples 88 or 89. In example 90, the service wallet holds a block-chain encoded value.

Example 91 includes the subject matter of any of examples 88 to 90. In example 91, a data structure is a decision matrix.

Example 92 includes the subject matter of any of examples 88 to 91. In example 92, the decision matrix lists a feature sought by the floating service, a number of available hosts, and an assessment score of each of the hosts relative to the feature listed in the decision matrix.

Example 93 includes the subject matter of any of examples 88 to 92. In example 93, the floating service selects a host based on a best value calculated from a cost per hour divided by a number of features with quality metrics indicating satisfactory use for the floating service, where the cost per hour is a projected cost per hour of operating the floating service using a host being assessed.

Example 94 includes the subject matter of any of examples 88 to 93. In example 94, the features of the floating service variously weigh the features in a value calculation using the decision matrix.

Example 95 includes the subject matter of any of examples 88 to 94. In example 95, the floating service permissions guide indicates penalties to be assessed against a host in response to a detected violation of the service permissions guide, wherein the penalties are to be collected from a host wallet.

Example 96 includes the subject matter of any of examples 88 to 95. In example 96, the floating service ceases functioning when the service wallet has a value of zero.

Example 97 includes the subject matter of any of examples 88 to 96. In example 97, the permissions guide indicates that a service wallet is to transfer value in response to a detection that the service wallet has reached a triggering threshold value.

Example 98 includes a method for management of a floating service in an internet-of-things (IoT) device. The method for management of a floating service in an internet-of-things (IoT) device includes drafting a floating service permissions guide for a plurality of discovered hosts, where the plurality of discovered hosts each are assessed for host fulfilment of a parameter, selecting a host hardware for the floating service based on a data structure of the floating service, executing the floating service permissions guide using the host hardware, and transferring value to a service wallet associated with the floating service in response to a detection a condition of the floating permissions guide is reached.

Example 99 includes the subject matter of example 98. In example 99, the floating service initiates a value transaction between the service wallet and a host wallet.

Example 100 includes the subject matter of either of examples 98 or 99. In example 100, the service wallet holds a block-chain encoded value.

Example 101 includes the subject matter of any of examples 98 to 100. In example 101, a data structure is a decision matrix.

Example 102 includes the subject matter of any of examples 98 to 101. In example 102, the decision matrix lists a feature sought by the floating service, a number of available hosts, and an assessment score of each of the hosts relative to the feature listed in the decision matrix.

Example 103 includes the subject matter of any of examples 98 to 102. In example 103, the floating service selects a host based on a best value calculated from a cost per hour divided by a number of features with quality metrics indicating satisfactory use for the floating service, where the cost per hour is a projected cost per hour of operating the floating service using a host being assessed.

Example 104 includes the subject matter of any of examples 98 to 103. In example 104, the features of the floating service variously weigh the features in a value calculation using the decision matrix.

Example 105 includes the subject matter of any of examples 98 to 104. In example 105, the floating service permissions guide indicates penalties to be assessed against a host in response to a detected violation of the service permissions guide, wherein the penalties are to be collected from a host wallet.

Example 106 includes the subject matter of any of examples 98 to 105. In example 106, the floating service ceases functioning when the service wallet has a value of zero.

Example 107 includes the subject matter of any of examples 98 to 106. In example 107, the permissions guide indicates that a service wallet is to transfer value in response to a detection that the service wallet has reached a triggering threshold value.

Example 108 includes a non-transitory, machine readable medium. The non-transitory, machine readable medium includes instructions that, when executed, direct a processor to draft a floating service permissions guide for a plurality of discovered hosts, where the plurality of discovered hosts each are assessed for host fulfilment of a parameter, select a host hardware for the floating service based on a data structure of the floating service, execute the floating service permissions guide using the host hardware, and transfer value to a service wallet associated with the floating service in response to a detection a condition of the floating permissions guide is reached.

Example 109 includes the subject matter of example 108. In example 109, the floating service initiates a value transaction between the service wallet and a host wallet.

Example 110 includes the subject matter of either of examples 108 or 109. In example 110, the service wallet holds a block-chain encoded value.

Example 111 includes the subject matter of any of examples 108 to 110. In example 111, a data structure is a decision matrix.

Example 112 includes the subject matter of any of examples 88 to 111. In example 112, the decision matrix lists a feature sought by the floating service, a number of available hosts, and an assessment score of each of the hosts relative to the feature listed in the decision matrix.

Example 113 includes the subject matter of any of examples 88 to 112. In example 113, the floating service selects a host based on a best value calculated from a cost per hour divided by a number of features with quality metrics indicating satisfactory use for the floating service, where the cost per hour is a projected cost per hour of operating the floating service using a host being assessed.

Example 114 includes the subject matter of any of examples 88 to 113. In example 114, the features of the floating service variously weigh the features in a value calculation using the decision matrix.

Example 115 includes the subject matter of any of examples 108 to 114. In example 115, the floating service permissions guide indicates penalties to be assessed against a host in response to a detected violation of the service permissions guide, wherein the penalties are to be collected from a host wallet.

Example 116 includes the subject matter of any of examples 108 to 115. In example 116, the floating service ceases functioning when the service wallet has a value of zero.

Example 117 includes the subject matter of any of examples 108 to 116. In example 117, the permissions guide indicates that a service wallet is to transfer value in response to a detection that the service wallet has reached a triggering threshold value.

Example 118 includes an apparatus for use in an Internet-of-Things (IoT) network. The apparatus for use in an Internet-of-Things (IoT) network includes a permissions guide drafter to draft a permissions guide for a first discovered peer including a first parameter and a first parameter value. The apparatus also includes a second discovered peer including a second parameter and a second parameter value, a parameter weight calculator to calculate a first parameter weight and a second parameter weight by comparing the first parameter value and the second parameter value, a term generator to generate a term of the permissions guide in response to a proposed term being within ranges proposed by the first parameter and the second parameter, where the first parameter is adjusted by the first parameter weight and the second parameter is adjusted by the second parameter weight, and an action executor to execute an action of the permissions guide in response to detecting that a condition of the term is satisfied.

Example 119 includes the subject matter of example 118. In example 119, the apparatus includes a processor to process a request from candidate peer to the permissions guide including a joining parameter and a joining parameter value.

Example 120 includes the subject matter of either of examples 118 or 119. In example 120, the processor calculates a joining parameter weight by comparing to the first parameter value and the second parameter value to the joining parameter value.

Example 121 includes the subject matter of any of examples 118 to 120. In example 121, the first parameter and second parameter refer to acceptable data value ranges for a first and second node, respectively.

Example 122 includes the subject matter of any of examples 118 to 121. In example 122, the acceptable data value ranges are calculated with a cost function.

Example 123 includes the subject matter of any of examples 118 to 122. In example 123, the cost function is to calculate and combine operating costs of a node implementing the permissions guide.

Example 124 includes the subject matter of any of examples 118 to 123. In example 124, the operating costs include at least one of energy, running, and maintenance costs of operating a device, data transport, and storage devices.

Example 125 includes the subject matter of any of examples 118 to 124. In example 125, the data value ranges refer to a calculation of the value of the data as a function of a number of sources of data.

Example 126 includes the subject matter of any of examples 118 to 125. In example 126, the data is derived data synthesized from a plurality of sensors.

Example 127 includes the subject matter of any of examples 118 to 126. In example 127, the value of data increases as a rate of data sought increases.

Example 128 includes a method for negotiation with valued data units in an internet-of-things (IoT) device. The method for negotiation with valued data units in an internet-of-things (IoT) device includes drafting a permissions guide for a first discovered peer including a first parameter and a first parameter value, and a second discovered peer including a second parameter and a second parameter value, calculating a first parameter weight and a second parameter weight by comparing the first parameter value and the second parameter value, generating a term of the permissions guide in response to a proposed term being within ranges proposed by the first parameter and the second parameter, where the first parameter is adjusted by the first parameter weight and the second parameter is adjusted by the second parameter weight, and executing an action of the permissions guide in response to detecting that a condition of the term is satisfied.

Example 129 includes the subject matter of any of examples 128. In example 129, the method includes receiving from candidate peer a request to the permissions guide including a joining parameter and a joining parameter value.

Example 130 includes the subject matter of either of examples 128 or 129. In example 130, the method includes calculating a joining parameter weight by comparing to the first parameter value and the second parameter value to the joining parameter value.

Example 131 includes the subject matter of any of examples 128 to 130. In example 131, the first parameter and second parameter refer to acceptable data value ranges for a first and second node, respectively.

Example 132 includes the subject matter of any of examples 128 to 131. In example 132, the acceptable data value ranges are calculated with a cost function.

Example 133 includes the subject matter of any of examples 128 to 132. In example 133, the cost function is to calculate and combine operating costs of a node implementing the permissions guide.

Example 134 includes the subject matter of any of examples 128 to 133. In example 134, the operating costs include at least one of energy, running, and maintenance costs of operating the device, data transport, and storage devices.

Example 135 includes the subject matter of any of examples 128 to 134. In example 135, the data value ranges refer to a calculation of the value of the data as a function of a number of sources of data.

Example 136 includes the subject matter of any of examples 128 to 135. In example 136, the data is derived data synthesized from a plurality of sensors.

Example 137 includes the subject matter of any of examples 128 to 136. In example 137, the value of data increases as a rate of data sought increases.

Example 138 includes a non-transitory, machine readable medium. The non-transitory, machine readable medium includes instructions that, when executed, direct a processor to draft a permissions guide for a first discovered peer including a first parameter and a first parameter value, and a second discovered peer including a second parameter and a second parameter value, calculate a first parameter weight and a second parameter weight by comparing the first parameter value and the second parameter value, generate a term of the permissions guide in response to a proposed term being within ranges proposed by the first parameter and the second parameter, where the first parameter is adjusted by the first parameter weight and the second parameter is adjusted by the second parameter weight, and execute an action of the permissions guide in response to detecting that a condition of the term is satisfied.

Example 139 includes the subject matter of example 138. In example 139, the non-transitory, machine readable medium includes instructions, that when executed, direct the processor to process a request received from a candidate peer, the request including a joining parameter and a joining parameter value.

Example 140 includes the subject matter of either of examples 138 or 139. In example 140, the non-transitory, machine readable medium includes instructions, that when executed, direct the processor to calculate a joining parameter weight by comparing to the first parameter value and the second parameter value to the joining parameter value.

Example 141 includes the subject matter of any of examples 138 to 140. In example 141, the first parameter and second parameter refer to acceptable data value ranges for a first and second node, respectively.

Example 142 includes the subject matter of any of examples 138 to 141. In example 142, the acceptable data value ranges are calculated with a cost function.

Example 143 includes the subject matter of any of examples 138 to 142. In example 143, the cost function is to calculate and combine operating costs of a node implementing the permissions guide.

Example 144 includes the subject matter of any of examples 138 to 143. In example 144, the operating costs include at least one of energy, running, and maintenance costs of operating a device, data transport, and storage devices.

Example 145 includes the subject matter of any of examples 138 to 144. In example 145, the data value ranges refer to a calculation of the value of the data as a function of a number of sources of data.

Example 146 includes the subject matter of any of examples 138 to 145. In example 146, the data is derived data synthesized from a plurality of sensors. Example 147 includes the subject matter of any of examples 138 to 146. In example 147, the value of data increases as a rate of data sought increases.

Example 148 includes an apparatus. The apparatus includes an Internet-of-Things (IoT) network, wherein the IoT network includes an IoT device. The IoT device also includes a resource hardware component identifier to identify a resource hardware component controlled by the IoT device, the resource hardware component having a capability threshold, a processor to process a received indication of an external module hardware requirement from an external module, an external module comparer to compare the external module hardware requirement to the capability threshold of the resource hardware component of the IoT device, and a transmitter to transmit a deactivation signal to the external module in response to the external module hardware requirement not satisfying the capability threshold of the resource hardware component.

Example 149 includes the subject matter of example 148. In example 149, the IoT device transmits a request to a master device in response to the external module hardware requirement not satisfying the capability threshold of the resource hardware component, the request to the master device to request a second resource hardware component be assigned to be controlled by the IoT device.

Example 150 includes the subject matter of either of examples 148 or 149. In example 150, the IoT device includes a second resource hardware component under control of the IoT, wherein a first resource hardware component and a second resource hardware component can be pooled such that the capability threshold is a sum of the capability threshold of the first resource hardware and the second resource hardware.

Example 151 includes the subject matter of any of examples 148 to 150. In example 151, the external module includes a module resource to be pooled with a first resource hardware component for use by the IoT device.

Example 152 includes the subject matter of any of examples 148 to 151. In example 152, the resource hardware component includes at least one of a power source, a processing resource, an integrated communication component, a context sensor, a context actuator, a signal conditioning circuit, a memory resource, or a storage resource.

Example 153 includes the subject matter of any of examples 148 to 152. In example 153, the capability threshold includes a minimum functional compatibility between the resource hardware component and the external module indicating an minimal ability to function together, and a full compatibility between the resource hardware component and the external module indicating an ability to function at the highest capabilities of the external module.

Example 154 includes the subject matter of any of examples 148 to 153. In example 154, the IoT device is to indicate an unsatisfied capability threshold by activating a visible indicator.

Example 155 includes the subject matter of any of examples 148 to 154. In example 155, the IoT device is to place the external module under control of the IoT device in response to satisfying the capability threshold.

Example 156 includes the subject matter of any of examples 148 to 155. In example 156, in response to an external module life time being less than an operational life of the IoT device, the IoT device is to transmit a request for an updated external module.

Example 157 includes the subject matter of any of examples 148 to 156. In example 157, in response to a resource hardware component life time being less than an operational life of the IoT device, the IoT device is to transmit a request for an updated resource hardware component.

Example 158 includes a method for using an internet-of-things (IoT) device to map resources and requirements of self-describing hardware. The method for using an internet-of-things (IoT) device to map resources and requirements of self-describing hardware includes identifying a resource hardware component controlled by the IoT device, the resource hardware component having a capability threshold, processing a received indication of an external module hardware requirement from an external module, comparing the external module hardware requirement to the capability threshold of the resource hardware component of the IoT device, and transmitting a deactivation signal to the external module in response to the external module hardware requirement not satisfying the capability threshold of the resource hardware component.

Example 159 includes the subject matter of example 158. In example 159, the method includes transmitting a request to a master device in response to the external module hardware requirement not satisfying the capability threshold of the resource hardware component, the request to the master device to request a second resource hardware component be assigned to be controlled by the IoT device.

Example 160 includes the subject matter of either of examples 158 or 159. In example 160, the method includes a second resource hardware component under control of the IoT device, wherein a first resource hardware component and a second resource hardware component can be pooled such that the capability threshold is a sum of the capability threshold of the first resource hardware and the second resource hardware.

Example 161 includes the subject matter of any of examples 158 to 160. In example 161, the external module includes a module resource to be pooled with a first resource hardware component for by the direction of the IoT device.

Example 162 includes the subject matter of any of examples 158 to 161. In example 162, the resource hardware component includes at least one of a power source, a processing resource, an integrated communication component, a context sensor, a context actuator, a signal conditioning circuit, a memory resource, or a storage resource.

Example 163 includes the subject matter of any of examples 158 to 162. In example 163, the capability threshold includes a minimum functional compatibility between the resource hardware component and the external module indicating an minimal ability to function together, and a full compatibility between the resource hardware component and the external module indicating an ability to function at full capabilities of the external module.

Example 164 includes the subject matter of any of examples 158 to 163. In example 164, the method includes indicating an unsatisfied capability threshold by activating a visible indicator.

Example 165 includes the subject matter of any of examples 158 to 164. In example 165, the method includes placing the external module under control of the IoT device in response to satisfying the capability threshold.

Example 166 includes the subject matter of any of examples 158 to 165. In example 166, in response to an external module life time being less than an operational life of the IoT device, transmitting a request for an updated external module.

Example 167 includes the subject matter of any of examples 158 to 166. In example 167, in response to an resource hardware component life time being less than an operational life of the IoT device, transmitting a request for an updated resource hardware component.

Example 168 includes a non-transitory, machine readable medium that includes instructions that, when executed, direct a processor to identify a resource hardware component controlled by an IoT device, the resource hardware component having a capability threshold, process a received indication of an external module hardware requirement from an external module, compare the external module hardware requirement to the capability threshold of the resource hardware component of the IoT device, and transmit a deactivation signal to the external module in response to the external module hardware requirement not satisfying the capability threshold of the resource hardware component.

Example 169 includes the subject matter of examples 168. In example 169, the non-transitory, machine readable medium includes instructions that, when executed, direct the processor to transmit a request to a master device in response to the external module hardware requirement not satisfying the capability threshold of the resource hardware component, the request to the master device to request a second resource hardware component be assigned to be controlled by the IoT device.

Example 170 includes the subject matter of either of examples 168 or 169. In example 170, the non-transitory, machine readable medium includes a second resource hardware component under control of the IoT device, wherein a first resource hardware component and a second resource hardware component can be pooled such that the capability threshold is a sum of the capability threshold of the first resource hardware and the second resource hardware.

Example 171 includes the subject matter of any of examples 168 to 170. In example 171, the external module includes a module resource to be pooled with a first resource hardware component for use by the IoT device.

Example 172 includes the subject matter of any of examples 168 to 171. In example 172, the resource hardware component includes at least one of a power source, a processing resource, an integrated communication component, a context sensor, a context actuator, a signal conditioning circuit, a memory resource, or a storage resource.

Example 173 includes the subject matter of any of examples 168 to 172. In example 173, the capability threshold includes a minimum functional compatibility between the resource hardware component and the external module indicating an minimal ability to function together, and a full compatibility between the resource hardware component and the external module indicating an ability to function at the highest capabilities of the external module.

Example 174 includes the subject matter of any of examples 168 to 173. In example 174, the non-transitory, machine readable medium includes instructions that, when executed, direct the processor to indicate an unsatisfied capability threshold by activating a visible indicator.

Example 175 includes the subject matter of any of examples 168 to 174. In example 175, the non-transitory, machine readable medium includes instructions that, when executed, direct the processor to place the external module under control of the IoT device in response to satisfying the capability threshold.

Example 176 includes the subject matter of any of examples 168 to 175. In example 176, the non-transitory, machine readable medium includes instructions that, when executed, direct the processor to, in response to an external module life time being less than an operational life of the IoT device, transmit a request for an updated external module.

Example 177 includes the subject matter of any of examples 168 to 176. In example 177, the non-transitory, machine readable medium includes instructions that, when executed, direct the processor to, in response to an resource hardware component life time being less than an operational life of the IoT device, transmit a request for an updated resource hardware component.

Example 178 includes an apparatus including means to perform a method as in any other Example.

Example 179 includes machine-readable storage including machine-readable instructions, when executed, to implement a method or realize an apparatus as in any other Example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus comprising:

network interface circuitry;

machine readable instructions; and processor circuitry to be programmed by the machine readable instructions to:

sign a first digital transaction using a first cryptographic key that is generated on-demand for the first digital transaction;

cause storage of the first cryptographic key in a memory, cause transmission of the first digital transaction to a distributed network;

sign a second digital transaction using a second cryptographic key that is generated on-demand for the second digital transaction;

remove the first cryptographic key from the memory upon generation of the second cryptographic key; and cause transmission of the second digital transaction to the distributed network.

2. The apparatus of claim 1, wherein the processor circuitry is to be programmed by the machine readable instructions to:

cause the first digital transaction to be committed to the distributed network prior to signing the first digital transaction; and cause the second digital transaction to be committed to the distributed network.

3. The apparatus of claim 2, wherein the processor circuitry is to generate the first cryptographic key after the first digital transaction is committed to the distributed network.

4. The apparatus of claim 1, wherein the first digital transaction is at least one of a financial transaction or an attempt to access a computing system.

5. The apparatus of claim 1, wherein the processor circuitry is to generate the first cryptographic key based on a third cryptographic key.

6. The apparatus of claim 5, wherein the third cryptographic key is a private key.

7. The apparatus of claim 6, wherein the processor circuitry is to import the private key based on a wallet import format (WIF) private key.

8. The apparatus of claim 1, wherein the processor circuitry is to discard the first cryptographic key prior to generation of the second cryptographic key.

9. The apparatus of claim 1, wherein the processor circuitry is to generate the second cryptographic key in response to creation of the second digital transaction.

10. The apparatus of claim 1, wherein the processor circuitry is to be programmed by the machine readable instructions to:

generate the second cryptographic key based on a local key stored in a circular buffer and an offset received from a remote node.

11. A non-transitory computer readable medium comprising instructions that, when executed, cause a machine to at least:

sign a first digital transaction using a first cryptographic key that is generated on-demand for the first digital transaction;

cause storage of the first cryptographic key in a memory, cause transmission of the first digital transaction to a distributed network;

sign a second digital transaction using a second cryptographic key that is generated on-demand for the second digital transaction;

remove the first cryptographic key from the memory upon generation of the second cryptographic key; and cause transmission of the second digital transaction to the distributed network.

12. The non-transitory computer readable medium of claim 11, wherein the instructions, when executed, cause the machine to:

cause the first digital transaction to be committed to the distributed network prior to signing the first digital transaction; and cause the second digital transaction to be committed to the distributed network.

13. The non-transitory computer readable medium of claim 12, wherein the instructions, when executed, cause the machine to generate the first cryptographic key after the first digital transaction is committed to the distributed network.

14. The non-transitory computer readable medium of claim 11, wherein the first digital transaction is at least one of a financial transaction or an attempt to access a computing system.

15. The non-transitory computer readable medium of claim 11, wherein the instructions, when executed, cause the machine to generate the first cryptographic key based on a third cryptographic key.

16. The non-transitory computer readable medium of claim 15, wherein the third cryptographic key is a private key.

17. The non-transitory computer readable medium of claim 16, wherein the instructions, when executed, cause the machine to import the private key based on a wallet import format (WIF) private key.

18. The non-transitory computer readable medium of claim 11, wherein the instructions, when executed, cause the machine to discard the first cryptographic key prior to generation of the second cryptographic key.

19. The non-transitory computer readable medium of claim 11, wherein the instructions, when executed, cause the machine to generate the second cryptographic key in response to creation of the second digital transaction.

* * * * *